(12) United States Patent
Peacemaker et al.

(10) Patent No.: US 11,338,777 B2
(45) Date of Patent: May 24, 2022

(54) TWO SPEED TRAILER JACK

(71) Applicant: SOS Solutions, Inc., Tonasket, WA (US)

(72) Inventors: Samuel R. Peacemaker, Gilbert, AZ (US); Benjamin Peacemaker, Chandler, AZ (US)

(73) Assignee: SOS Solutions, Inc., Tonasket, WA (US)

( * ) Notice: Subject to any disclaimer, the term of this patent is extended or adjusted under 35 U.S.C. 154(b) by 0 days.

(21) Appl. No.: 16/950,525

(22) Filed: Nov. 17, 2020

(65) Prior Publication Data

US 2021/0370888 A1  Dec. 2, 2021

Related U.S. Application Data

(63) Continuation-in-part of application No. 16/943,997, filed on Jul. 30, 2020, which is a continuation-in-part of application No. 16/883,811, filed on May 26, 2020.

(51) Int. Cl.
*B60S 9/06* (2006.01)
*B66F 3/08* (2006.01)

(52) U.S. Cl.
CPC . *B60S 9/06* (2013.01); *B66F 3/08* (2013.01)

(58) Field of Classification Search
CPC .......... B60S 9/00–12; B66F 3/08; B66F 3/10; F16H 25/2056; F16H 25/2075; F16H 25/2078
USPC ..... 254/102, 103, 418–425; 74/89.35, 89.28, 74/89.27, 89.38, 89.39
See application file for complete search history.

(56) References Cited

U.S. PATENT DOCUMENTS

| | | | | |
|---|---|---|---|---|
| 873,248 | A * | 12/1907 | Lagasse | B66F 3/10 254/102 |
| 1,420,113 | A * | 6/1922 | Kuehn | B66F 3/10 254/102 |
| 1,468,034 | A * | 9/1923 | Riker | B66F 3/18 254/103 |
| 1,659,785 | A * | 2/1928 | Rodman | B66F 3/16 254/102 |

(Continued)

FOREIGN PATENT DOCUMENTS

| | | | | |
|---|---|---|---|---|
| AU | 4087568 | | 1/1970 | |
| CN | 102015388 A | * | 4/2011 | ............... B60S 9/08 |

(Continued)

OTHER PUBLICATIONS

International Searching Authority, International Search Report and Written Opinion dated Jul. 22, 2021 in Application No. PCT/US2021/028212.

*Primary Examiner* — Joseph J Hail
*Assistant Examiner* — Jonathan R Zaworski
(74) *Attorney, Agent, or Firm* — Snell & Wilmer L.L.P.

(57) ABSTRACT

A linear jack includes a first outer sleeve, an inner sleeve disposed at least partially within the first outer sleeve, a second outer sleeve disposed at least partially within the inner sleeve, a translating screw disposed at least partially within the second outer sleeve, and a cover sleeve coupled to the translating screw. The first outer sleeve is threadedly coupled to the inner sleeve. The second outer sleeve is threadedly coupled to the translating screw. The translating screw is disposed at least partially within the cover sleeve. The cover sleeve is configured to translate with the translating screw.

10 Claims, 40 Drawing Sheets

(56) References Cited

U.S. PATENT DOCUMENTS

| | | | | |
|---|---|---|---|---|
| 1,677,466 | A * | 7/1928 | Walker | B66F 3/10 |
| | | | | 254/102 |
| 1,814,226 | A * | 7/1931 | Nolette | B66F 3/10 |
| | | | | 254/102 |
| 1,929,262 | A * | 10/1933 | Shire | B66F 3/16 |
| | | | | 254/102 |
| 2,069,012 | A * | 1/1937 | Lynes | B60S 9/06 |
| | | | | 254/102 |
| 3,314,655 | A * | 4/1967 | Steele | B66F 3/14 |
| | | | | 254/92 |
| 3,738,613 | A | 6/1973 | Hollis, Jr. | |
| 4,521,707 | A * | 6/1985 | Baker | F16H 25/20 |
| | | | | 310/112 |
| 4,614,128 | A * | 9/1986 | Fickler | F16H 25/2018 |
| | | | | 74/89.31 |
| 4,635,904 | A * | 1/1987 | Whittingham | B60S 9/08 |
| | | | | 192/56.62 |
| 4,651,581 | A * | 3/1987 | Svensson | B66F 3/10 |
| | | | | 74/89.35 |
| 5,035,094 | A * | 7/1991 | Legare | F16H 25/2056 |
| | | | | 52/118 |
| 5,123,629 | A * | 6/1992 | Takeuchi | B66F 3/10 |
| | | | | 254/100 |
| 5,144,851 | A * | 9/1992 | Grimm | B64C 13/36 |
| | | | | 74/89.26 |
| 5,282,593 | A * | 2/1994 | Fast | A47B 9/04 |
| | | | | 108/147 |
| 5,313,852 | A * | 5/1994 | Arena | F16H 25/2018 |
| | | | | 74/89.13 |
| 5,676,018 | A | 10/1997 | Vandenberg | |
| 5,848,554 | A * | 12/1998 | Kober | F16H 25/2056 |
| | | | | 74/89.35 |
| 6,494,005 | B2 * | 12/2002 | Zimmerman | B66F 3/10 |
| | | | | 108/147 |
| 6,786,890 | B2 * | 9/2004 | Preuthun | A61M 5/14566 |
| | | | | 604/155 |
| 6,880,416 | B2 * | 4/2005 | Koch | A47B 9/04 |
| | | | | 74/424.72 |
| 7,225,694 | B2 * | 6/2007 | Said | F16H 25/20 |
| | | | | 74/89.35 |
| 7,325,786 | B2 * | 2/2008 | Drake, III | B60S 9/08 |
| | | | | 254/419 |
| 8,091,922 | B2 | 1/2012 | McMahan | |
| 8,579,326 | B2 * | 11/2013 | Righetti | B60S 9/08 |
| | | | | 280/766.1 |
| 8,635,922 | B2 * | 1/2014 | Prottengeier | A47B 9/04 |
| | | | | 74/89.35 |
| 8,894,038 | B2 * | 11/2014 | Few | B66F 3/10 |
| | | | | 254/102 |
| 8,944,467 | B1 * | 2/2015 | Dill | B60S 9/08 |
| | | | | 280/766.1 |
| 9,308,894 | B2 | 4/2016 | Lusty | |
| 9,345,836 | B2 * | 5/2016 | Cabiri | A61M 5/31511 |
| 9,469,516 | B2 * | 10/2016 | Jussila | B66F 3/10 |
| 2005/0285380 | A1 * | 12/2005 | Stanczak | B60S 9/08 |
| | | | | 280/763.1 |
| 2007/0051933 | A1 * | 3/2007 | Rincoe | B60S 9/08 |
| | | | | 254/425 |
| 2010/0192715 | A1 * | 8/2010 | Vauchel | F16H 25/20 |
| | | | | 74/89.35 |
| 2011/0174101 | A1 * | 7/2011 | Prottengeier | A47B 9/04 |
| | | | | 74/110 |
| 2011/0198478 | A1 * | 8/2011 | Chang | F16M 7/00 |
| | | | | 248/670 |
| 2018/0072278 | A1 | 3/2018 | Simol | |
| 2019/0060578 | A1 * | 2/2019 | Farris | A61M 5/31511 |
| 2019/0135243 | A1 | 5/2019 | Simol | |
| 2019/0360567 | A1 * | 11/2019 | Hu | B66F 3/44 |
| 2020/0039478 | A1 | 2/2020 | Moreno | |
| 2021/0112970 | A1 * | 4/2021 | Polz | F16H 25/2056 |

FOREIGN PATENT DOCUMENTS

| | | | | |
|---|---|---|---|---|
| CN | 109399502 A | * | 3/2019 | |
| DE | 19608171 A1 | * | 9/1997 | F16M 11/28 |
| DE | 102016123356 | | 6/2018 | |
| EP | 0513973 | | 11/1992 | |
| EP | 1350701 A2 | * | 10/2003 | B60S 9/08 |
| EP | 1510157 A1 | * | 3/2005 | A47F 3/004 |
| KR | 20130001749 A | * | 1/2013 | |
| WO | WO-2016113448 A1 | * | 7/2016 | B66F 3/10 |
| WO | WO-2018199827 A1 | * | 11/2018 | A47B 9/04 |

\* cited by examiner

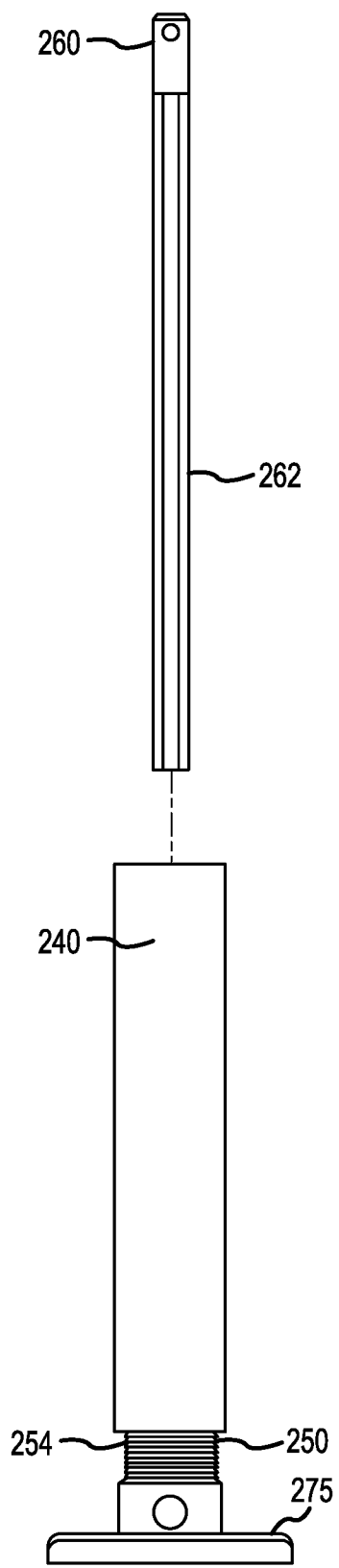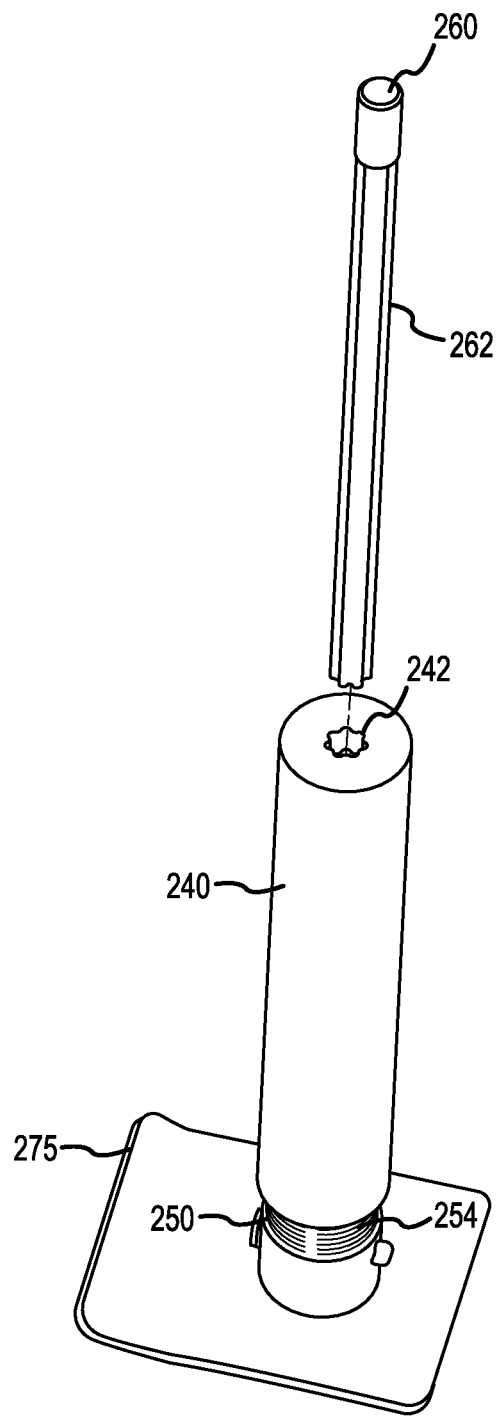

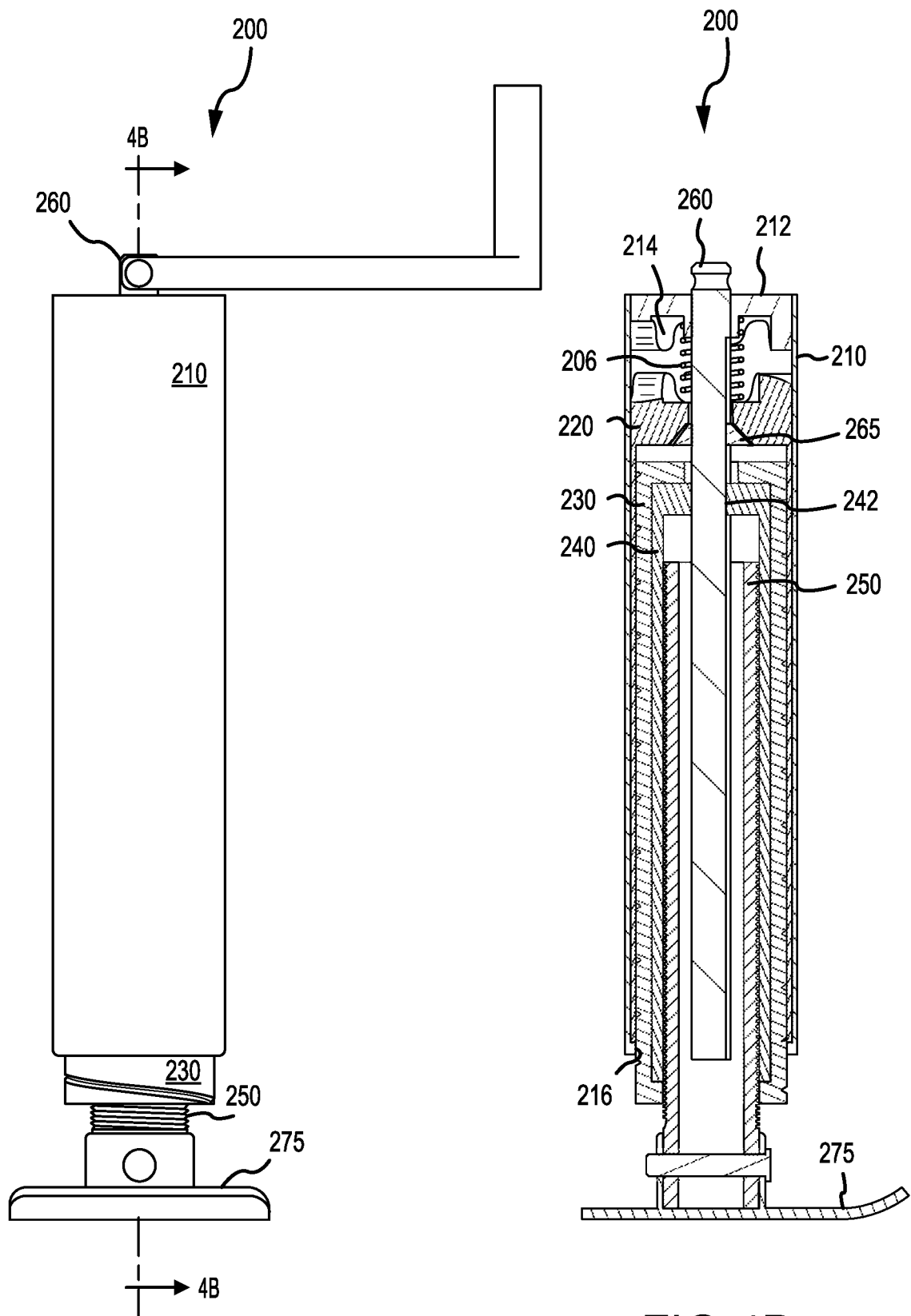

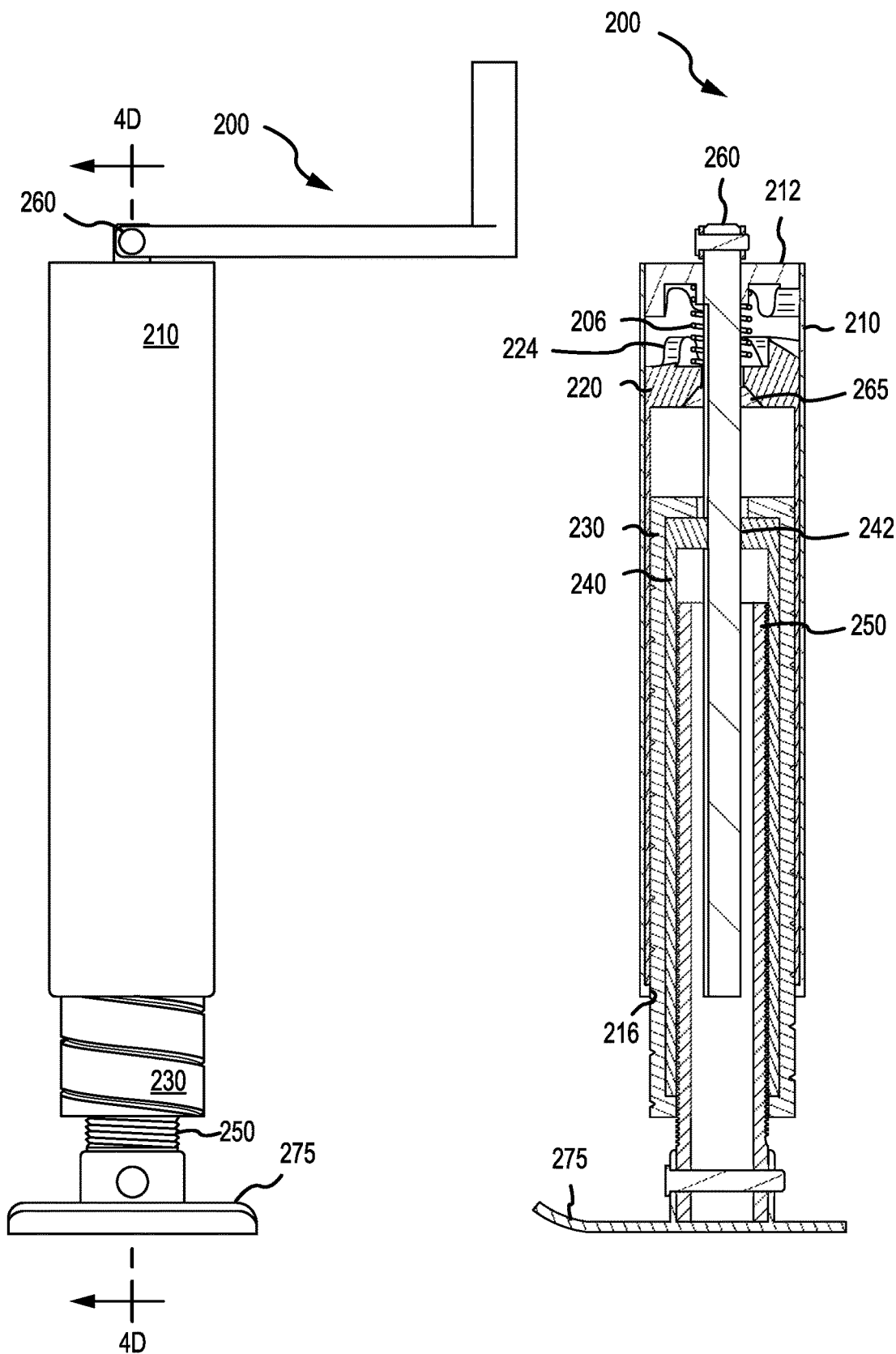

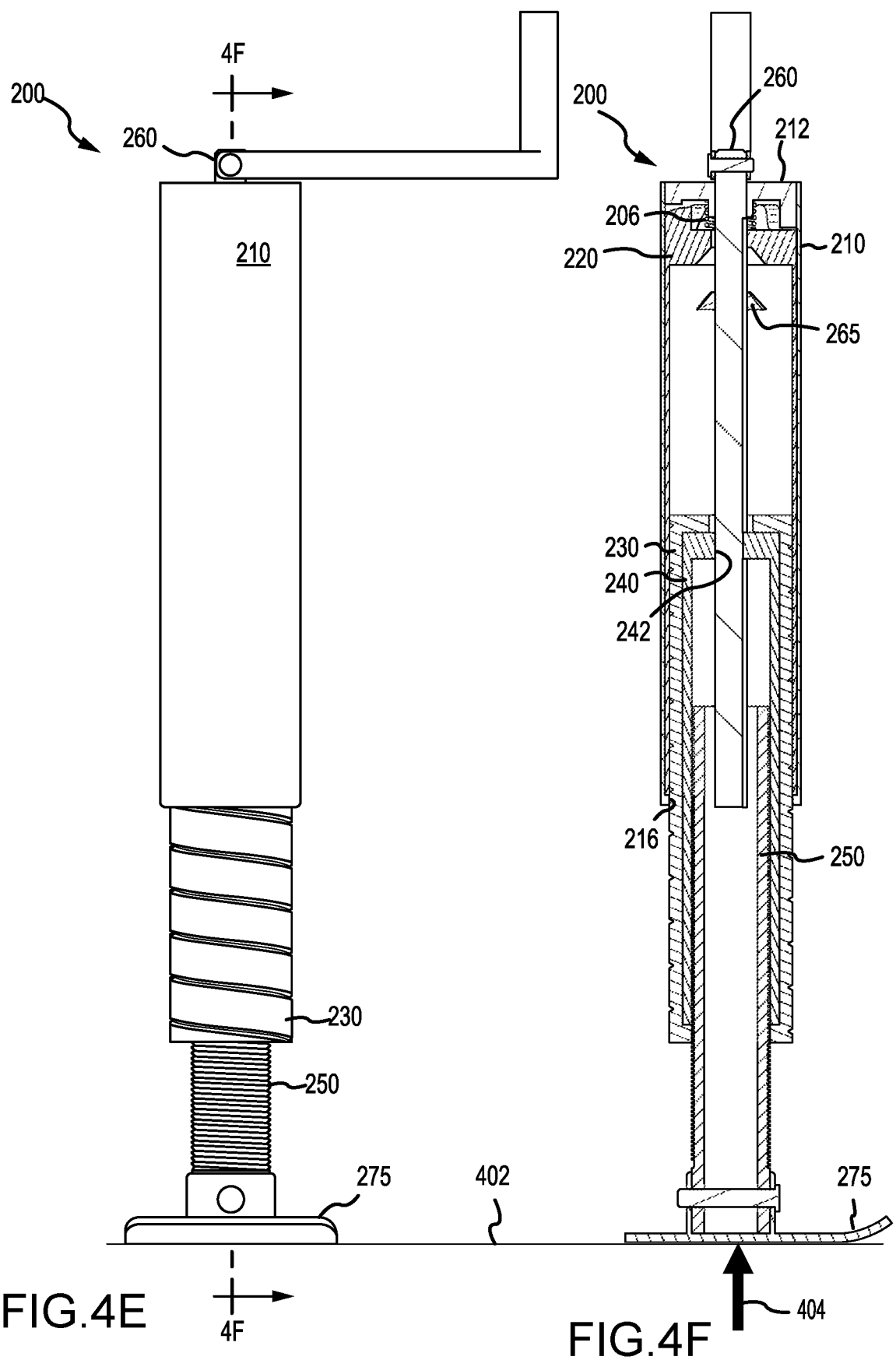

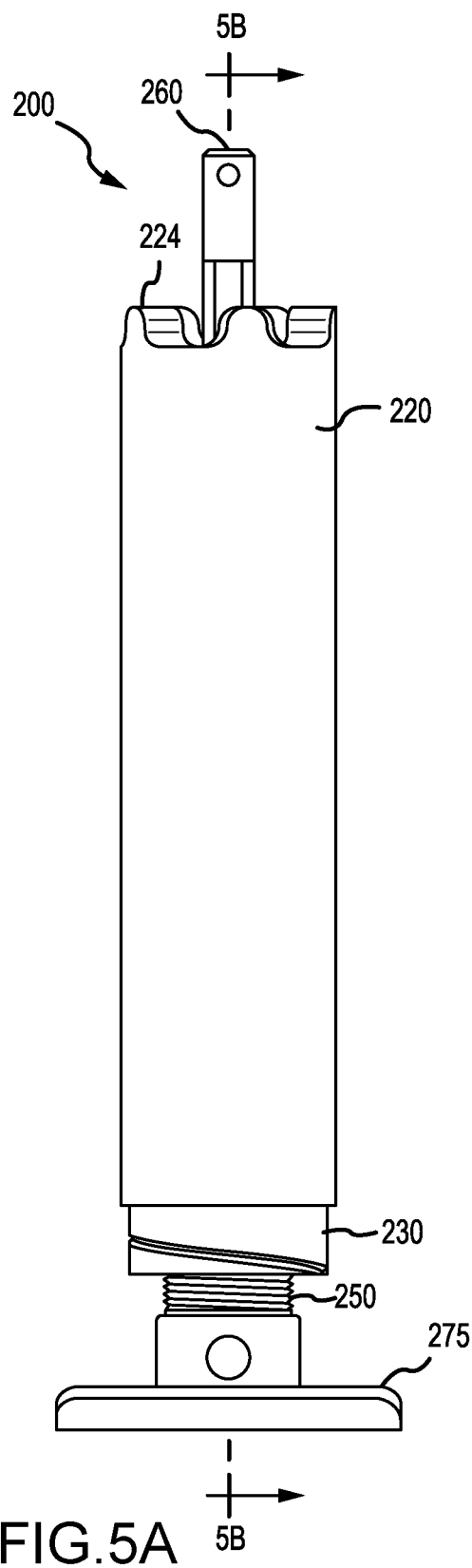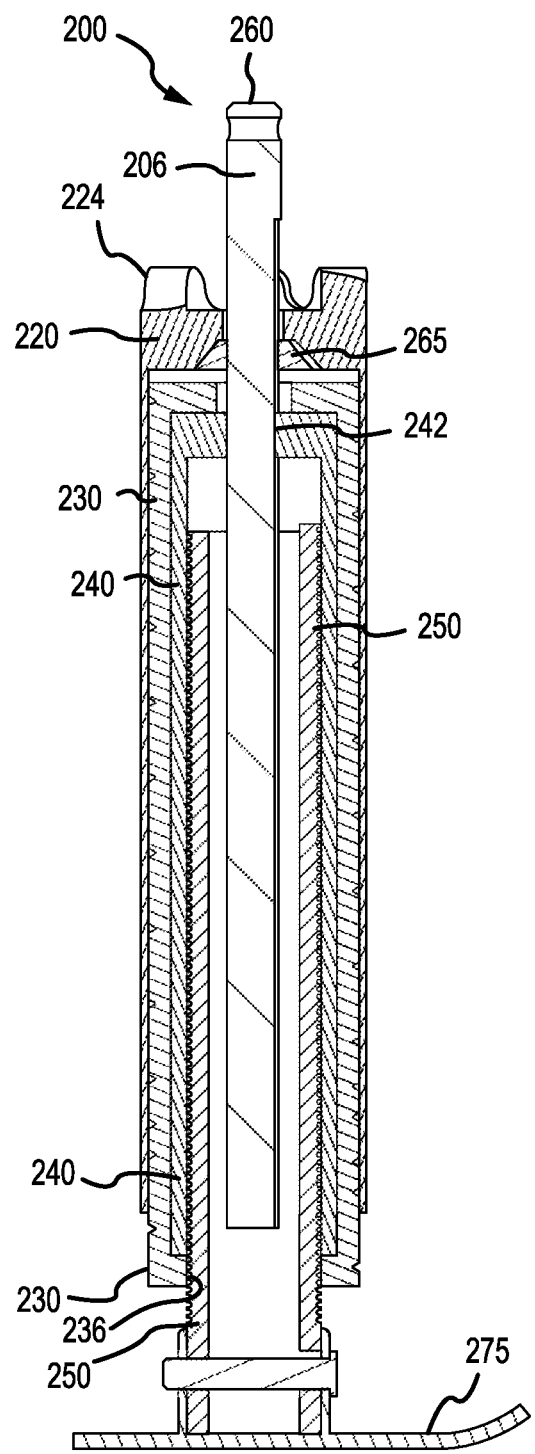

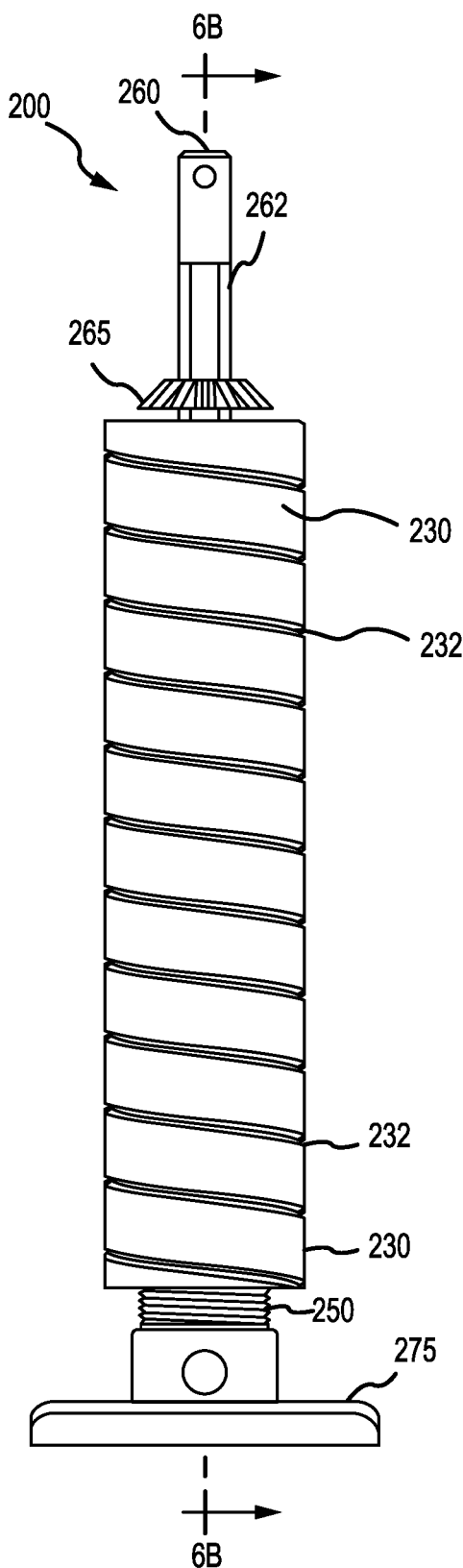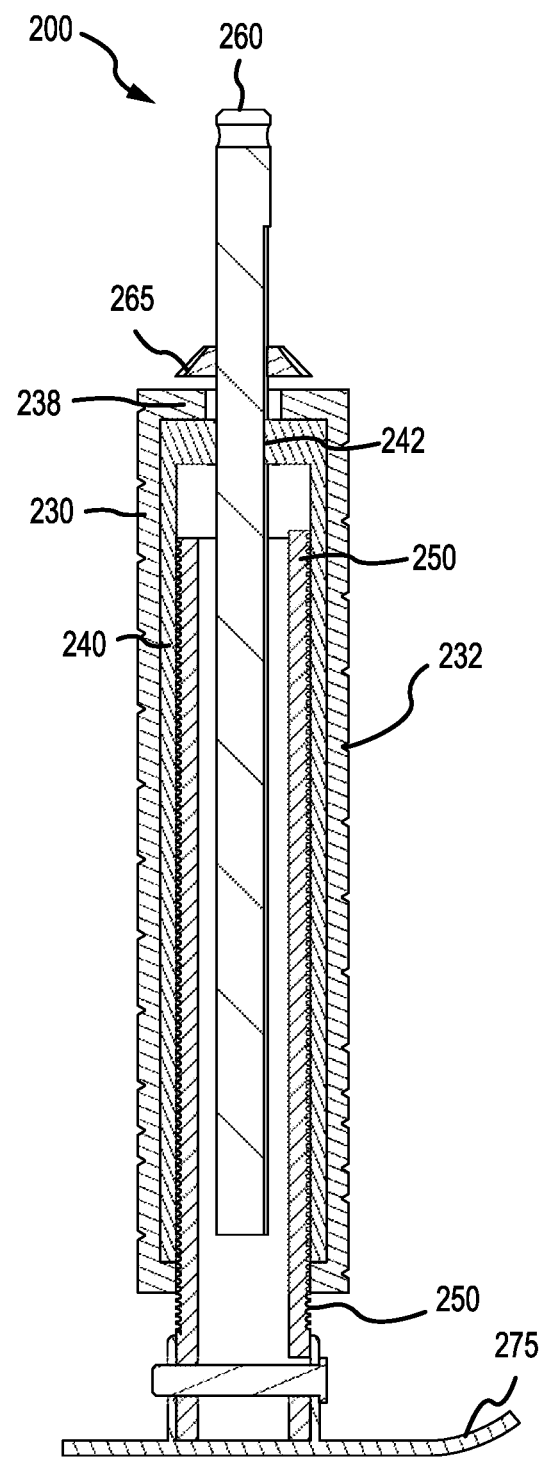
FIG.6A
FIG.6B

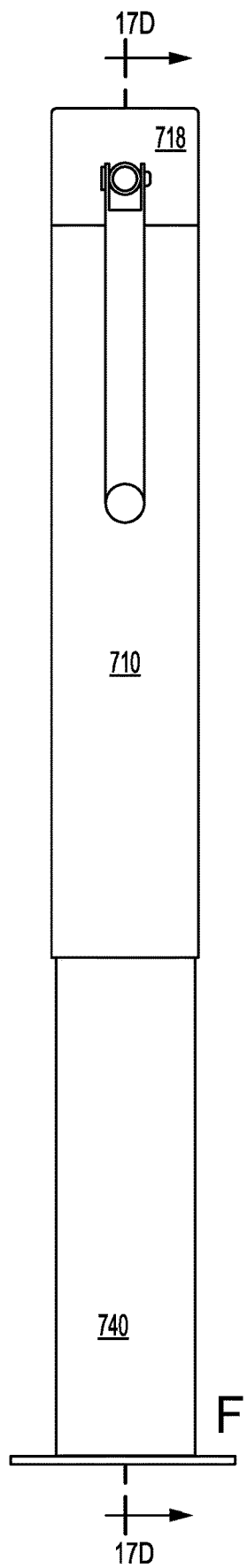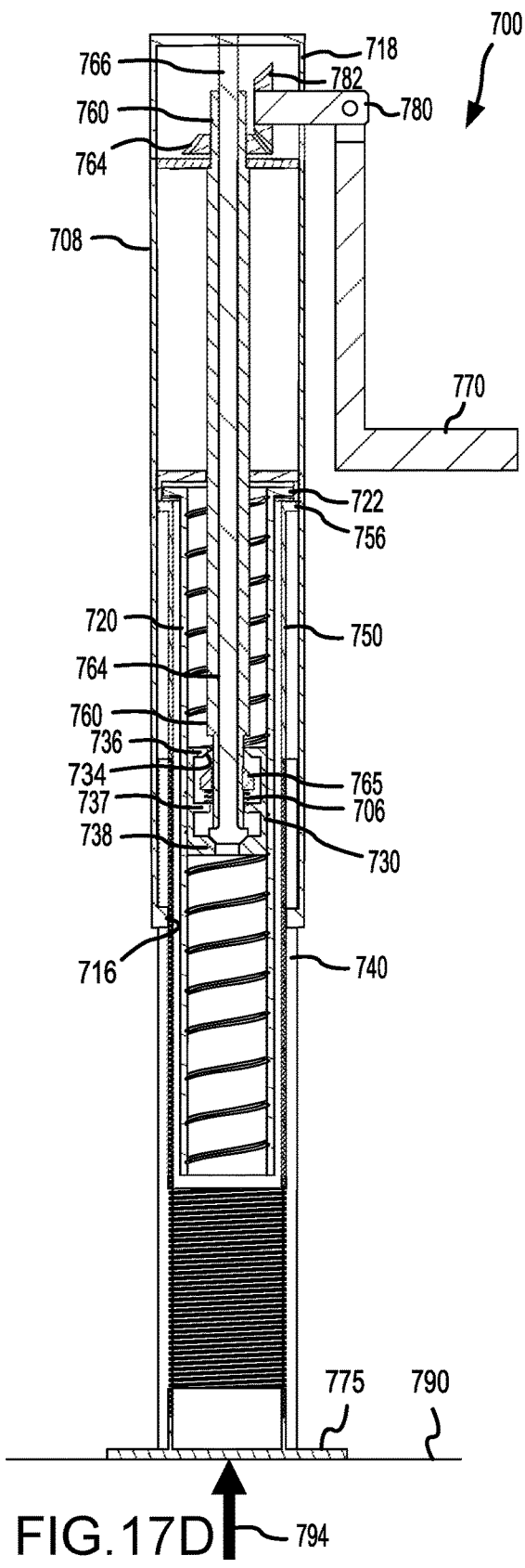

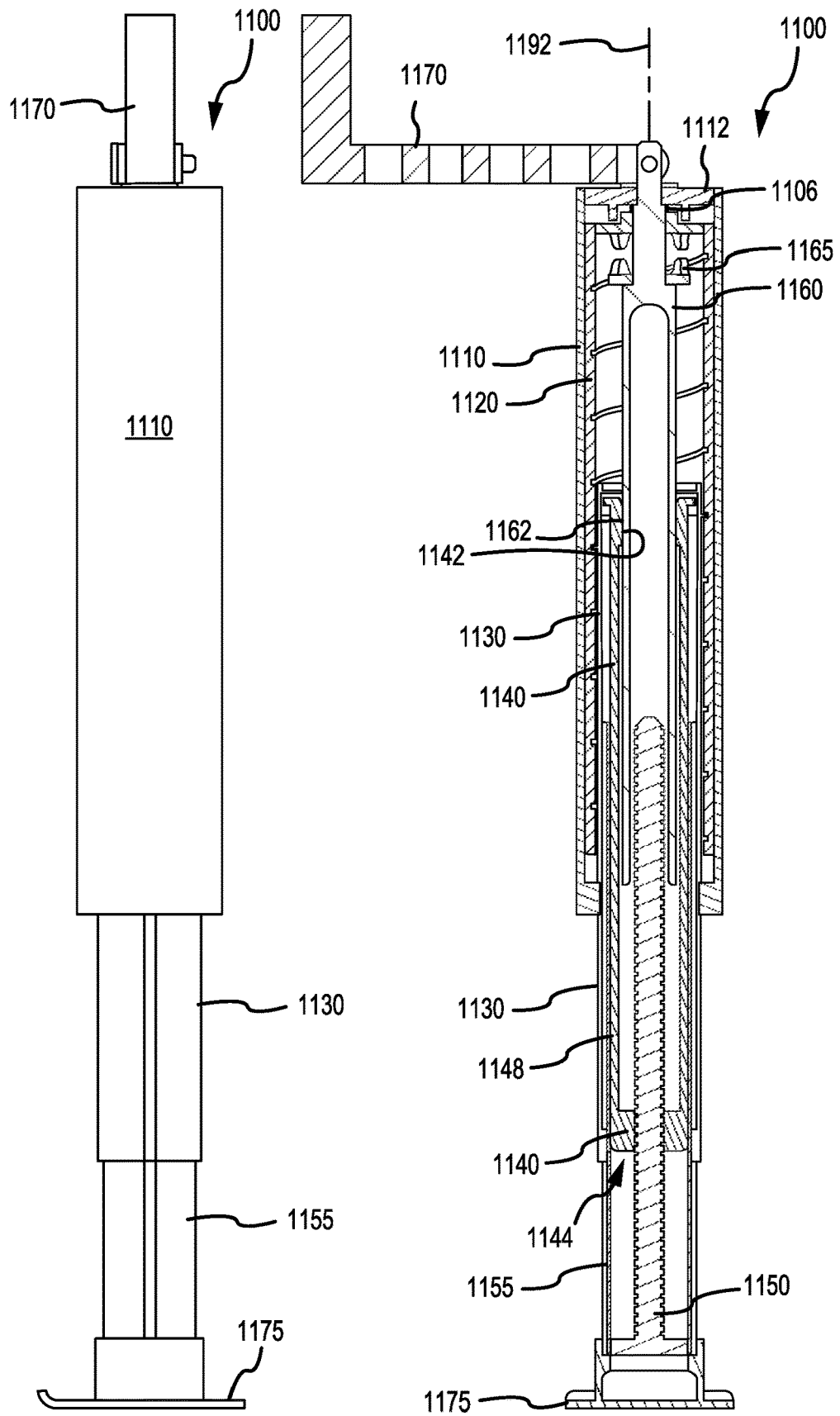

1200

```
┌─────────────────────────────────────────────────┐
│ Disposing an inner sleeve at least partially    │──── 1210
│ within a first outer sleeve                     │
└─────────────────────────────────────────────────┘
                        │
                        ▼
┌─────────────────────────────────────────────────┐
│ Disposing a translating screw at least          │──── 1220
│ partially within a second outer sleeve          │
└─────────────────────────────────────────────────┘
                        │
                        ▼
┌─────────────────────────────────────────────────┐
│ Disposing the second outer sleeve at least      │──── 1230
│ partially within the inner sleeve               │
└─────────────────────────────────────────────────┘
                        │
                        ▼
┌─────────────────────────────────────────────────┐
│ Coupling a cover sleeve to the translating screw│──── 1240
└─────────────────────────────────────────────────┘
```

FIG. 31

TWO SPEED TRAILER JACK

CROSS REFERENCE TO RELATED APPLICATIONS

This application claims priority to, the benefit of, and is a continuation-in-part of U.S. patent application Ser. No. 16/943,997, filed on Jul. 30, 2020, and entitled "TWO SPEED TRAILER JACK," which claims priority to, the benefit of, and is a continuation-in-part of U.S. patent application Ser. No. 16/883,811, filed on May 26, 2020, and entitled "TWO SPEED TRAILER JACK," which are incorporated by reference herein in their entirety for all purposes.

FIELD

The present disclosure relates generally to apparatuses such as jacks for lifting and suspending vehicles, trailers, and other large objects, and, more specifically, to linear jacks that are used to selectively lower and raise, for example, a portion of a trailer.

BACKGROUND

Many of the different types of trailers that are towed by trucks are connected to the trucks by a releasable coupling such as a gooseneck coupling, a fifth wheel coupling, a bumper pull coupling and the like. After the trailer is released from the truck and is no longer supported by the truck at the forward end of the trailer, a lifting device, such as a jack and/or landing gear assembly, is often used to support the trailer floor or bed, typically in a position generally horizontal to the ground.

A typical lifting device is attached to the trailer adjacent the truck coupling at the forward end of the trailer. The lifting device includes one or more vertically oriented columns and a vertical leg is mounted on the column. A hand crank is typically connected to the gear mechanism. Selectively rotating the hand crank lowers the leg until the leg contacts the ground and supports the forward end of the trailer when the trailer is being uncoupled from the truck, or raises the leg when the trailer has been connected to a truck and is ready for towing.

SUMMARY

A linear jack is disclosed, comprising a first sleeve, a second sleeve disposed at least partially within the first sleeve, wherein the first sleeve is threadedly coupled to the second sleeve, a third sleeve disposed at least partially within the second sleeve, a translating screw disposed at least partially within the third sleeve, wherein the third sleeve is threadedly coupled to the translating screw, and a cover sleeve coupled to the translating screw. The translating screw is disposed at least partially within the cover sleeve, and the cover sleeve is configured to translate with the translating screw.

In various embodiments, the cover sleeve is disposed at least partially within the second sleeve.

In various embodiments, the cover sleeve is keyed to the second sleeve.

In various embodiments, the second sleeve is configured to translate with respect to the first sleeve in response to rotation of the first sleeve, and the translating screw is configured to translate with respect to the third sleeve in response to rotation of the third sleeve.

In various embodiments, a thread pitch of the second sleeve is greater than a thread pitch of the translating screw.

In various embodiments, the linear jack further comprises an outer tube comprising a centerline axis, wherein the first sleeve is disposed at least partially within the outer tube, a shaft coupled to the third sleeve, a gear coupled to the shaft, and a spring operatively coupled to the first sleeve, wherein the first sleeve is slidable in the outer tube between a first position and a second position. In the first position, the spring biases the first sleeve to engage the gear whereby turning the shaft a first rotational direction extends the second sleeve from the first sleeve, and turning the shaft a second rotational direction retracts the second sleeve into the first sleeve. In the second position, the first sleeve is moved against a bias of the spring and disengaged from the gear whereby turning the shaft the first rotational direction extends the translating screw from the third sleeve, and turning the shaft the second rotational direction retracts the translating screw into the third sleeve.

In various embodiments, turning the shaft the first rotational direction extends the translating screw from the third sleeve, and turning the shaft the second rotational direction retracts the translating screw into the third sleeve, regardless of the first sleeve being in the first position or the second position.

In various embodiments, the third sleeve is configured to rotate with the shaft, the gear is disposed within the first sleeve, and the spring is disposed within the outer tube.

In various embodiments, the first sleeve, the second sleeve, the third sleeve, and the translating screw are in coaxial alignment.

In various embodiments, the linear jack further comprises a foot coupled to an end of the translating screw.

A linear jack arrangement is disclosed, comprising a shaft, a first sleeve configured to receive the shaft, a translating screw disposed at least partially within the first sleeve, wherein the first sleeve is threadedly coupled to the translating screw, wherein the shaft is configured to receive the translating screw.

In various embodiments, the first sleeve is configured to rotate in response to rotation of the shaft.

In various embodiments, the shaft, the first sleeve, and the translating screw are coaxially aligned.

In various embodiments, the linear jack arrangement further comprises a second sleeve, wherein the first sleeve is disposed within the second sleeve.

In various embodiments, the second sleeve comprises a first flange and a second flange, wherein the first flange extends radially inward from the second sleeve and the second flange extends radially inward from the second sleeve.

In various embodiments, the first sleeve comprises a third flange extending radially outward therefrom, wherein the third flange is disposed axially between the first flange and the second flange.

In various embodiments, the first sleeve comprises a flange extending radially inward therefrom, wherein the first sleeve is threadedly coupled to the translating screw via the flange.

In various embodiments, the linear jack arrangement further comprises a cover sleeve coupled to the translating screw, wherein the translating screw is disposed at least partially within the cover sleeve.

A method of manufacturing a linear jack is disclosed, comprising disposing a second sleeve at least partially within a first sleeve, wherein the first sleeve is threadedly coupled to the second sleeve, disposing a translating screw at least partially within a third sleeve, wherein the third sleeve is threadedly coupled to the translating screw, disposing the third sleeve at least partially within the second sleeve, and coupling a cover sleeve to the translating screw, wherein the cover sleeve is configured to translate with the translating screw.

In various embodiments, the method further comprises disposing the cover sleeve to surround the translating screw, disposing the cover sleeve to surround the third sleeve, and disposing the cover sleeve in keyed connection with the second sleeve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be example in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A and FIG. 3B illustrate a partially exploded view of a low speed assembly and a shaft of the lifting device of FIG. 2, the shaft for driving the low speed assembly, in accordance with various embodiments.

FIG. 4A and FIG. 4B illustrate a side view and a section view, respectively, of the lifting device of FIG. 2, with the lifting device in a retracted state, and a high speed sleeve in a first position, in accordance with various embodiments.

FIG. 4C and FIG. 4D illustrate a side view and a section view, respectively, of the lifting device of FIG. 4A and FIG. 4B, with the lifting device in a partially extended state, and the high speed sleeve in the first position, in accordance with various embodiments.

FIG. 4E and FIG. 4F illustrate a side view and a section view, respectively, of the lifting device of FIG. 4A and FIG. 4B, with the lifting device in an extended state, and the high speed sleeve in a second position, in accordance with various embodiments.

FIG. 5A and FIG. 5B illustrate a side view and a section view, respectively, of the lifting device of FIG. 4A and FIG. 4B, with an outer tube of the lifting device omitted for clarity purposes, in accordance with various embodiments.

FIG. 6A and FIG. 6B illustrate a side view and a section view, respectively, of the lifting device of FIG. 4A and FIG. 4B, with the outer tube and the high speed sleeve of the lifting device omitted for clarity purposes, in accordance with various embodiments.

FIG. 17C and FIG. 17D illustrate a side view and a section view, respectively, of the lifting device of FIG. 17A and FIG. 17B, with the lifting device in an extended state, and the high speed rotating screw in a second position, in accordance with various embodiments.

FIG. 28C and FIG. 28D illustrate a side view and a section view, respectively, of the lifting device of FIG. 28A and FIG. 28B, with the lifting device in an extended state, and the high speed sleeve in a second position, in accordance with various embodiments.

FIG. 31 illustrates a flow chart of a method of assembling a lifting device, in accordance with various embodiments.

DETAILED DESCRIPTION

Figure 1:
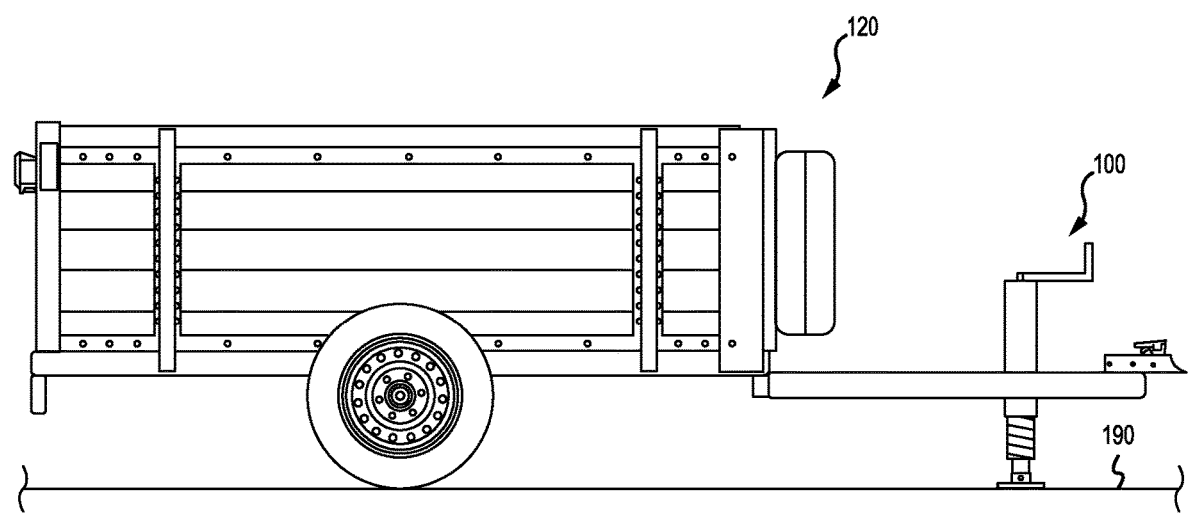
FIG. 1 illustrates a schematic view of a trailer-mounted lifting device supporting a front end of a trailer on a ground surface, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Typical lifting devices, such as linear trailer jacks, operate using a constant thread pitch sized to obtain sufficient mechanical advantage to lift a heavy load, such as a trailer. In that regard, as a smaller thread pitch increases mechanical advantage relative to a larger thread pitch, many available linear trailer jacks use a constant, small thread pitch. However, the gain in mechanical advantage is offset by the increase in the number of rotations of an input device (e.g., a handle) needed to extend (translate) the linear trailer j ack. In this manner, conventional linear trailer jack may provide the mechanical advantage desired to lift a trailer but at the expense of time consuming, and bothersome, turning.

Thread pitch, as used herein, is generally defined as the distance between threads on a threaded coupling, such as that found on a screw, lead screw or jack screw. Thread count, expressed for example as threads per inch, is generally defined as the number of threads per inch of linear distance on a threaded coupling, such as that found on a screw, lead screw or jack screw. In that regard, thread pitch and thread count are related, both expressing the spacing of threads about a screw, lead screw or jack screw.

Systems and methods for a two speed lifting device— such as a linear trailer jack—are provided herein. A lifting device of the present disclosure generally comprises a high speed assembly and a low speed assembly. The high speed assembly generally comprises a screw mechanism comprising a nut threadedly coupled to a screw. In various embodiments, the nut rotates and the screw translates, and in various embodiments, the nut translates and the screw rotates. The screw and nut are threadedly coupled for translating the rotational force to a linear force. The low speed assembly also comprises a nut threadedly coupled to a screw. A thread pitch of the high speed assembly is greater than a thread pitch of the low speed assembly, in various embodiments. In this manner, when driven by a common shaft and/or at the same revolutions per unit time, the high speed assembly causes the lifting device to extend a greater linear distance per rotation of a shaft than the low speed assembly.

In this manner, the high speed assembly causes more linear extension per rotation and thus reduces the number of rotations needed to lower or raise the lifting device. This reduces or eliminates the wasted time incurred if no such high speed assembly existed. However, when the lifting device begins to touch the ground, and mechanical advantage now becomes more important, in various embodiments, the high speed assembly is disengaged, for example, automatically disengaged. Thus, in response to the lifting device contacting a ground surface, a force is reacted into the high speed assembly, thereby moving a moveable member of the high speed assembly from a first position to a second position, and disengaging the high speed assembly from being drivably coupled with the shaft and/or other motive rotational force. With the moveable member of the high speed assembly in the second position, only the low speed assembly is driven in response to rotation of the shaft, thereby benefiting from the mechanical advantage of the low speed assembly, which has a smaller thread pitch than the high speed assembly. In this manner, lifting devices of the present disclosure may quickly and efficiently extend in overall length, reducing the number of turns required to reach a ground surface, while still providing the mechanical advantage to lift heavy loads. In various embodiments, this transition occurs without any additional action and thus improves ease of use and reduces overall time needed for operation. In this manner, lifting devices of the present disclosure may automatically switch from a high speed mode to a low speed mode in response to the ground force being reacted through the lifting device (i.e., in response to contacting the ground as the jack is extended).

With reference to FIG. 1, a trailer 120 partially supported on a ground surface 190 by a lifting device 100 is illustrated, in accordance with various embodiments. Lifting device 100 may be coupled to a front end of the trailer 120. Lifting device 100 may be generally vertically oriented when supporting the front end of the trailer 120. Although illustrated coupled to a utility type trailer, lifting devices of the present disclosure may be utilized on any trailer or vehicle where support is desired, for example, with a camper, recreational vehicle, toy hauler, boat, or any other device capable of being towed as a trailer.

Figure 2:
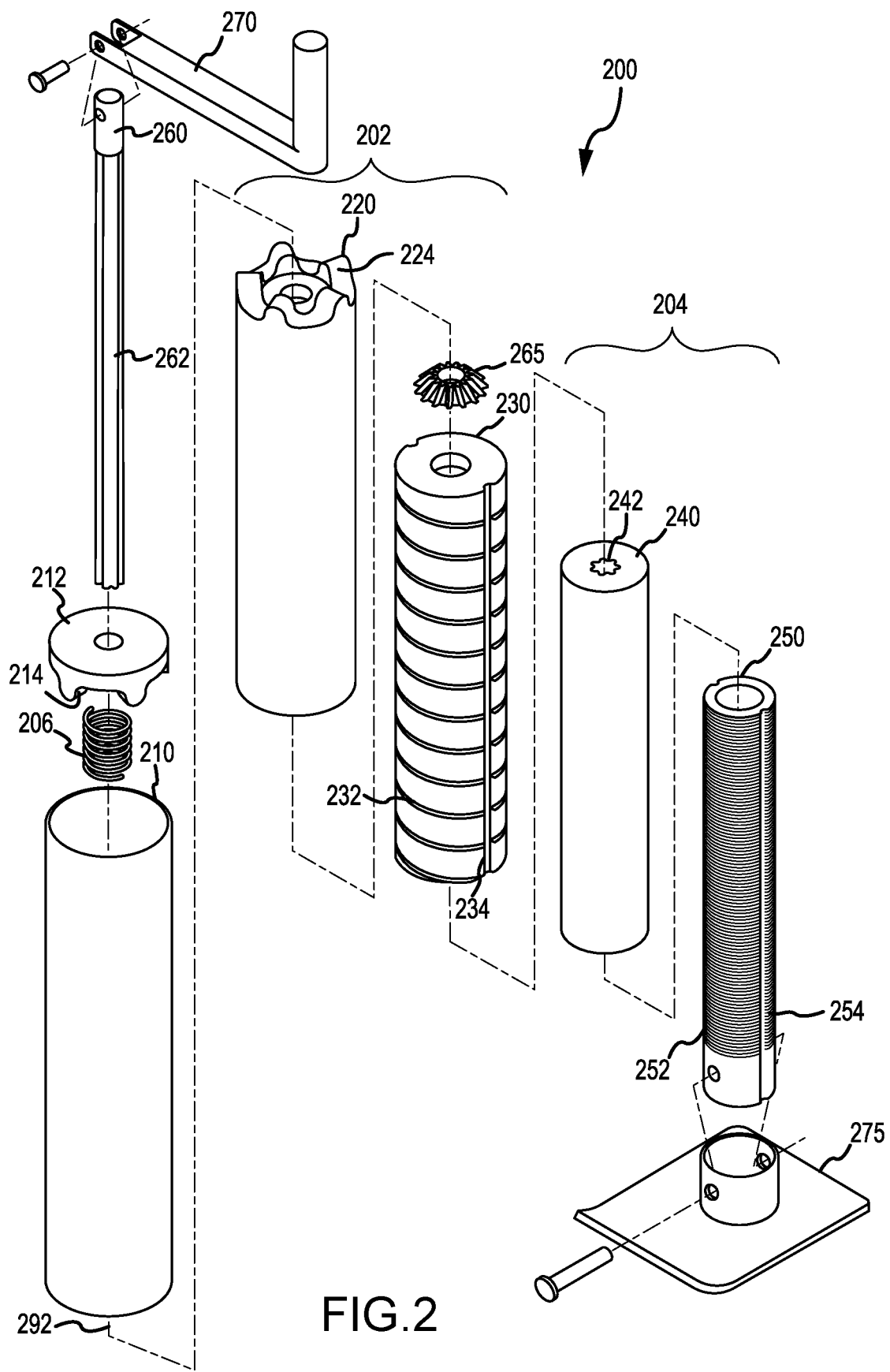
FIG. 2 illustrates an exploded view of a lifting device, in accordance with various embodiments.

With reference to FIG. 2, an exploded view of a lifting device 200 is illustrated, in accordance with various embodiments. Lifting device 200 may be a linear jack. Lifting device 200 may generally comprise an outer tube 210, a high speed assembly 202, and a low speed assembly 204. High speed assembly 202 may generally comprise a screw mechanism comprising a rotating nut threadedly coupled to a translating screw, in the manner of a leadscrew or jack screw. In various embodiments, high speed assembly 202 comprises a rotating first sleeve 220 (also referred to herein as a high speed outer sleeve or a first sleeve), and a translating second sleeve 230 (also referred to herein as a high speed inner sleeve or a second sleeve). Low speed assembly 204 may generally comprise a screw mechanism comprising a rotating nut threadedly coupled to a translating screw. Low speed assembly 204 may comprise a rotating third sleeve 240 (also referred to herein as a low speed outer sleeve or a third sleeve), and a translating screw 250 (also referred to herein as a low speed inner sleeve).

Figures 15A, 15B:
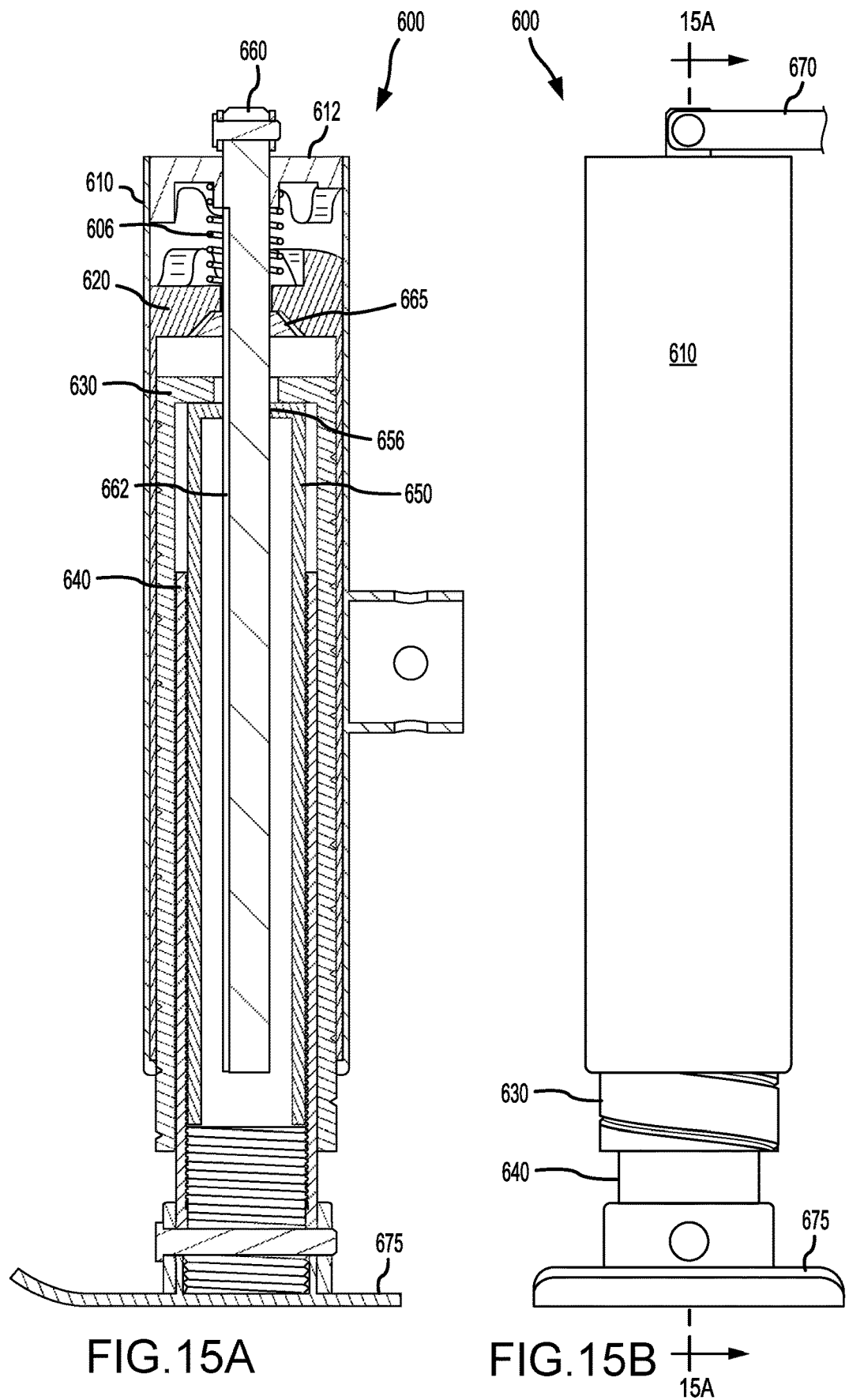
FIG. 15A and FIG. 15B illustrate a section view and a side view, respectively, of a lifting device comprising a low speed assembly comprising a rotating screw and a translating nut, in accordance with various embodiments.
Figure 16:
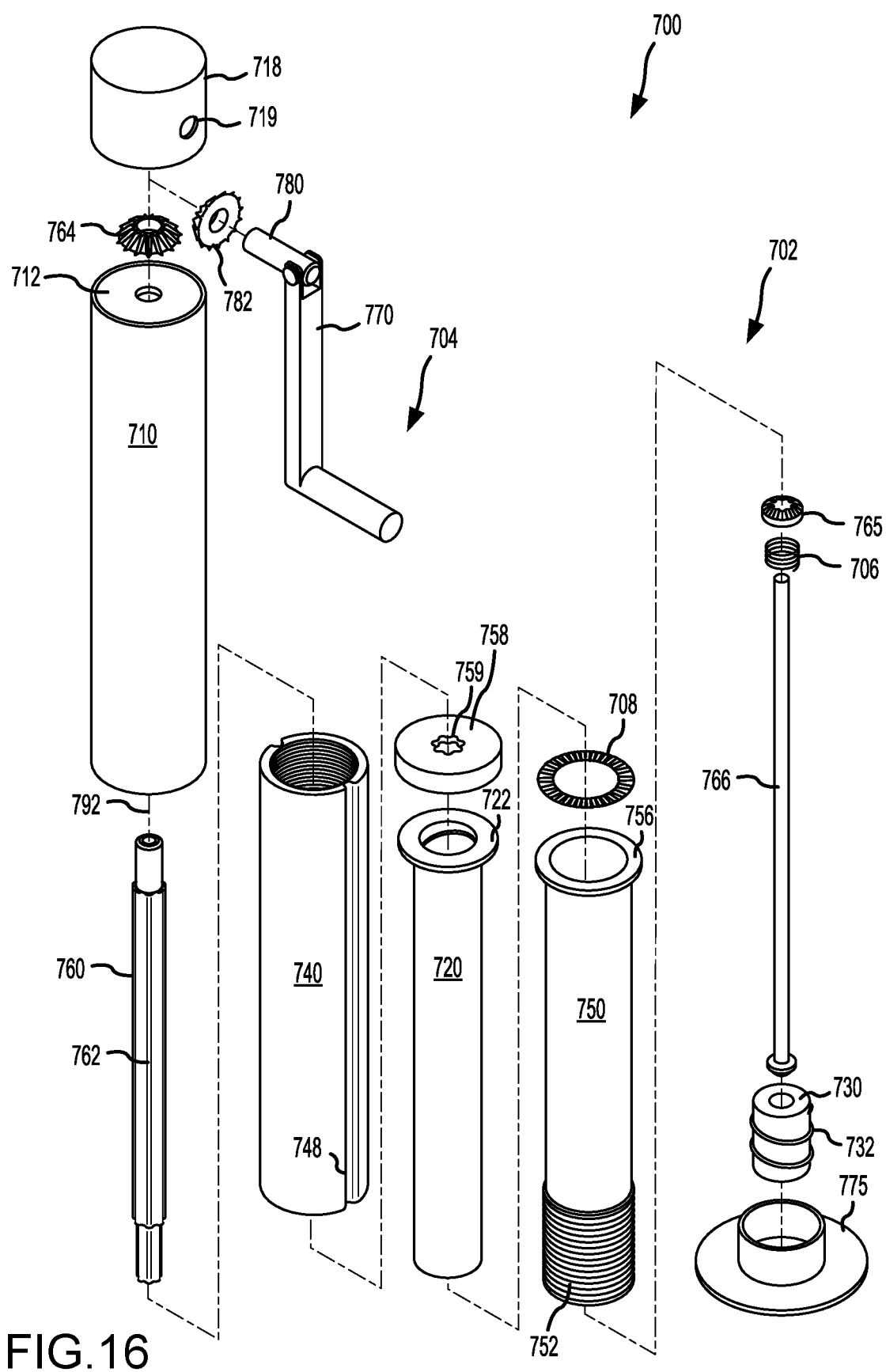
FIG. 16 illustrates an exploded view of a lifting device comprising a high speed assembly nested within a low speed assembly, in accordance with various embodiments.

Although the present disclosure is described in accordance with various embodiments on the basis of a screw mechanism having a rotating nut and a translating screw, it should be understood that the present disclosure can be applied with a rotating screw and a translating nut, as illustrated in FIG. 15A and/or FIG. 16, for example.

Outer tube 210 may comprise a centerline axis 292. Outer tube 210 may be hollow. First sleeve 220 may be disposed at least partially within outer tube 210. First sleeve 220 may be hollow. Second sleeve 230 may be disposed at least partially within first sleeve 220. Second sleeve 230 may be hollow. Third sleeve 240 may be disposed at least partially within second sleeve 230. Third sleeve 240 may be hollow. Translating screw 250 may be disposed at least partially within third sleeve 240. Translating screw 250 may be hollow. Lifting device 200 may further comprise a shaft 260. Shaft 260 may be disposed at least partially within translating screw 250. In this regard, the inner diameter of outer tube 210 may be greater than the outer diameter of first sleeve 220. The inner diameter of first sleeve 220 may be greater than the outer diameter of second sleeve 230. The inner diameter of second sleeve 230 may be greater than the outer diameter of third sleeve 240. The inner diameter of third sleeve 240 may be greater than the outer diameter of translating screw 250. The inner diameter of translating screw 250 may be greater than the outer diameter, or width, of shaft 260. Outer tube 210, first sleeve 220, second sleeve 230, third sleeve 240, translating screw 250, and shaft 260 are coaxially aligned and/or substantially coaxially aligned, but in various embodiments coaxial alignment is not present. One end of shaft 260 may bear a handle 270 which may be used for rotating the shaft 260.

Lifting device 200 may further comprise a gear 265. Gear 265 may be coupled to, and rotate with, shaft 260. Gear 265 may be coaxially aligned with shaft 260. Shaft 260 may drive first sleeve 220 via gear 265 in response to first sleeve 220 moving to a first position, as described in further detail herein. Gear 265 may be splined to the shaft 260 but gear 265 may also be fixedly coupled such as through welding, brazing, a press fit and/or an interference fit. Gear 265 may comprise any suitable gear, for example, a bevel gear or a crown gear.

Lifting device 200 may further comprise a spring 206. Spring 206 may be a coil spring, leaf spring, Belleville spring, or other suitable spring for exerting a bias against first sleeve 220. Spring 206 may be operatively coupled to first sleeve 220, to assist movement of first sleeve 220 between the first position and a second position, as described herein with further detail. In this regard, first sleeve 220 may be slidable in the outer tube 210 between the first position and the second position. First sleeve 220 may translate along centerline axis 292 between the first position and the second position. The outer tube 210 may comprise a retaining member 212. Retaining member 212 may be coupled to outer tube 210, e.g., via a threaded connection, fasteners, and/or a metal joining process, such as welding, brazing, etc. Retaining member 212 may comprise a cap structure coupled to the upper end of outer tube 210. Retaining member 212 may comprise a flange extending radially inward from an inner diameter surface of outer tube 210. Shaft 260 may extend through retaining member 212. Retaining member 212 may retain spring 206 within outer tube 210. In this regard, spring 206 may be compressed between retaining member 212 and first sleeve 220. In various embodiments, retaining member 212 comprises a mating surface 214 configured to engage with a mating surface 224 of first sleeve 220 in response to first sleeve 220 moving to the second position (see FIG. 4F). In this manner, first sleeve 220 may be restricted from rotating within outer tube 210 in the second position. In various embodiments, and as shown, mating surface 224 and mating surface 214 are crenulated and, as shown, having crenulations that are complementary to one another. The crenulations interact, in response to axial compression, to transfer torque to first sleeve 220.

In various embodiments, first sleeve 220 is threadedly coupled to second sleeve 230. Thus, rotation of the first sleeve 220 causes the second sleeve 230 to translate with respect to outer tube 210. Stated differently, high speed assembly 202 translates rotational motion of first sleeve 220 to linear motion of second sleeve 230. In various embodiments, third sleeve 240 is threadedly coupled to translating screw 250. Thus, rotation of the third sleeve 240 causes the translating screw 250 to translate with respect to outer tube 210. Stated differently, low speed assembly 204 translates rotational motion of third sleeve 240 to linear motion of translating screw 250.

Various components of lifting device 200 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, or any other suitable metal or metal alloy. In this regard, outer tube 210, first sleeve 220, second sleeve 230, third sleeve 240, and translating screw 250 may be made from a metal or metal alloy. It is contemplated that various components of lifting device 200, such as outer tube 210, may be made from a fiber-reinforced composite material.

With combined reference to FIG. 2, FIG. 3A, and FIG. 3B, shaft 260 may be operatively coupled to third sleeve 240 such that third sleeve 240 rotates with shaft 260. In various embodiments, shaft 260 may comprise one or more splines 262 and third sleeve 240 may comprise a center aperture 242 comprising a geometry that is complementary to shaft 260. In this regard, center aperture 242 may comprise one or more grooves configured to receive the one or more splines 262 of shaft 260 such that shaft 260 interlocks with third sleeve 240 to impart rotational forces (i.e., torque) therebetween. Stated differently, third sleeve 240 and shaft 260 may be coupled via a splined connection. Third sleeve 240 may be drivably coupled to shaft 260 via center aperture 242. Furthermore, although illustrated as a star shaped aperture, center aperture 242 may comprise various geometries, such as triangular, square, or any other geometry that interlocks shaft 260 with third sleeve 240. However, shaft 260 may be operatively coupled to third sleeve 240 using various methods without departing from the scope and spirit of the present disclosure, such as via a fastener, for example.

In operation, rotation of shaft 260 in a first rotational direction, e.g., via handle 270, causes third sleeve 240 to rotate with respect outer tube 210 and translating screw 250, which in turn causes translating screw 250 to extend from third sleeve 240 (see FIG. 4E and FIG. 4F). Conversely, rotation of shaft 260 in a second rotational direction (opposite the first rotational direction) causes third sleeve 240 to rotate with respect outer tube 210 and translating screw 250, which in turn causes translating screw 250 to retract into third sleeve 240 (see FIG. 4A and FIG. 4B).

Furthermore, with first sleeve 220 in a first position (see FIG. 4A through FIG. 4D) with respect to outer tube 210, first sleeve 220 may be drivably coupled to shaft 260. Stated differently, rotation of shaft 260 may drive rotation of first sleeve 220. In operation, and with first sleeve 220 in a first position (see FIG. 4A through FIG. 4D) with respect to outer tube 210 and/or gear 265, rotation of shaft 260 in a first rotational direction, e.g., via handle 270, may cause first sleeve 220 to rotate with respect outer tube 210 and second sleeve 230, which in turn causes second sleeve 230 to extend from first sleeve 220. Conversely, rotation of shaft 260 in a second rotational direction (opposite the first rotational direction) may cause first sleeve 220 to rotate with respect outer tube 210 and second sleeve 230, which in turn causes second sleeve 230 to retract into first sleeve 220. In the first position, spring 206 may bias first sleeve 220 to engage with gear 265. Thus, with the first sleeve 220 in the first position, both the second sleeve 230 and the translating screw 250 are driven to translate with respect to outer tube 210 in response to rotation of shaft 260.

However, in operation and with first sleeve 220 in a second position (see FIG. 4E and FIG. 4F) with respect to outer tube 210 and/or gear 265, the first sleeve 220 is disengaged from gear 265 (i.e., rotation of shaft 260 and gear 265 does not drive rotation of first sleeve 220 in the disengaged position). In this regard, with first sleeve 220 in the second position, rotation of shaft 260 in the first rotational direction or the second rotational direction may cause only third sleeve 240 (and not first sleeve 220) to rotate with respect to outer tube 210 and translating screw 250, thereby driving only the translating screw 250 to translate. Stated differently, the high speed assembly 202 (i.e., the first sleeve 220 and second sleeve 230) may be disengaged from operation in response to the first sleeve 220 moving to the second position. In this manner, in response to rotation of shaft 260 in the first direction, both the high speed assembly 202 and the low speed assembly 204 (i.e., the third sleeve 240 and translating screw 250) are driven to increase the overall length of lifting device 200 but, after reacting force from the ground through, for example, foot 275, rotation of shaft 260 is only imparted to low speed assembly 204 and not high speed assembly 202. With momentary reference to FIG. 4E and FIG. 4F, as the overall length of lifting device 200 is increased, the foot 275 of the lifting device 200 may contact a ground surface 402, thereby imparting a force 404 from the ground surface 402 into the first sleeve 220 which causes the first sleeve 220 to move with respect to outer tube 210 against the bias of spring 206 from the first position (i.e., engaged with gear 265) to the second position (i.e., disengaged from gear 265) thereby decoupling first sleeve 220 from torsional forces imparted by shaft 260. In this regard, before the lifting device 200 has contacted a ground surface, the overall length of the lifting device 200 is quickly increased to reduce the overall number of rotations of shaft 260 needed to cause lifting device 200 to reach the ground. In response to contacting the ground, the high speed assembly 202 is decoupled from the shaft 260 to take advantage of the mechanical advantage of the low speed assembly 204. In this manner, time to operate is reduced relative to conventional designed and increased mechanical advantage is selectively activated.

In various embodiments, second sleeve 230 comprises helically extending grooves or threads 232. In various embodiments, translating screw 250 comprises helically extending grooves and/or threads 252. The thread pitch of threads 232 may be greater than the thread pitch of threads 252. Stated differently, translating screw 250 may comprise more threads per inch (TPI) than second sleeve 230. In various embodiments, the thread pitch of threads 232 is between 101% and 1000% as large as the thread pitch of threads 252, though various embodiments, the thread pitch of threads 232 is between 200% and 500% as large as the thread pitch of threads 252. In various embodiments, the thread pitch of threads 232 is more than twice as large as the thread pitch of threads 252. In various embodiments, the thread pitch of threads 232 is more than three times as large as the thread pitch of threads 252. In various embodiments, the thread pitch of threads 232 is more than four times as large as the thread pitch of threads 252. It should be understood that the maximum thread pitch may be limited by the moment arm for torque applied to the shaft 260 and may be limited to reduce the torque requirement for rotating shaft 260 below a desired threshold. In this manner, the high speed assembly translates further and faster per rotation of shaft 260 than the low speed assembly, causing the lifting device 200 to reach a ground surface faster than if the high speed assembly were not present. Furthermore, in response to the lifting device 200 contacting a ground surface and the high speed assembly disengaging from the shaft 260, the reduced thread pitch of the low speed assembly takes advantage of the reduced torque required for extending the lifting device 200.

The thread pitch of threads 232 may be between 0.1 millimeters (mm) and 304.8 mm (between 0.0039 inches and 12 inches) in accordance with various embodiments, between 1 mm and 101.6 mm (between 0.039 inches and 4 inches) in accordance with various embodiments, between 2 mm and 76.2 mm (between 0.0787 inches and 3 inches) in accordance with various embodiments, and/or between 4 mm and 50.8 mm (between 0.157 inches and 2 inches) in accordance with various embodiments.

The thread pitch of threads 252 may be between 0.1 millimeters (mm) and 279.4 mm (between 0.0039 inches and 11 inches) in accordance with various embodiments, between 1 mm and 25.4 mm (between 0.039 inches and 1 inch) in accordance with various embodiments, between 1 mm and 6.35 mm (between 0.039 inches and 0.25 inches) in accordance with various embodiments, and/or between 2 mm and 3.175 mm (between 0.0787 inches and 0.125 inches) in accordance with various embodiments.

With reference to FIG. 2 and FIG. 4B, second sleeve 230 may be keyed to outer tube 210 to prevent rotation of second sleeve 230 with respect to outer tube 210. For example, second sleeve 230 may comprise one or more axially extending grooves 234 (see FIG. 2) disposed in the outer diameter surface thereof and outer tube 210 may comprise corresponding protrusion(s) 216 extending radially inwards from an inner diameter surface thereof that extends into groove(s) 234.

With reference to FIG. 5A and FIG. 5B, the lifting device of FIG. 4A with the outer tube, spring, and retaining member omitted is illustrated, in accordance with various embodiments. In various embodiments, translating screw 250 may be keyed to second sleeve 230 to prevent rotation of translating screw 250 with respect to second sleeve 230 and outer tube 210. For example, translating screw 250 may comprise one or more axially extending grooves 254 (see FIG. 2) disposed in the outer diameter surface thereof and second sleeve 230 may comprise corresponding protrusion(s) 236 extending radially inwards from an inner diameter surface thereof that extends into groove(s) 254.

With reference to FIG. 6A and FIG. 6B, the lifting device of FIG. 5A with the first sleeve 220 further omitted is illustrated, in accordance with various embodiments. Gear 265 may be slid onto shaft 260 just above second sleeve 230, in accordance with various embodiments. Second sleeve 230 may comprise a flange 238 at an upper end thereof extending radially inward to form an end wall through which shaft 260 extends. Furthermore, an upper end of third sleeve 240 may abut flange 238.

Figures 7A, 7B:
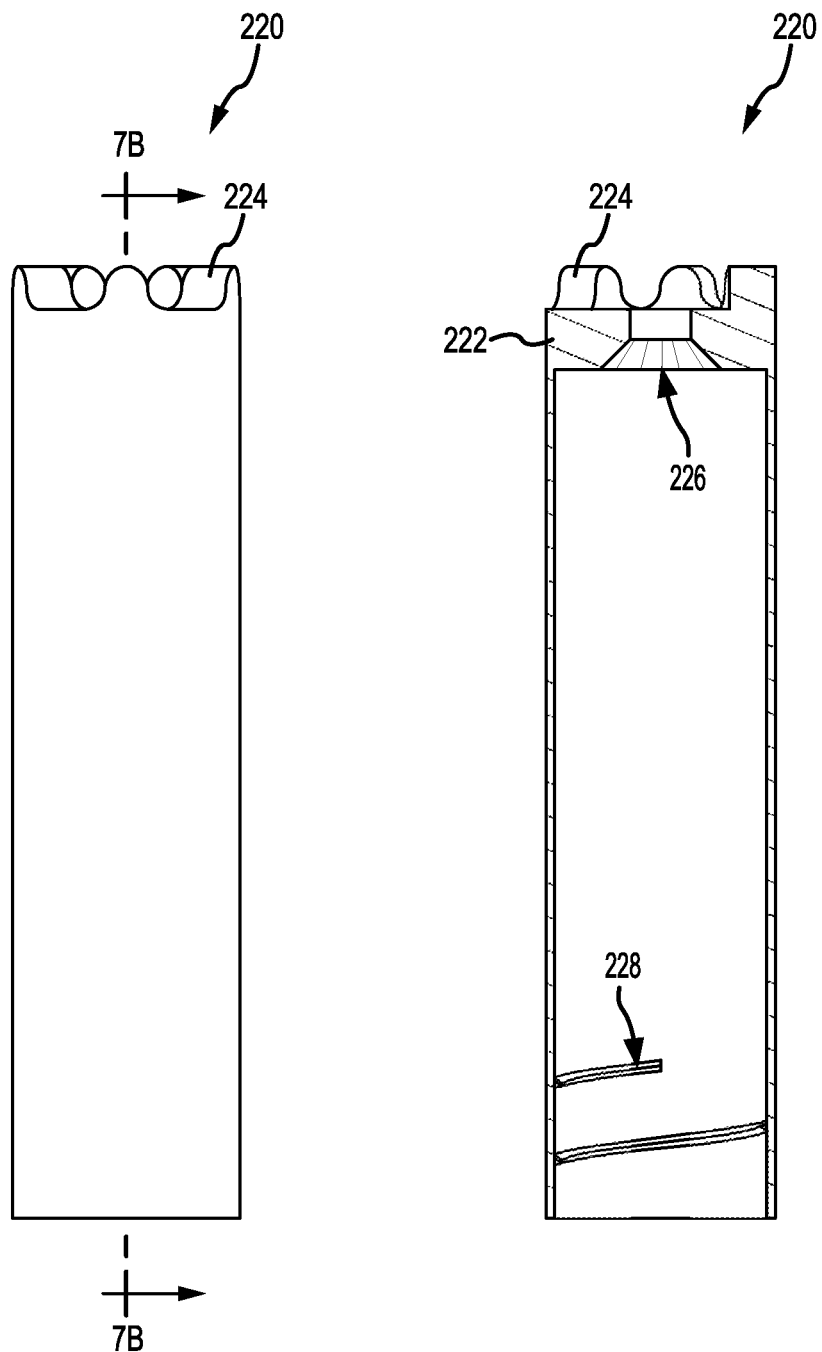
FIG. 7A and FIG. 7B illustrate a side view and a section view, respectively, of the high speed sleeve of FIG. 2, in accordance with various embodiments.

With reference to FIG. 7A and FIG. 7B, high speed first sleeve 220 is illustrated, in accordance with various embodiments. First sleeve 220 may comprise a radially inward extending flange 222 forming an end wall at the upper end of first sleeve 220. Shaft 260 (see FIG. 5B) may extend through flange 222. First sleeve 220 may comprise a plurality of teeth 226. Plurality of teeth 226 may be disposed on flange 222. Plurality of teeth 226 may be in meshing relationship with gear 265 (see FIG. 4B) in response to first sleeve 220 moving to the first position whereby shaft 260 may be drivably coupled to shaft 260. Plurality of teeth 226 may further comprise crenulations to complement gear 265, in various embodiments. First sleeve 220 may comprise helically extending ridges 228 (also referred to herein as threads). Threads 228 may be disposed on an inner diameter surface of first sleeve 220. Threads 228 may engage with complementary threads 232 (See FIG. 2) disposed on second sleeve 230. Threads 228 and threads 232 may assist in translating rotational motion of first sleeve 220 into linear motion of second sleeve 230.

Figure 8A:
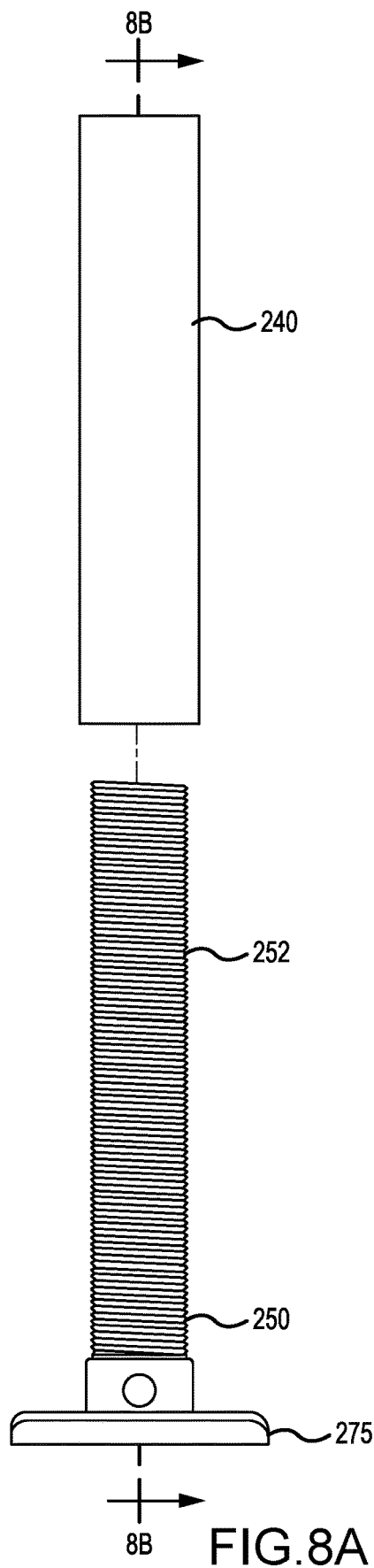
FIG. 8A and FIG. 8B illustrate a side view and a section view, respectively, of a partially exploded view of the low speed assembly of the lifting device of FIG. 2, in accordance with various embodiments.
Figure 8B:
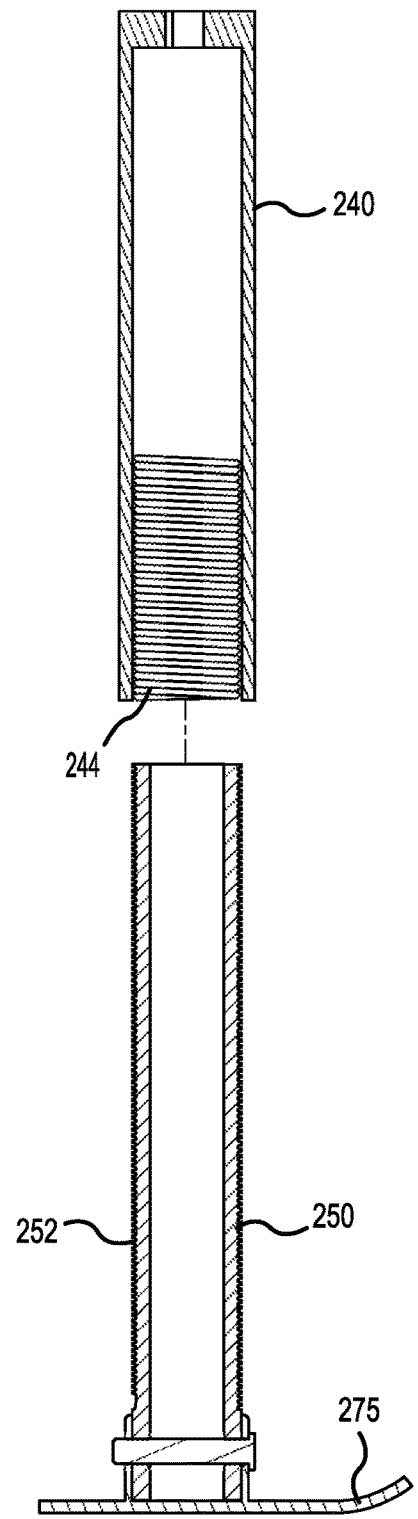

With reference to FIG. 8A and FIG. 8B, low speed assembly 204 is illustrated, in accordance with various embodiments. Third sleeve 240 may comprise helically extending ridges 244 (also referred to herein as threads). Threads 244 may be disposed on an inner diameter surface of third sleeve 240. Threads 244 may engage with complementary threads 252 disposed on translating screw 250. Threads 244 and threads 252 may assist in translating rotational motion of third sleeve 240 into linear motion of translating screw 250.

Figure 9A:
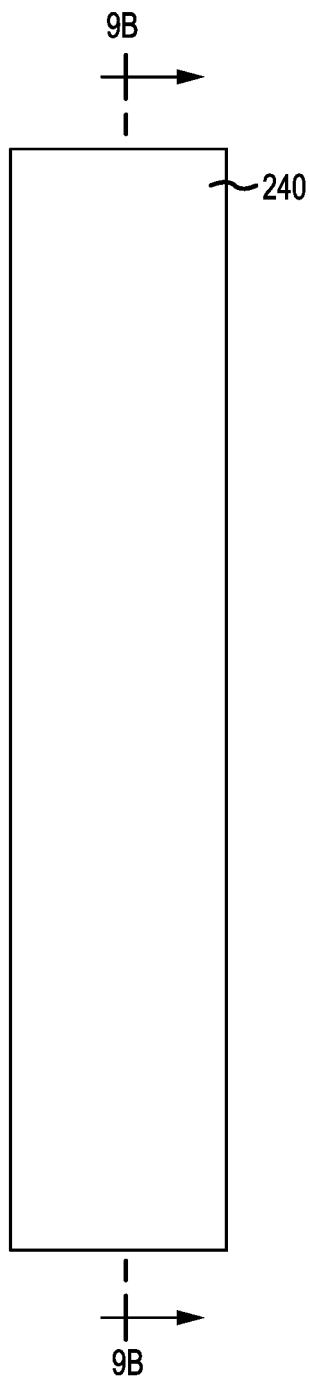
FIG. 9A, FIG. 9B, and FIG. 9C illustrate a side view, a section view, and a perspective view, respectively, of the low speed sleeve of FIG. 2, in accordance with various embodiments.
Figure 9B:
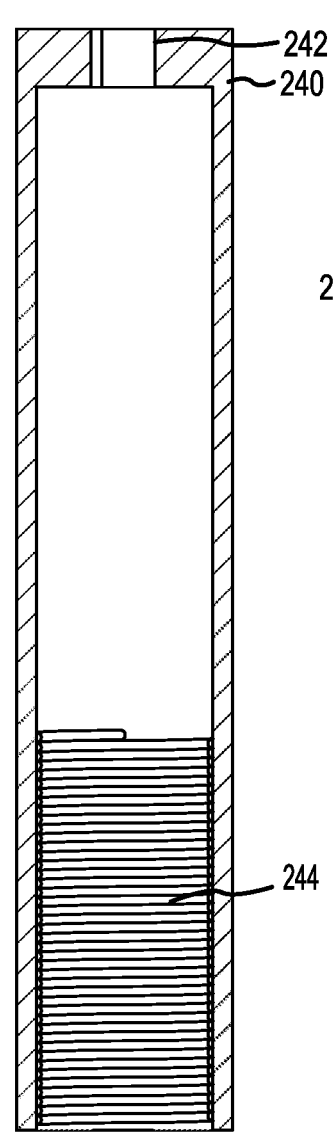
Figure 9C:
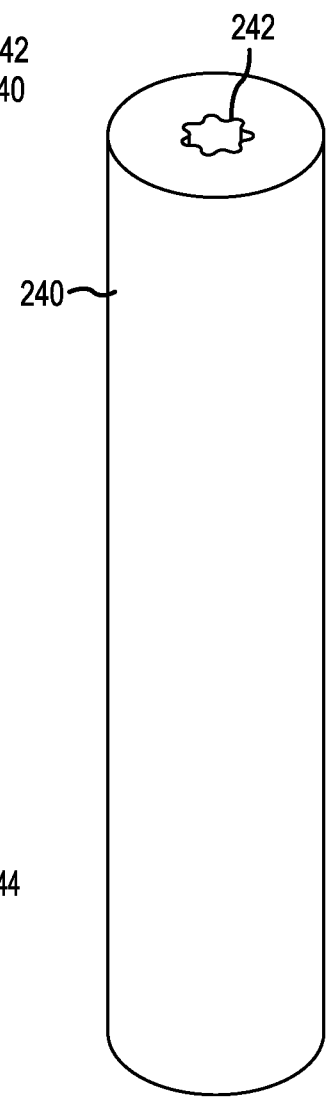

With reference to FIG. 9A, FIG. 9B, and FIG. 9C, low speed outer sleeve 240 is illustrated, in accordance with various embodiments. Third sleeve 240 may comprise a radially inward extending flange 246 forming an end wall at the upper end of third sleeve 240. Center aperture 242 may be disposed in flange 246. Shaft 260 (see FIG. 5B) may extend through flange 246.

Figures 10A, 10B:
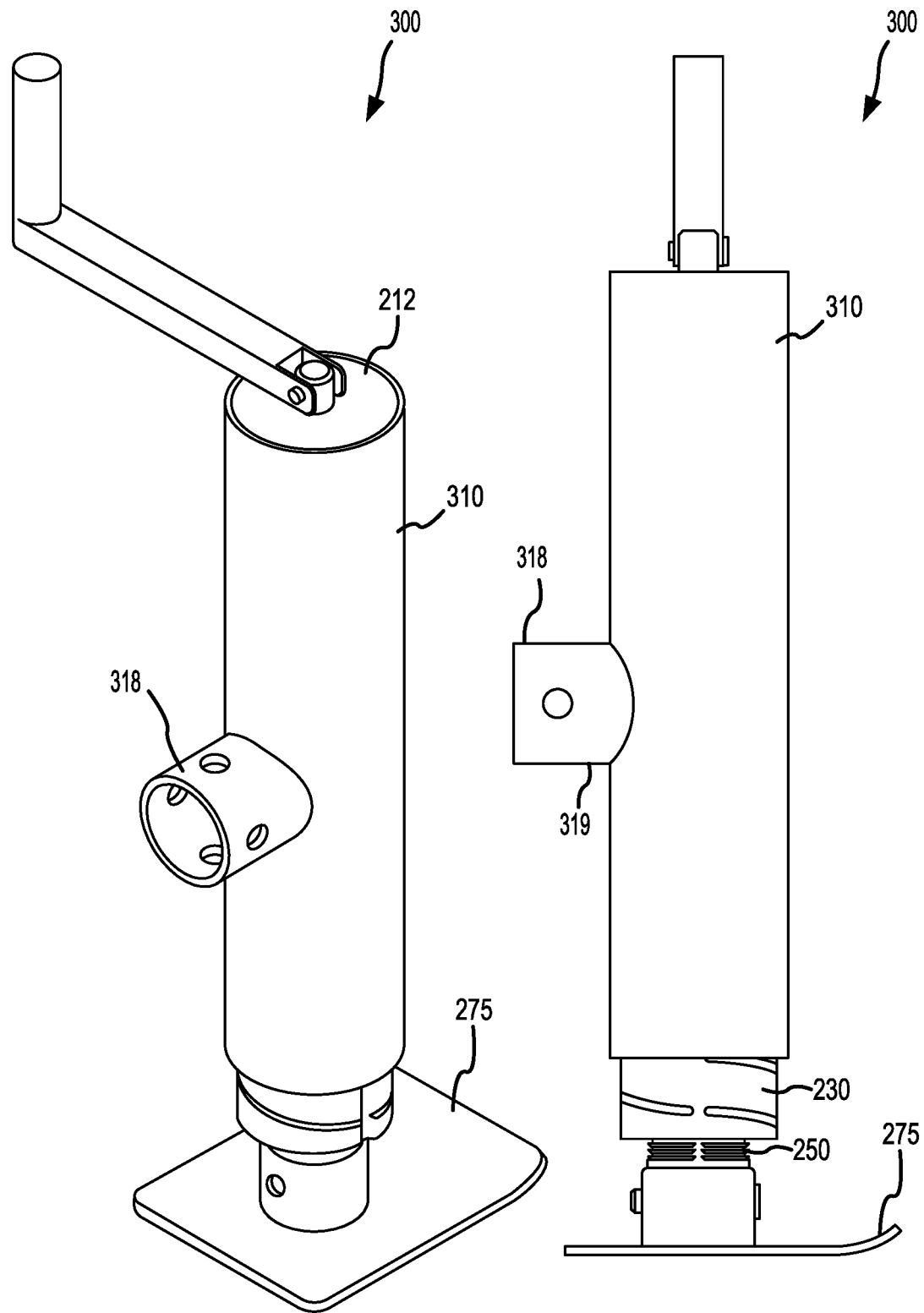
FIG. 10A and FIG. 10B illustrate a perspective view and a side view, respectively, of a lifting device comprising an attachment feature, in accordance with various embodiments.

With respect to FIG. 10A and FIG. 10B, elements with like element numbering, as depicted in FIG. 2, are intended to be the same and will not necessarily be repeated for the sake of clarity.

With reference to FIG. 10A and FIG. 10B, a lifting device 300 with an attachment feature 318 coupled to the outer tube 310 is illustrated, in accordance with various embodiments. Lifting device 300 may be similar to lifting device 200 of FIG. 2. Lifting device 300 may be attached to a trailer (e.g., trailer 120 of FIG. 1) via attachment feature 318. In this manner, outer tube 310 may be substantially fixed to the trailer during operation, thereby preventing rotation of outer tube 310 and supporting the trailer. Attachment feature 318 may comprise a tube 319 coupled to the outer diameter surface of outer tube 310 for attaching the lifting device 300 to a trailer in a known manner. Tube 319 may be oriented substantially perpendicular with respect to outer tube 310. Tube 319 may provide a pivot connection between lifting device 300 and a trailer or vehicle to allow lifting device 300 to be rotated between a stowed position and a deployed position.

Figure 11A:
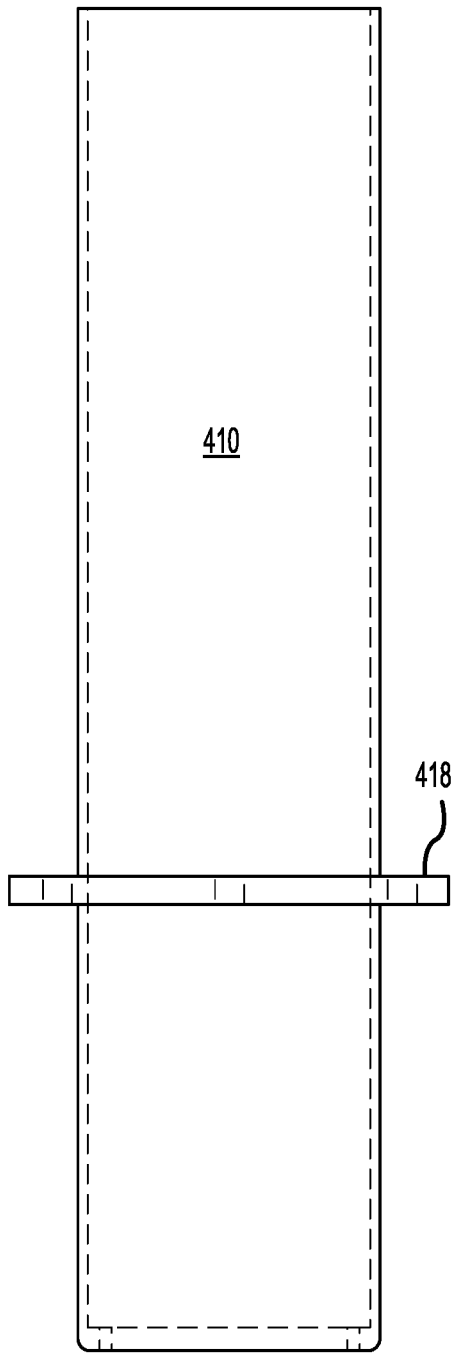
FIG. 11A and FIG. 11B illustrate a section view and a perspective view, respectively, of an outer tube of a lifting device comprising an attachment feature for attaching the lifting device to a trailer, in accordance with various embodiments.
Figure 11B:
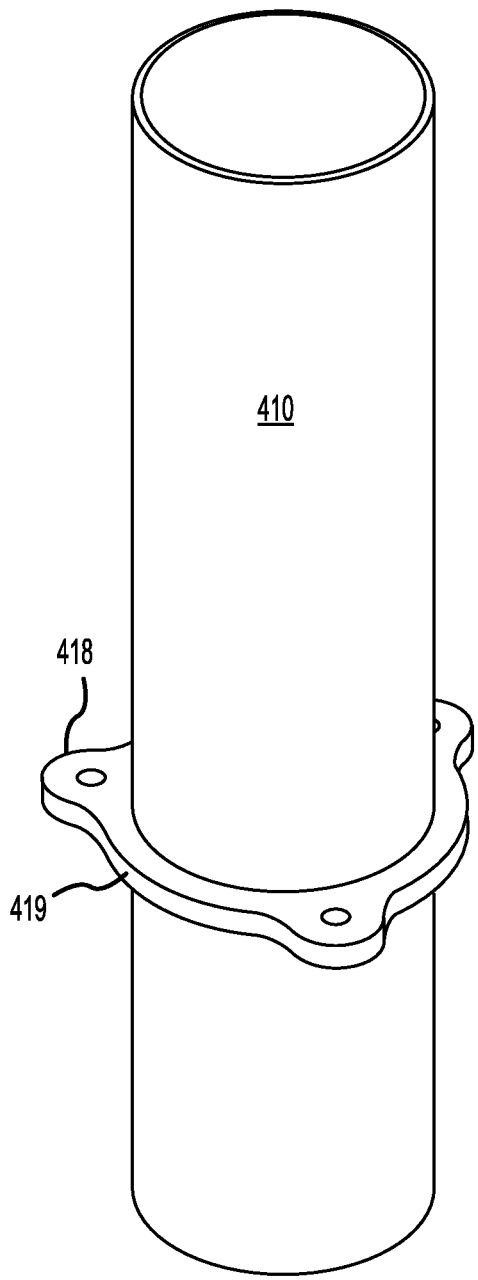

With reference to FIG. 11A and FIG. 11B, an outer tube 410 comprising an attachment feature 418 is illustrated, in accordance with various embodiments. Outer tube 410 may be similar to outer tube 210 of FIG. 2. Attachment feature 418 may comprise a collar 419 coupled to an surrounding the outer diameter surface of outer tube 410. Collar 419 may comprise a plurality of apertures for coupling collar 419 to a trailer or vehicle via a plurality of fasteners, such as bolts, in a known manner. Collar 419 may be coupled to outer tube 410 via a metal joining process, such as welding for example. In various embodiments, outer tube 410 may be welded directly to a trailer or vehicle, without the use of a dedicated attachment feature.

Figure 12:
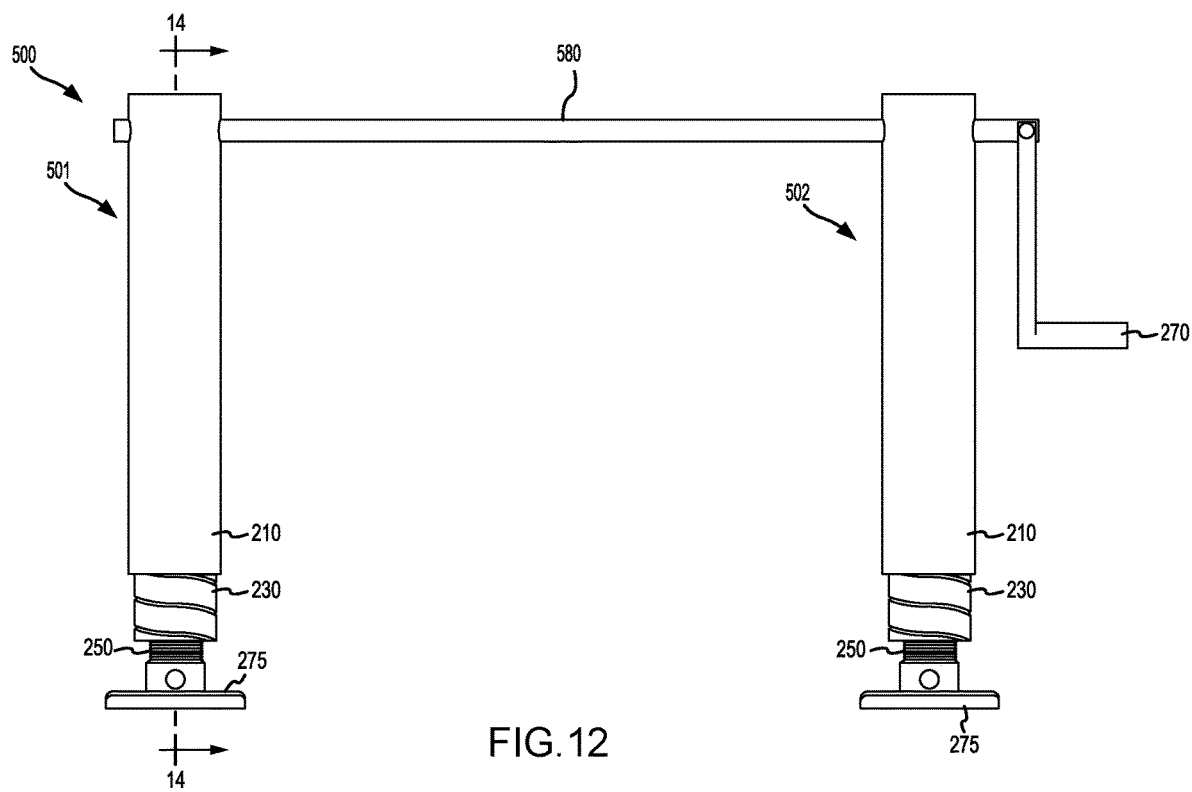
FIG. 12 illustrates a landing gear assembly having two lifting devices, in accordance with various embodiments.

With respect to FIG. 12, elements with like element numbering, as depicted in FIG. 2, are intended to be the same and will not necessarily be repeated for the sake of clarity.

Figure 13A:
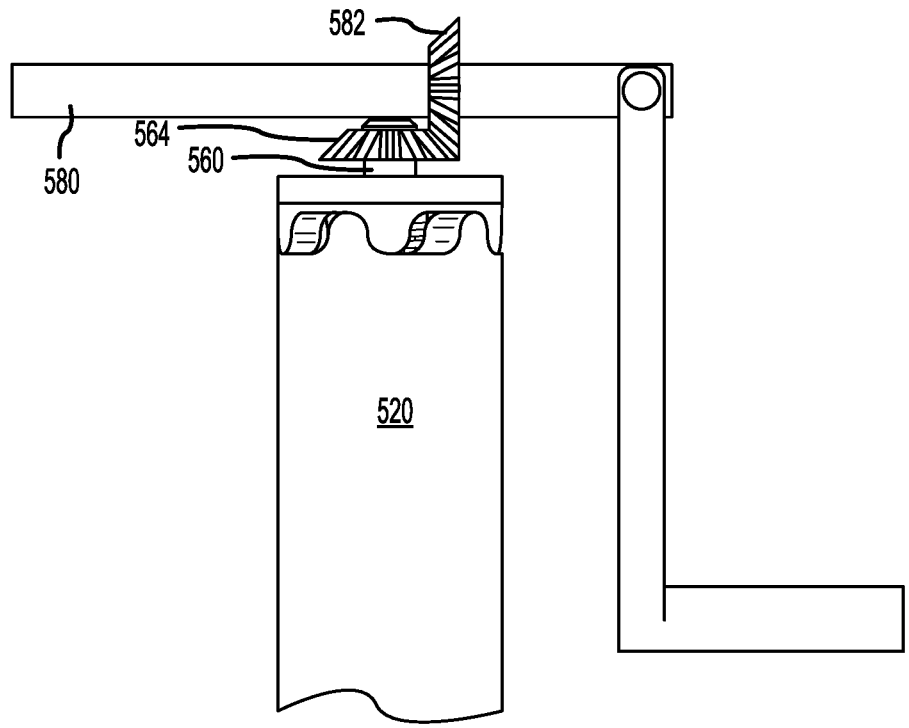
FIG. 13A and FIG. 13B illustrate a lifting device for the landing gear assembly of FIG. 12 with an sleeve of the lifting device in a first position and a second position, respectively, and comprising a shaft driven by a crank with the outer tube removed for clarity purposes, in accordance with various embodiments.
Figure 13B:
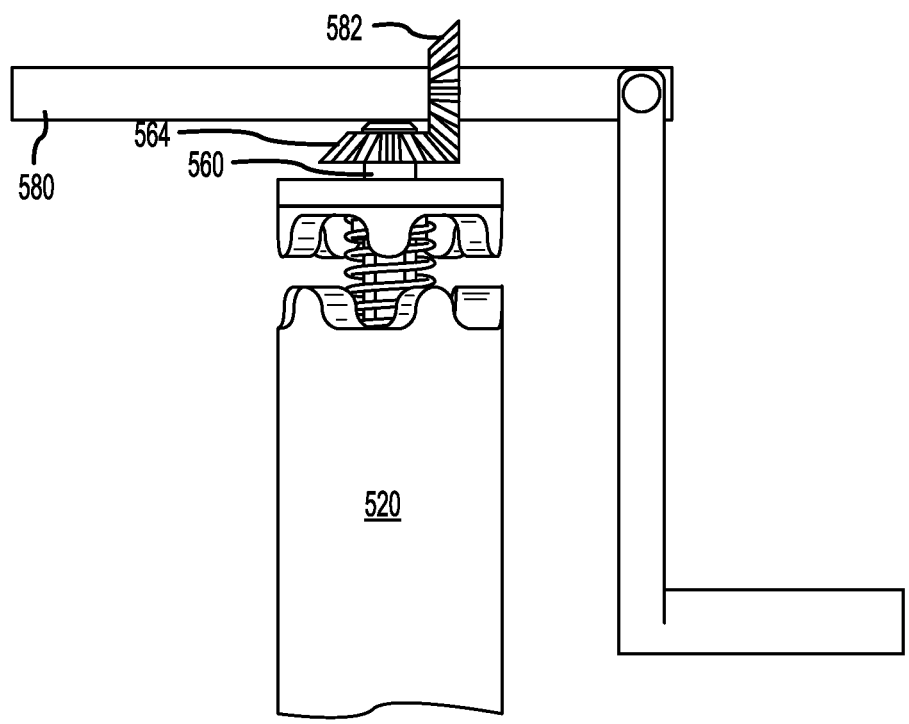

With reference to FIG. 12, a trailer landing gear assembly 500 is illustrated, in accordance with various embodiments. Some trailers may use landing gear, generally comprising a pair of retractable legs, at the front end of the trailer to support said front end when the trailer is to be detached from a truck or tractor. Landing gear assembly 500 has a driven crank 580 which passes through the upper ends of a pair of telescoping, vertical legs or lifting devices 501, 502. With additional reference to FIG. 13A and FIG. 13B, each lifting device 501, 502 may be similar to lifting device 200 of FIG.

2, except that the upper end of the shaft 560 of the lifting device bears a gear 564 (also referred to herein as a second gear) in meshing relation with a gear 582 (also referred to herein as a third gear) disposed on the crank 580. In this manner, rotation of crank 580 drives rotation of shaft 560. Crank 580 is disposed substantially perpendicular with respect to shaft 560. Gear 564 may be a bevel gear. Gear 582 may be a bevel gear. However, other types of gears known for connecting perpendicularly disposed rods may be used without departing from the spirit and scope of the present disclosure.

Figure 14:
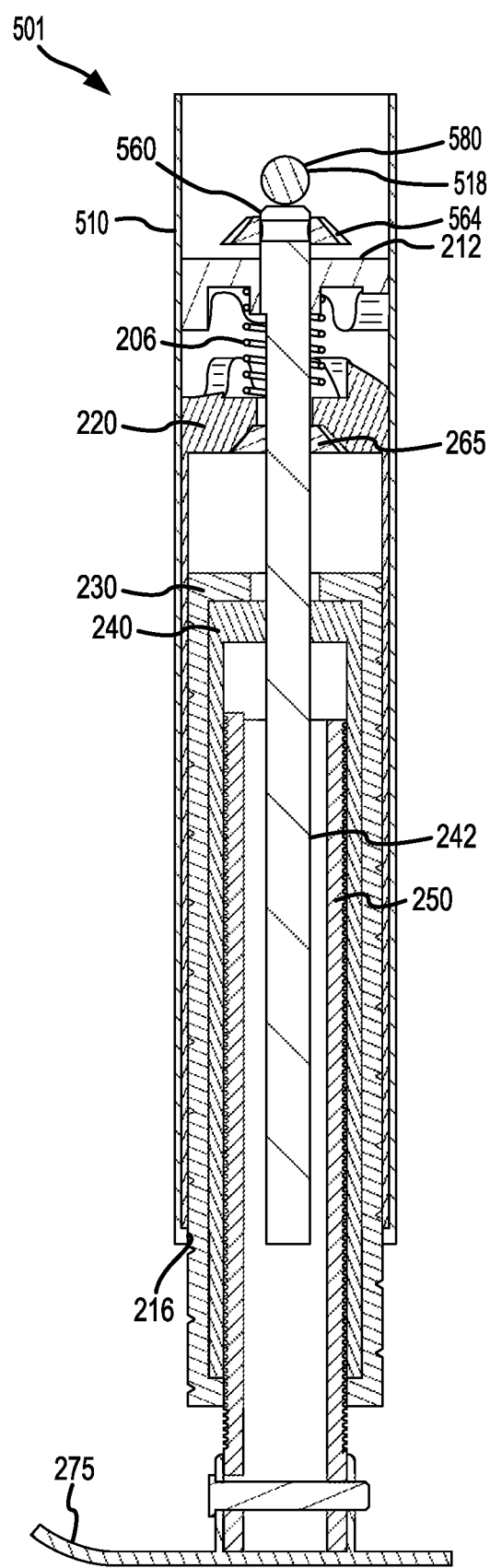
FIG. 14 illustrates a section view of one of the lifting devices of FIG. 12, in accordance with various embodiments.

With reference to FIG. 14, a cross-section view of lifting device 501 is illustrated, in accordance with various embodiments. Outer tube 510 may comprise one or more aligned apertures 518 disposed in the upper end of outer tube 510 through which crank 580 extends.

With reference to FIG. 15A and FIG. 15B, a lifting device 600 is illustrated, in accordance with various embodiments. Lifting device 600 may be similar to lifting device 200 (e.g., see FIG. 2 and FIG. 4B), except that, instead of the low speed assembly having a rotating sleeve and a translating screw, the low speed assembly of lifting device 600 has a rotating screw 650 and a translating sleeve 640.

Lifting device 600 may comprise a shaft 660 operatively coupled to rotating screw 650 such that rotating screw 650 rotates with shaft 660. In various embodiments, shaft 660 may comprise one or more splines 662 and rotating screw 650 may comprise a center aperture 656 comprising a geometry that is complementary to shaft 660. In this regard, center aperture 656 may comprise one or more grooves configured to receive the one or more splines 662 of shaft 660 such that shaft 660 interlocks with rotating screw 650 to impart rotational forces (i.e., torque) therebetween. Stated differently, aperture 656 and shaft 660 may be coupled via a splined connection. Rotating screw 650 may be drivably coupled to shaft 660 via center aperture 656. Center aperture 656 may comprise various geometries, such as triangular, square, or any other geometry that interlocks shaft 660 with rotating screw 650. Shaft 660 may be operatively coupled to rotating screw 650 using various methods without departing from the scope and spirit of the present disclosure, such as via a fastener, for example.

In operation, rotation of shaft 660 in a first rotational direction, e.g., via handle 670, causes rotating screw 650 to rotate with respect to outer tube 610 and translating sleeve 640, which in turn causes translating sleeve 640 to extend from rotating screw 650. Conversely, rotation of shaft 660 in a second rotational direction (opposite the first rotational direction) causes rotating screw 650 to rotate with respect to outer tube 610 and translating sleeve 640, which in turn causes translating sleeve 640 to retract into outer tube 610.

With reference to FIG. 16, an exploded view of a lifting device 700 is illustrated, in accordance with various embodiments. Lifting device 700 may be a linear jack. Lifting device 700 may operate similar to lifting device 200, except that instead of comprising a low speed assembly nested within a high speed assembly, lifting device 700 of FIG. 16 comprises a high speed assembly 702 nested within a low speed assembly 704.

Lifting device 700 may generally comprise an outer tube 710, a high speed assembly 702, and a low speed assembly 704. High speed assembly 702 may generally comprise a screw mechanism comprising a rotating screw threadedly coupled to a translating nut. In various embodiments, high speed assembly 702 comprises a translating sleeve 720 (also referred to herein as a high speed outer sleeve or a first sleeve), and a rotating screw 730 (also referred to herein as a high speed inner sleeve, or a rotating inner sleeve). Low speed assembly 704 may generally comprise a screw mechanism comprising a rotating screw threadedly coupled to a translating nut. Low speed assembly 704 may comprise a translating sleeve 740 (also referred to herein as a low speed outer sleeve), and a rotating sleeve 750 (also referred to herein as a low speed inner sleeve).

Outer tube 710 may comprise a centerline axis 792. Outer tube 710 may be hollow. Sleeve 740 may be disposed at least partially within outer tube 710. Sleeve 740 may be hollow. Sleeve 750 may be disposed at least partially within sleeve 740. Sleeve 750 may be hollow. Sleeve 720 may be disposed at least partially within sleeve 750. Sleeve 720 may be hollow. Rotating screw 730 may be disposed at least partially within sleeve 720. Rotating screw 730 may be hollow. Lifting device 700 may further comprise a shaft 760 (also referred to herein as a first shaft). Shaft 760 may be hollow. Lifting device 700 may further comprise a shaft 766 (also referred to herein as a second shaft). Shaft 760 may be disposed at least partially within rotating screw 730. Shaft 766 may be disposed at least partially within shaft 760. Shaft 766 may be disposed at least partially within rotating screw 730. In this regard, the inner diameter of outer tube 710 may be greater than the outer diameter of sleeve 740. The inner diameter of sleeve 740 may be greater than the outer diameter of sleeve 750. The inner diameter of sleeve 750 may be greater than the outer diameter of sleeve 720. The inner diameter of sleeve 720 may be greater than the outer diameter of rotating screw 730. Outer tube 710, sleeve 740, sleeve 750, sleeve 720, rotating screw 730, shaft 760, and shaft 766 may be coaxially aligned.

Lifting device 700 may further comprise a gear 765. Gear 765 may be coupled to, and rotate with, shaft 760. Gear 765 may be coaxially aligned with shaft 760. Shaft 760 may drive rotating screw 730 via gear 765 in response to rotating screw 730 moving to a first position with respect to shaft 760, as described in further detail herein.

Lifting device 700 may further comprise a spring 706. Spring 706 may be operatively coupled to rotating screw 730, to assist movement of rotating screw 730 between the first position and a second position, as described herein in further detail. In this regard, rotating screw 730 may be slidable in the outer tube 210 between the first position and the second position. Rotating screw 730 may comprise a mating surface 734. Mating surface 734 may be in meshing relationship with gear 765 in response to rotating screw 730 moving to the first position, as illustrated in FIG. 17B. Mating surface 734 may comprise a plurality of teeth. Rotating screw 730 may comprise a flange 736 extending radially inward from an inner diameter surface of rotating screw 730. Mating surface 734 may be disposed on flange 736. Shaft 760 may extend through flange 736 of rotating screw 730. Rotating screw 730 may comprise a flange 737 extending radially inward from the inner diameter surface of rotating screw 730. Shaft 766 may extend through flange 737 of rotating screw 730. Spring 706 may be disposed between flange 736 and flange 737. Spring 706 may be compressed between flange 737 and gear 765. Rotating screw 730 may comprise a flange 738 extending radially inward from the inner diameter surface of rotating screw 730. Flange 737 may be disposed axially between and spaced apart from flange 736 and flange 738. Shaft 766 may be spaced apart from flange 738 of rotating screw 730 in response to rotating screw 730 moving to the first position, as illustrated in FIG. 17B. Shaft 766 may engage (i.e., may enter into contact with) flange 738 of rotating screw 730 in response to rotating screw 730 moving to the second position, as illustrated in FIG. 17D. In response to rotating screw 730 moving to the second position, shaft 766 may be in meshing relation with flange 738 to prevent rotation of rotating screw 730 with respect to shaft 766 and/or shaft 760. In this manner, rotating screw 730 may be restricted from rotating within outer tube 210 in the second position.

In various embodiments, rotating screw 730 is threadedly coupled to sleeve 720. Thus, rotation of the rotating screw 730 causes the sleeve 720 to translate with respect to outer tube 210. Stated differently, high speed assembly 702 translates rotational motion of rotating screw 730 to linear motion of sleeve 720. In various embodiments, sleeve 750 is threadedly coupled to sleeve 740. Thus, rotation of the sleeve 750 causes the sleeve 740 to translate with respect to outer tube 710. Stated differently, low speed assembly 204 translates rotational motion of sleeve 750 to linear motion of sleeve 740.

Sleeve 720 may comprise a flange 722 extending radially outward from an outer diameter surface of sleeve 720 at the upper end thereof. Sleeve 750 may comprise a flange 756 extending radially outward from an outer diameter surface of sleeve 750 at the upper end thereof. Sleeve 720 may rotate with respect to sleeve 750. A bearing 708 may be disposed between flange 722 and flange 756 to reduce friction between sleeve 720 and sleeve 750. Bearing 708 may comprise a thrust needle roller bearing or the like, in accordance with various embodiments.

In various embodiments, the upper end of the shaft 760 may bear a gear 764 in meshing relation with a gear 782 disposed on a crank 780. In this manner, rotation of crank 780 drives rotation of shaft 760. Crank 780 may be disposed substantially perpendicular with respect to shaft 760. Gear 764 may be a bevel gear. Gear 782 may be a bevel gear. However, other types of gears known for connecting perpendicularly disposed rods may be used without departing from the spirit and scope of the present disclosure. One end of crank 780 may bear a handle 770 which may be used for rotating the crank 780.

A radially inward extending flange 712 may be disposed at an upper end of outer tube 710. Shaft 760 may extend through flange 712. Shaft 760 may be at least partially supported by flange 712. Shaft 760 may comprise a shoulder which abuts flange 712. In this manner, flange 712 may prevent shaft 760 from translating within outer tube 710. A cap 718 may be coupled to the upper end of outer tube 710. Cap 718 may enclose gear 782 and gear 764. Cap 718 may comprise an aperture 719 through which crank 780 extends. Crank 780 may be supported by cap 718.

With combined reference to FIG. 16 and FIG. 17B, shaft 760 may be operatively coupled to sleeve 750 such that sleeve 750 rotates with shaft 760. In various embodiments, shaft 760 may comprise one or more splines 762 and sleeve 750 may comprise a center aperture 759 comprising a geometry that is complementary to shaft 760. In this regard, center aperture 759 may comprise one or more grooves configured to receive the one or more splines 762 of shaft 760 such that shaft 760 interlocks with sleeve 750 to impart rotational forces (i.e., torque) therebetween. Stated differently, aperture 759 and shaft 760 may be coupled via a splined connection. Sleeve 750 may be drivably coupled to shaft 760 via center aperture 759. Furthermore, although illustrated as a star shaped aperture, center aperture 759 may comprise various geometries, such as triangular, square, or any other geometry that interlocks shaft 760 with sleeve 750. However, shaft 760 may be operatively coupled to sleeve 750 using various methods without departing from the scope and spirit of the present disclosure, such as via a fastener, for example.

Sleeve 750 may comprise a cap 758 coupled to flange 756. Flange 722 may be installed in a gap formed between cap 758 and flange 756. Bearing 708 may similarly be installed in the gap formed between cap 758 and flange 756. Center aperture 759 may be disposed in cap 758. Cap 758 may be coupled to sleeve 750 via any suitable connection, including welding, fasteners, a threaded connection, etc.

Figure 17A:
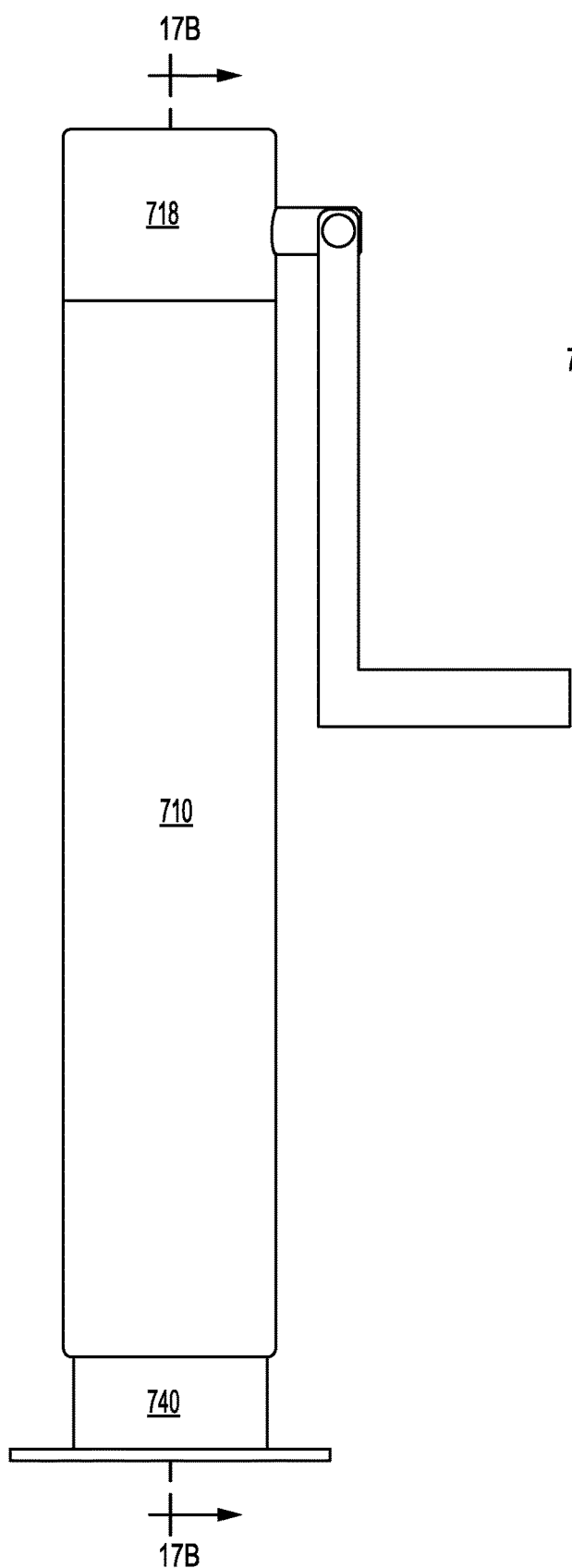
FIG. 17A and FIG. 17B illustrate a side view and a section view, respectively, of the lifting device of FIG. 16, with the lifting device in a retracted state, and a high speed rotating screw in a first position, in accordance with various embodiments.
Figure 17B:
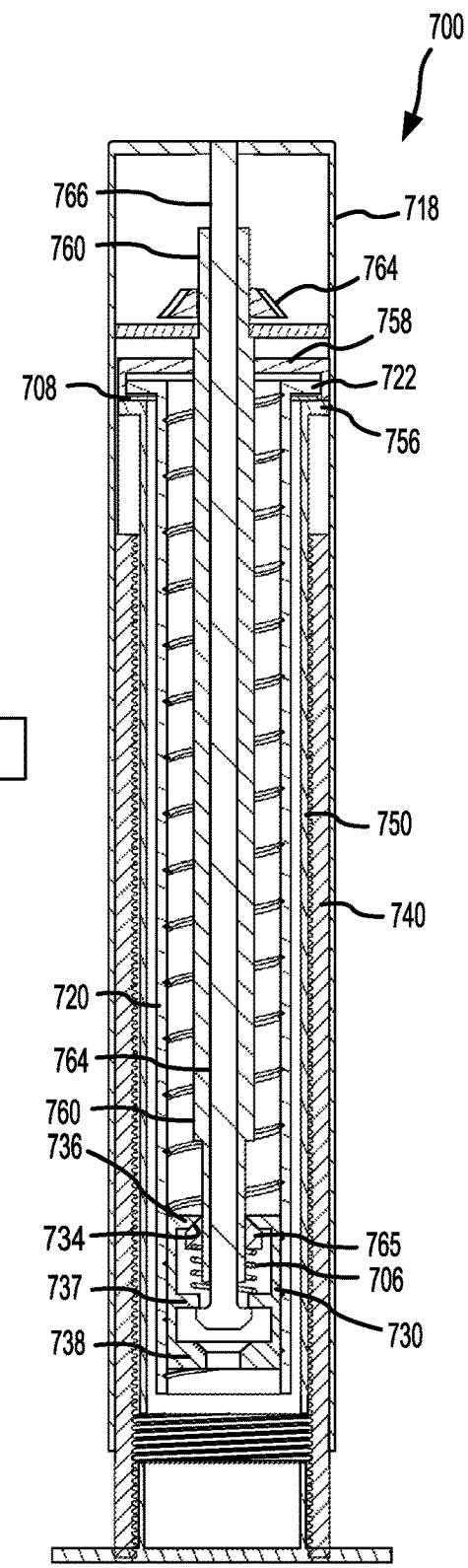

In operation, rotation of shaft 760 in a first rotational direction, e.g., via handle 770, causes sleeve 750 to rotate with respect outer tube 710 and translating sleeve 740, which in turn causes translating sleeve 740 to extend from outer tube 710 (see FIG. 17C and FIG. 17D). Conversely, rotation of shaft 760 in a second rotational direction (opposite the first rotational direction) causes sleeve 750 to rotate with respect outer tube 710 and translating sleeve 740, which in turn causes translating sleeve 740 to retract into outer tube 710 (see FIG. 17A and FIG. 17B).

Furthermore, with rotating screw 730 in a first position (see FIG. 17A and FIG. 17B) with respect to outer tube 710, rotating screw 730 may be drivably coupled to shaft 760. Stated differently, rotation of shaft 760 may drive rotation of rotating screw 730. In operation, and with rotating screw 730 in a first position (see FIG. 4A through FIG. 4D) with respect to outer tube 710 and/or gear 765, rotation of shaft 760 in a first rotational direction, e.g., via handle 770, may cause rotating screw 730 to rotate with respect outer tube 710 and sleeve 720, which in turn causes sleeve 720 to translate with respect to rotating screw 730 and extend from outer tube 710. Conversely, rotation of shaft 760 in a second rotational direction (opposite the first rotational direction) may cause rotating screw 730 to rotate with respect outer tube 710 and sleeve 720, which in turn causes sleeve 720 to retract into outer tube 710. In the first position, spring 706 may bias rotating screw 730 to engage with gear 765. Thus, with the rotating screw 730 in the first position, both the sleeve 720 and the sleeve 740 are driven to translate with respect to outer tube 710 in response to rotation of shaft 760.

However, in operation and with rotating screw 730 in a second position (see FIG. 17C and FIG. 17D) with respect to outer tube 710 and/or gear 765, the rotating screw 730 is disengaged from gear 765 (i.e., rotation of shaft 760 and gear 765 does not drive rotation of rotating screw 730 in the disengaged position). In this regard, with rotating screw 730 in the second position, rotation of shaft 760 in the first rotational direction or the second rotational direction may cause only sleeve 750 (and not rotating screw 730) to rotate with respect to outer tube 710 and sleeve 720, thereby driving only the sleeve 740 to translate. Stated differently, the high speed assembly 702 (i.e., the rotating screw 730 and sleeve 720) may be disengaged from operation in response to the rotating screw 730 moving to the second position. In this manner, in response to rotation of shaft 760 in the first direction, both the high speed assembly 702 and the low speed assembly 704 are driven to increase the overall length of lifting device 700. With momentary reference to FIG. 17C and FIG. 17D, as the overall length of lifting device 700 is increased, the foot 775 of the lifting device 700 may contact a ground surface 790, thereby imparting a force 794 from the ground surface 790 into the rotating screw 730 which causes the rotating screw 730 to move with respect to outer tube 710 against the bias of spring 706 from the first position (i.e., engaged with gear 765) to the second position (i.e., disengaged from gear 765) thereby decoupling rotating screw 730 from torsional forces imparted by shaft 760. In this regard, before the lifting device 700 has contacted a ground surface, the overall length of the lifting device 700 is quickly increased to reduce the overall number of rotations of shaft 760 required to cause lifting device 700 to reach the ground. In response to contacting the ground, the high speed assembly 702 is decoupled from the shaft 760 to take advantage of the mechanical advantage of the low speed assembly 704.

In various embodiments, rotating screw 730 comprises helically extending grooves or threads 732. In various embodiments, sleeve 750 comprises helically extending grooves and/or threads 752. The thread pitch of threads 732 may be greater than the thread pitch of threads 752. Stated differently, sleeve 750 may comprise more threads per inch (TPI) than rotating screw 730. In various embodiments, the thread pitch of threads 732 is more than twice as large as the thread pitch of threads 752. In various embodiments, the thread pitch of threads 732 is more than three times as large as the thread pitch of threads 752. In various embodiments, the thread pitch of threads 732 is more than four times as large as the thread pitch of threads 752. It should be understood that the maximum thread pitch may be limited by the moment arm for torque applied to the shaft 760 and may be limited below a desired threshold to reduce the torque requirement for rotating shaft 760. In this manner, the high speed assembly 702 translates further and faster per rotation of shaft 760 than the low speed assembly 704, causing the lifting device 700 to reach a ground surface faster than if the high speed assembly were not present. Furthermore, in response to the lifting device 700 contacting a ground surface and the high speed assembly 702 disengaging from the shaft 760, the reduced thread pitch of the low speed assembly 704 is taken advantage of to reduce the torque required for extending the lifting device 700.

With reference to FIG. 16 and FIG. 17D, sleeve 740 may be keyed to outer tube 710 to prevent rotation of sleeve 740 with respect to outer tube 710. For example, sleeve 740 may comprise one or more axially extending grooves 748 (see FIG. 16) disposed in the outer diameter surface thereof and outer tube 710 may comprise corresponding protrusion(s) 716 (see FIG. 17D) extending radially inwards from an inner diameter surface thereof that extend(s) into groove(s) 748.

Figure 18:
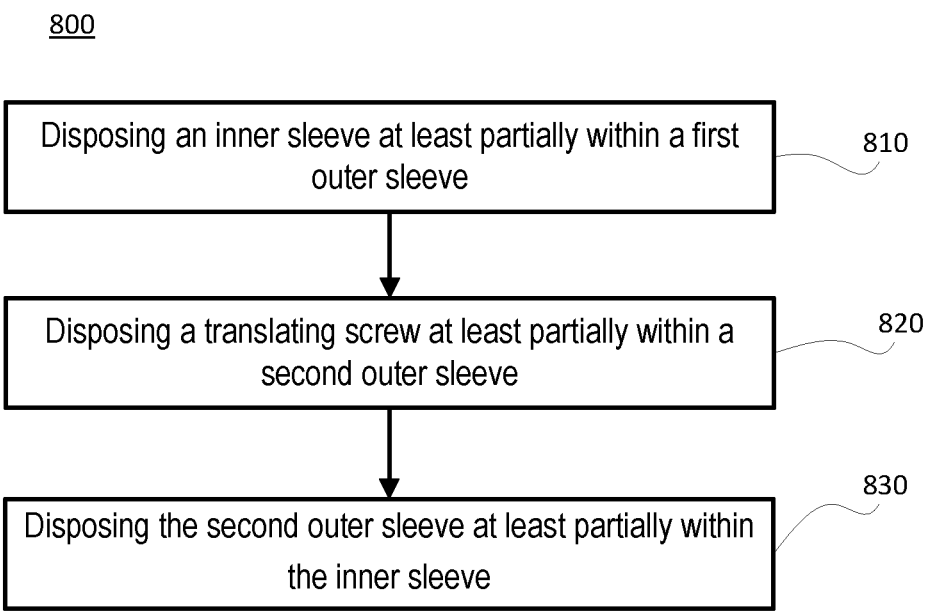
FIG. 18 illustrates a flow chart of a method of manufacturing a lifting device, in accordance with various embodiments.

With reference to FIG. 18, a flow chart of a method 800 of manufacturing a lifting device, such as a linear jack, is illustrated, in accordance with various embodiments. Method 800 includes disposing a second sleeve at least partially within a first sleeve (step 810). Method 800 includes disposing a translating screw at least partially within a third sleeve (step 820). Method 800 includes disposing the third sleeve at least partially within the second sleeve (step 830).

With combined reference to FIG. 2 and FIG. 18, step 810 may include threading second sleeve 230 into first sleeve 220. Step 820 may include threading screw 250 into third sleeve 240. Step 830 may include moving third sleeve 240 at least partially into second sleeve 230. First sleeve 220 may be moved into outer tube 210 via the open upper end of outer tube 210 prior to retaining member 212 being coupled to the upper end of outer tube 210.

Figure 19A:
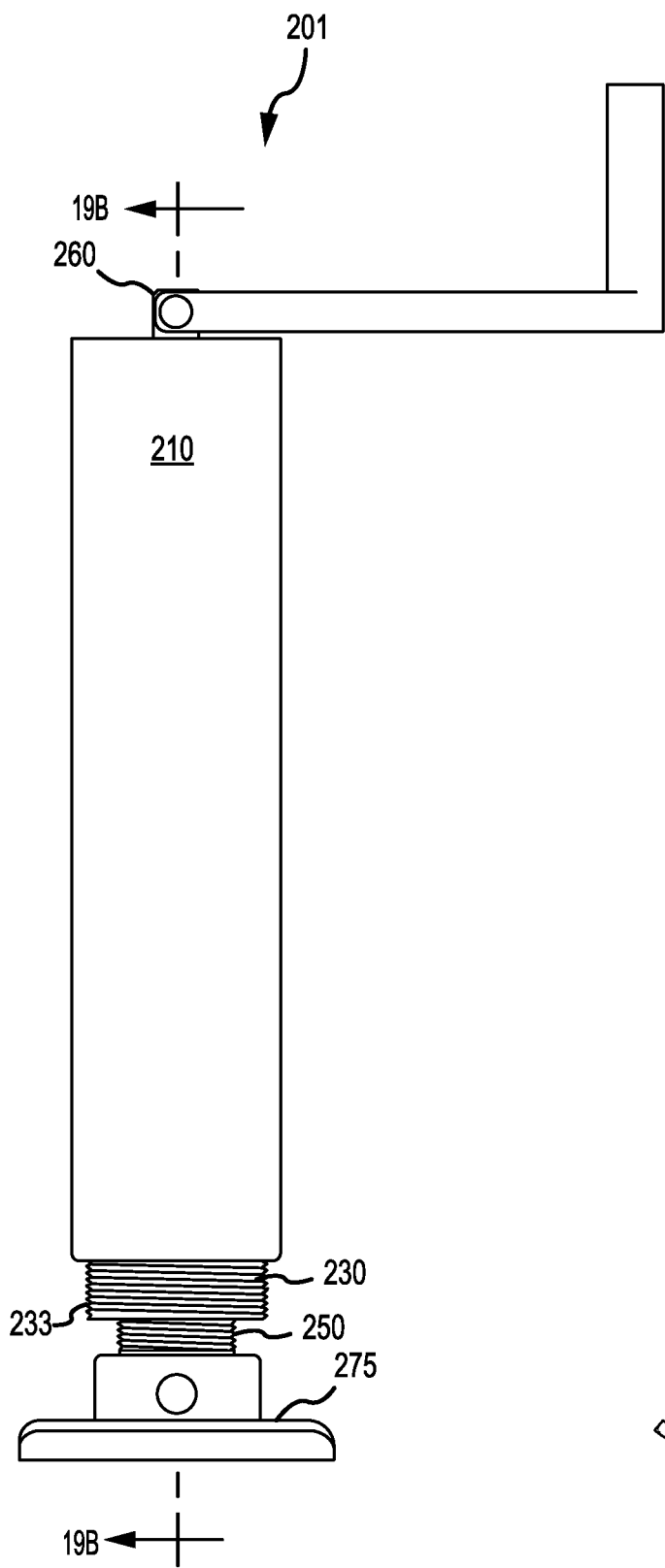
FIG. 19A and FIG. 19B illustrate a side view and a section view, respectively, of a lifting device comprising a first jack screw assembly including a thread pitch that is equal to a second jack screw assembly, in accordance with various embodiments.
Figure 19B:
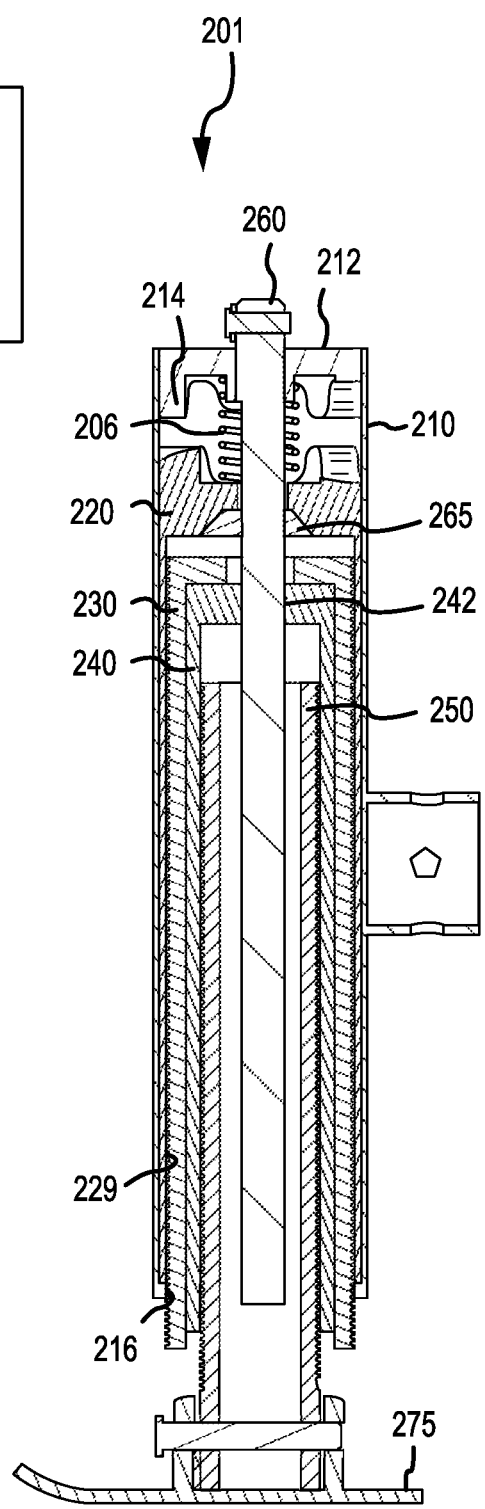

With respect to FIG. 19A and FIG. 19B, elements with like element numbering, as depicted in FIG. 4A and FIG. 4B, are intended to be the same and will not necessarily be repeated for the sake of clarity.

With reference to FIG. 19A and FIG. 19B, a lifting device 201 is illustrated, in accordance with various embodiments. Lifting device 201 may be similar to lifting device 200 of FIG. 2, except that the thread pitch of second sleeve 230 and first sleeve 220 is equal to the thread pitch of third sleeve 240 and screw 250. In this regard, first sleeve 220 may comprise helically extending threads 229. Threads 229 may be disposed on an inner diameter surface of first sleeve 220. Second sleeve 230 may comprise helically extending threads 233. Threads 233 may be disposed on an outer diameter surface of second sleeve 230. The thread pitch of threads 233 and threads 229 may be equal to the thread pitch of threads 252 of screw 250 and threads 244 of third sleeve 240 (see FIG. 8A and FIG. 8B).

Figure 20:
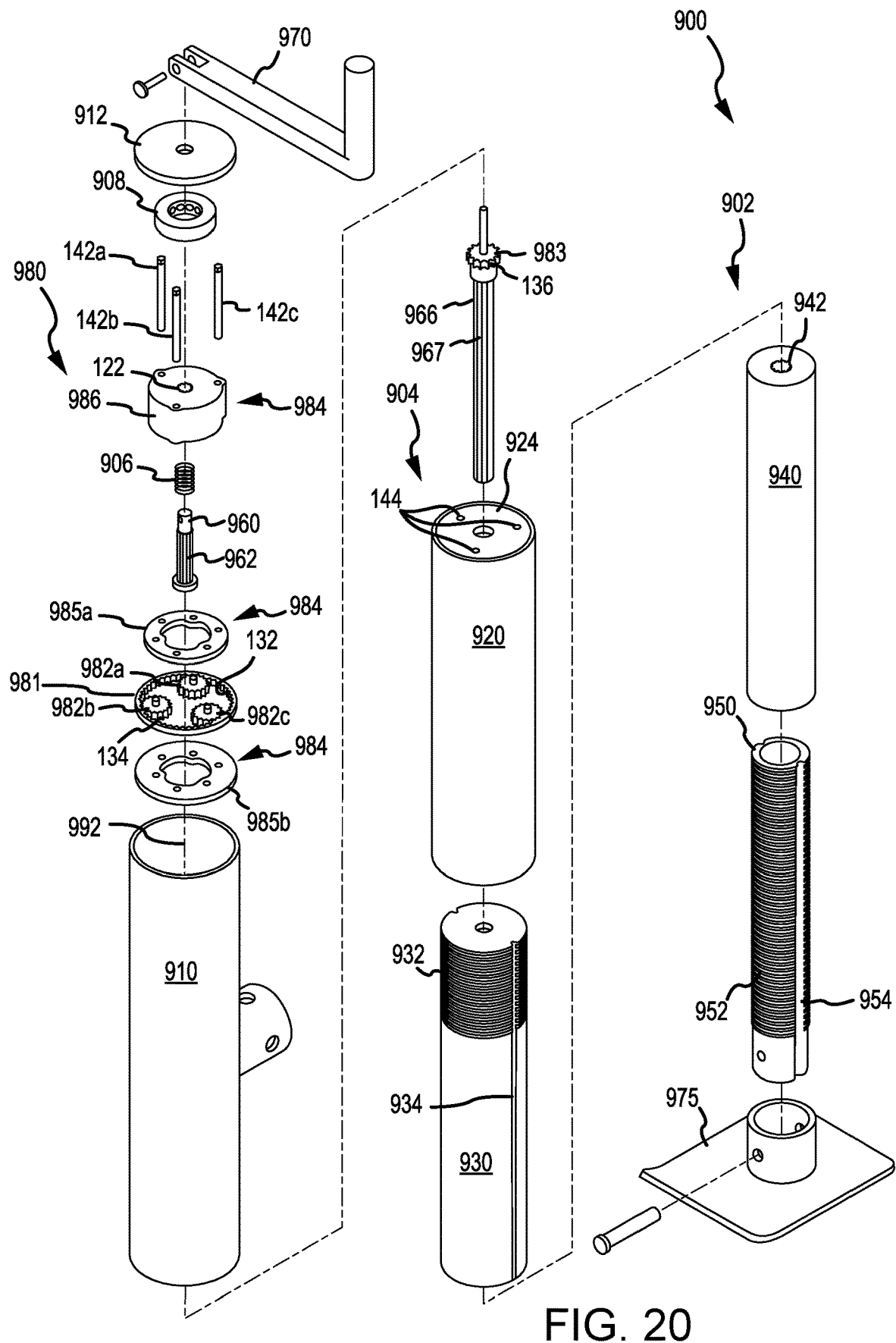
FIG. 20 illustrates an exploded view of a lifting device comprising a planetary gear system, in accordance with various embodiments.

With reference to FIG. 20, an exploded view of a lifting device 900 is illustrated, in accordance with various embodiments. Lifting device 900 may be a linear jack. Lifting device 900 may generally comprise an outer tube 910, a high speed assembly 902, and a low speed assembly 904. High speed assembly 902 may generally comprise a screw mechanism comprising a rotating nut threadedly coupled to a translating screw, in the manner of a leadscrew or jack screw. In various embodiments, high speed assembly 902 comprises a rotating sleeve 940, and a translating screw 950. Low speed assembly 904 may generally comprise a screw mechanism comprising a rotating nut threadedly coupled to a translating screw. Low speed assembly 904 may comprise a rotating sleeve 920, and a translating sleeve 930.

Although the present disclosure is described in accordance with various embodiments on the basis of a screw mechanism having a rotating nut and a translating screw, it should be understood that the present disclosure can be applied with a rotating screw and a translating nut, as illustrated in FIG. 15A and/or FIG. 16, for example.

Outer tube 910 may comprise a centerline axis 992. Outer tube 910 may be hollow. Sleeve 920 may be disposed at least partially within outer tube 910. In various embodiments, sleeve 920 is placed into the open upper end of outer tube 910 prior to retaining member 912 being coupled to outer tube 910. Sleeve 920 may be hollow. Sleeve 930 may be disposed at least partially within sleeve 920. Sleeve 930 may be hollow. Sleeve 940 may be disposed at least partially within sleeve 930. Sleeve 940 may be hollow. Translating screw 950 may be disposed at least partially within sleeve 940. Translating screw 950 may be hollow. Lifting device 900 may further comprise a shaft 960 (also referred to herein as an input shaft). Shaft 960 may be disposed at least partially within outer tube 910. Lifting device 900 may further comprise a shaft 966 (also referred to herein as an output shaft). Shaft 966 may be disposed at least partially within screw 950. In this regard, the inner diameter of outer tube 910 may be greater than the outer diameter of sleeve 920. The inner diameter of sleeve 920 may be greater than the outer diameter of sleeve 930. The inner diameter of sleeve 930 may be greater than the outer diameter of sleeve 940. The inner diameter of sleeve 940 may be greater than the outer diameter of translating screw 950. The inner diameter of translating screw 950 may be greater than the outer diameter, or width, of shaft 966. Outer tube 910, sleeve 920, sleeve 930, sleeve 940, translating screw 950, shaft 960, and shaft 966 may be coaxially aligned and/or substantially coaxially aligned, but in various embodiments coaxial alignment is not present. One end of shaft 960 may bear a handle 970 which may be used for rotating the shaft 960.

Lifting device 900 may further comprise a planetary gear system 980. The planetary gear system 980 in various embodiments as shown includes a ring gear 981, one or more planet gears 982, and a sun gear 983. The system 980 may include one, two, three, four, five, six, seven, eight, or more planet gears 982. Each of the gears 981, 982, 983 includes a plurality of teeth. For example, the ring gear 981 includes teeth 132, each planet gear 982 includes teeth 134, and sun gear 983 includes teeth 136. The teeth 132, 134, and 136 are sized and shaped to mesh together such that the various gears 981, 982, 983 engage each other. For example, the ring gear 981 and the sun gear 983 may each engage the planet gears 982*a*, 982*b*, 982*c*.

The planetary gear system 980 may include a carrier 984 comprising a first plate 985*a* and a second plate 985*b*. Planet gears 982*a*, 982*b*, 982*c* may be rotatably coupled to carrier 984—e.g., supported between first plate 985*a* and second plate 985*b*. Carrier 984 may further comprise a capped flange 986. Capped flange may comprise a splined aperture 122 configured to receive shaft 960. Splined aperture 122 may interlock with splines 962 disposed on shaft 960. In this manner, torsional forces may be transmitted from shaft 960 into carrier 984 via capped flange 986.

In various embodiments, the ring gear 981 may be stationary. For example, ring gear 981 may be fixed to the inner diameter surface of outer tube 910, such as via a splined connection, a threaded connection, a friction fit, a snap fit, a weld, or the like. In these embodiments, the input shaft may be coupled to the carrier 984, and input loads (e.g., torque) on the input shaft 960 may be transmitted through the carrier 984 to the planet gears 982*a*, 982*b*, 982*c*. Thus, the carrier 984 may drive the system 980.

First plate 985*a* and second plate 985*b* may comprise a first plurality of holes aligned to receive a plurality of bolts, such as bolt 142*a*, bolt 142*b*, and bolt 142*c*, for example. Capped flange 986 may similarly comprise a plurality of holes aligned to receive the plurality of bolts 142*a*, 142*b*, 142*c*. In various embodiments, bolt 142*a*, bolt 142*b*, and bolt 142*c* hold capped flange 986, first plate 985*a*, and a second plate 985*b* together. First plate 985*a* and second plate 985*b* may comprise a second plurality of holes aligned to receive shafts associated with planet gears 982*a*, 982*b*, 982*c*. In this manner, bolts 142*a*, 142*b*, 142*c* may each extend between adjacent planet gears 982*a*, 982*b*, 982*c*.

Sleeve 920 may be drivably coupled to shaft 960. In various embodiments, bolts 142 may extend into holes 144 disposed in flange 924 of sleeve 920. Input loads (e.g., torque) may be transmitted from shaft 960, through carrier 984 and bolts 142, into sleeve 920. In this manner, sleeve 920 may rotate at a 1:1 ratio with shaft 960.

The outer tube 910 may comprise a retaining member 912. Retaining member 912 may be coupled to outer tube 910, e.g., via a threaded connection, snap fit, friction fit, fasteners, and/or a metal joining process, such as welding, brazing, etc. Retaining member 912 may comprise a cap structure coupled to the upper end of outer tube 910. Retaining member 912 may comprise a flange extending radially inward from outer tube 910. Shaft 960 may extend through retaining member 912. Lifting device 900 may further comprise a bearing 908 supporting, at least in part, shaft 960. Bearing 908 may be disposed between retaining member 912 and capped flange 986. Shaft 960 may extend through bearing 908.

Lifting device 900 may further comprise a spring 906. Spring 906 may be a coil spring, leaf spring, Belleville spring, or other suitable spring for exerting a bias against sun gear 983. Spring 906 may be operatively coupled to sleeve 920 and sun gear 983, via shaft 966, to assist movement of sleeve 920 and sun gear 983 between first and second positions, as described herein with further detail. In this regard, sleeve 920 may be slidable in the outer tube 910 between the first position and the second position. Sleeve 920 may translate along centerline axis 992 between the first position and the second position. Spring 906 may be compressed between capped flange 986 and shaft 960, in accordance with various embodiments. Spring 906 may be compressed between capped flange 986 and sun gear 983, in accordance with various embodiments. Spring 906 may bias shaft 960, shaft 966, sun gear 983, and sleeve 920 to translate together with respect to outer tube 910 between the first position (see FIG. 21B) and the second position (see FIG. 21D). Sleeve 920 may translate with respect to, and about, bolts 142 between the first position and the second position.

Figure 21A:
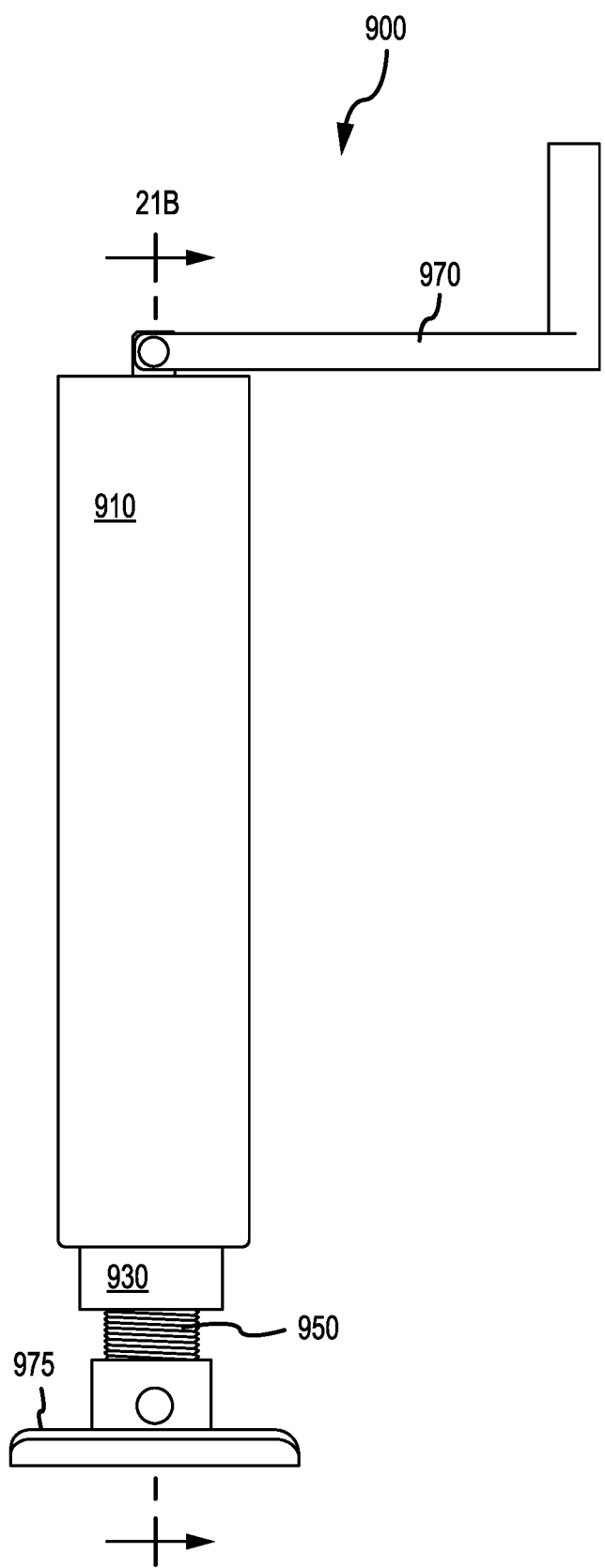
FIG. 21A and FIG. 21B illustrate a side view and a section view, respectively, of the lifting device of FIG. 20, with the lifting device in a retracted state, and an sleeve in a first position and a sun gear in a first position, in accordance with various embodiments.
Figure 21B:
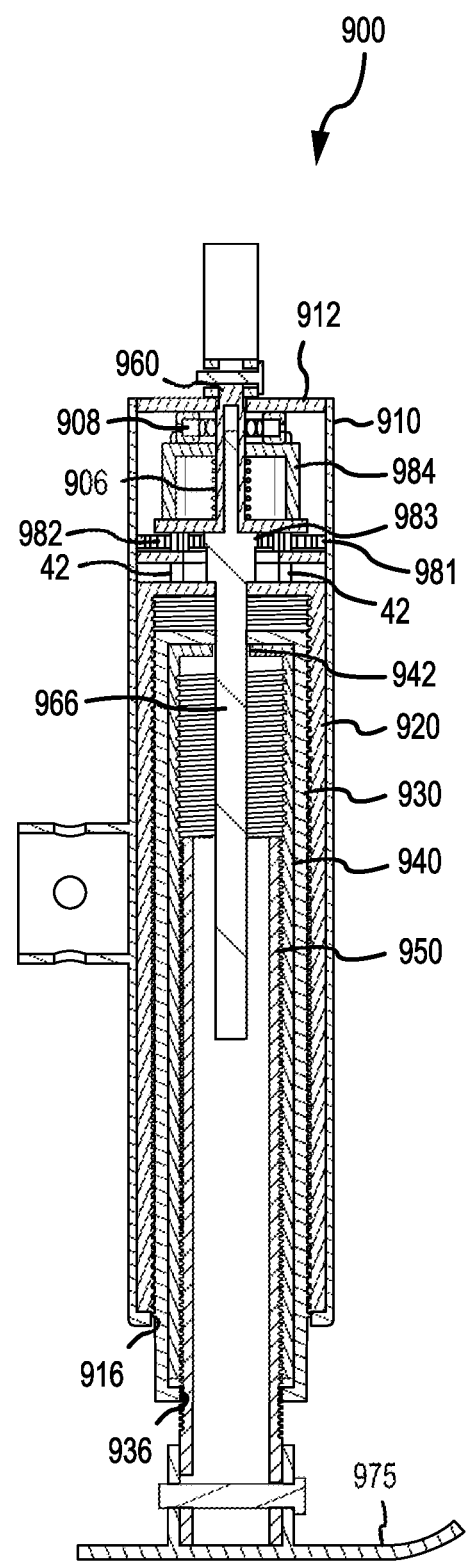
Figures 21C, 21D:
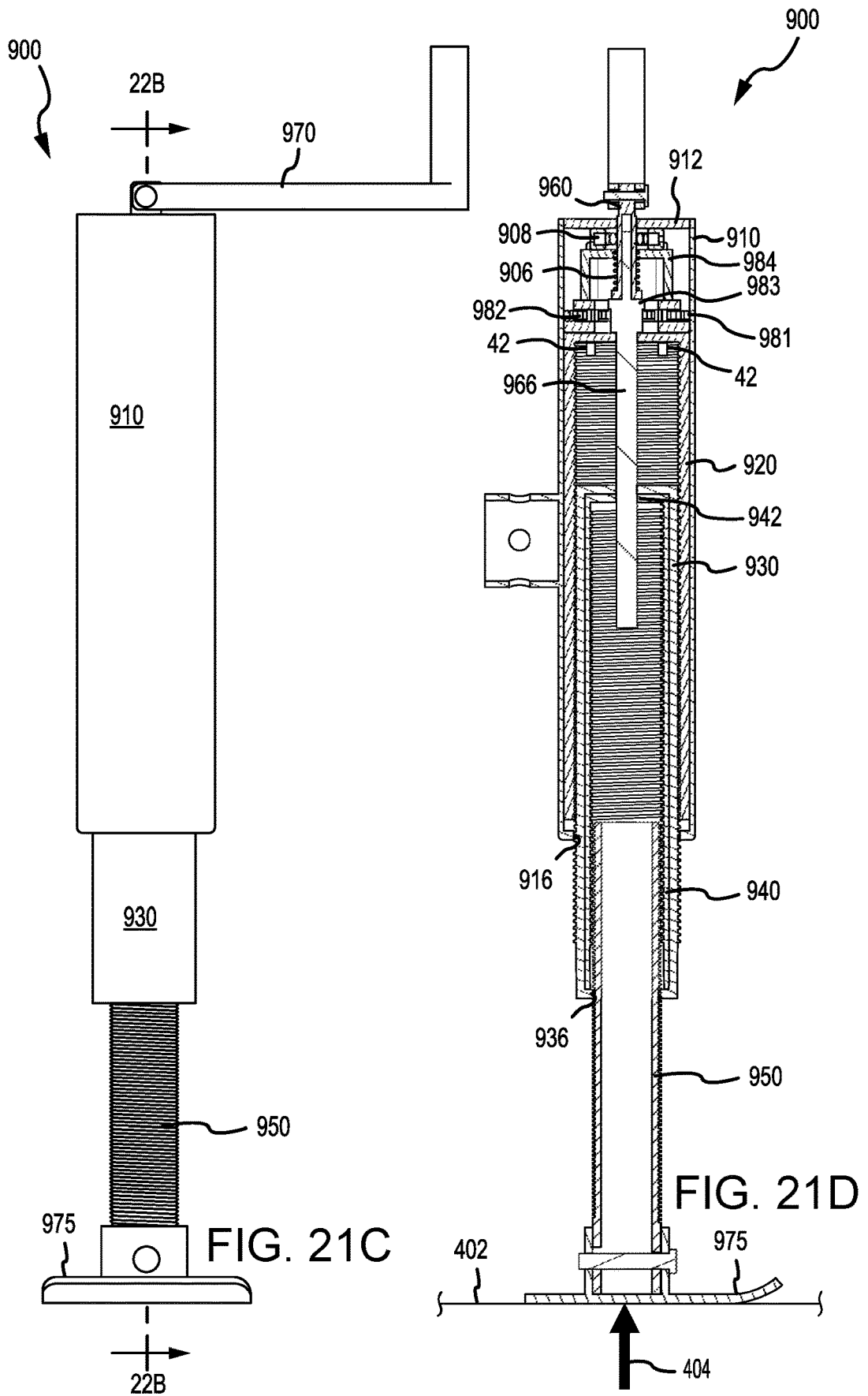
FIG. 21C and FIG. 21D illustrate a side view and a section view, respectively, of the lifting device of FIG. 21A and FIG. 21B, with the lifting device in an extended state, and the sleeve in a second position and a sun gear in a second position, in accordance with various embodiments.

With combined reference to FIG. 20, FIG. 21A, and FIG. 21B, rotation of shaft 960 may drive rotation of carrier 984 (e.g., via splined aperture 122), wherein, in response, the carrier 984 drives rotation of bolts 142*a*, 142*b*, 142*c*, wherein, in response, the bolts 142*a*, 142*b*, 142*c* drive rotation of sleeve 920. In various embodiments, sleeve 920 is threadedly coupled to sleeve 930. Thus, rotation of the sleeve 920 causes the sleeve 930 to translate with respect to outer tube 910. Stated differently, low speed assembly 904 translates rotational motion of sleeve 920 to linear motion of sleeve 930. Low speed assembly 904 may be driven by shaft 960 regardless of the position of sleeve 920 and/or sun gear 983, in accordance with various embodiments.

Furthermore, with sleeve 920 in the first position (see FIG. 21B) with respect to outer tube 910, spring 906 biases sun gear 983 in meshing relation with planet gears 982. In this regard, sleeve 940 may be drivably coupled to shaft 960 via planetary gear system 980. Rotation of shaft 960 may drive rotation of carrier 984 (e.g., via splined aperture 122), wherein, in response, the carrier 984 drives rotation of planet gears 982*a*, 982*b*, 982*c*, wherein, in response, the planet gears 982*a*, 982*b*, 982*c* drive rotation of shaft 966, wherein, in response, shaft 966 drives rotation of sleeve 940. In various embodiments, sleeve 940 is threadedly coupled to translating screw 950. Thus, rotation of the sleeve 940 causes the translating screw 950 to translate with respect to outer tube 910. Stated differently, high speed assembly 902 translates rotational motion of sleeve 940 to linear motion of translating screw 950.

In various embodiments, rotation of shaft 960 may drive rotation of shaft 966 at a 1:n ratio, wherein n is greater than 1. In various embodiments, n is equal to the number of rotations of shaft 966 per rotation of shaft 960. Planetary gear system 980 may be geared to any suitable ratio which causes shaft 966 to rotate faster than shaft 960, thus causing sleeve 940 to rotate faster than sleeve 920.

In various embodiments, with sleeve 920 in the first position (see FIG. 21B) with respect to outer tube 910 and sun gear 983 in meshing relation with planet gears 982, rotation of shaft 960 in a first rotational direction, e.g., via handle 970, may cause sleeve 940 to rotate with respect outer tube 910 and translating screw 950, which in turn causes translating screw 950 to extend from sleeve 940. Conversely, rotation of shaft 960 in a second rotational direction (opposite the first rotational direction) may cause sleeve 940 to rotate with respect outer tube 910 and translating screw 950, which in turn causes translating screw 950 to retract into sleeve 940. In the first position, spring 906 may bias sun gear 983 to engage with planet gears 982. Thus, with the sun gear 983 in the first position, both the sleeve 930 and the translating screw 950 are driven to translate with respect to outer tube 910 in response to rotation of shaft 960.

However, in operation and with sleeve 920 and sun gear 983 in second positions (see FIG. 21D) with respect to outer tube 910 and/or planet gears 982, the sun gear 983 (and thus the output shaft 966) is disengaged from planet gears 982 (i.e., rotation of shaft 960 does not drive rotation of output shaft 966 and sleeve 940 in the disengaged position). In this regard, with sun gear 983 in the second position, rotation of shaft 960 in the first rotational direction or the second rotational direction may cause only sleeve 920 (and not sleeve 940) to rotate with respect to outer tube 910, thereby driving only the sleeve 930 to translate. Stated differently, the high speed assembly 902 (i.e., the sleeve 940 and translating screw 950) may be disengaged from operation in response to the sleeve 920 and/or sun gear 983 moving to the second position. In this manner, in response to rotation of shaft 960 in the first direction, both the high speed assembly 902 and the low speed assembly 904 (i.e., the sleeve 920 and sleeve 930) are driven to increase the overall length of lifting device 900 but, after reacting force from the ground through, for example, foot 975, rotation of shaft 960 is only imparted to low speed assembly 904 and not high speed assembly 902. With momentary reference to FIG. 21C and FIG. 21D, as the overall length of lifting device 900 is increased, the foot 975 of the lifting device 900 may contact a ground surface 402, thereby imparting a force 404 from the ground surface 402 into the sleeve 920 which causes the sleeve 920 to move with respect to outer tube 910 against the bias of spring 906 from the first position. Said force may be transmitted through sleeve 920 into shaft 966, thereby pushing shaft 966 upwards against the bias of spring 906 and removing sun gear 983 from meshing relation with planet gears 982. In this manner, sun gear 983 may move from the first position (i.e., engaged with planet gears 982) to the second position (i.e., disengaged from planet gears 982) thereby decoupling sleeve 940 from torsional forces imparted by shaft 960. In this regard, before the lifting device 900 has contacted a ground surface, the overall length of the lifting device 900 is quickly increased to reduce the overall number of rotations of shaft 960 needed to cause lifting device 900 to reach the ground. In response to contacting the ground, the high speed assembly 902 is decoupled from the shaft 960 to take advantage of the mechanical advantage of the low speed assembly 904. In this manner, time to operate is reduced relative to conventional designed and increased mechanical advantage is selectively activated.

In various embodiments, sleeve 930 comprises threads 932. In various embodiments, translating screw 950 comprises threads 952. The thread pitch of threads 932 may be equal to, less than, or greater than the thread pitch of threads 952. In various embodiments, the thread pitch of threads 932 is equal to the thread pitch of threads 952. In response to shaft 966 rotating faster than shaft 960, translating screw 950 may translate faster in linear distance than sleeve 930, even though threads 952 and threads 932 may comprise the same thread pitch.

With reference to FIG. 20 and FIG. 4B, sleeve 930 may be keyed to outer tube 910 to prevent rotation of sleeve 930 with respect to outer tube 910. For example, sleeve 930 may comprise one or more axially extending grooves 934 (see FIG. 20) disposed in the outer diameter surface thereof and outer tube 910 may comprise corresponding protrusion(s) 916 extending radially inwards from an inner diameter surface thereof that extends into groove(s) 934.

In various embodiments, translating screw 950 may be keyed to sleeve 930 to prevent rotation of translating screw 950 with respect to sleeve 930 and outer tube 910. For example, translating screw 950 may comprise one or more axially extending grooves 954 (see FIG. 20) disposed in the outer diameter surface thereof and sleeve 930 may comprise corresponding protrusion(s) 936 extending radially inwards from an inner diameter surface thereof that extends into groove(s) 954.

Figure 22:
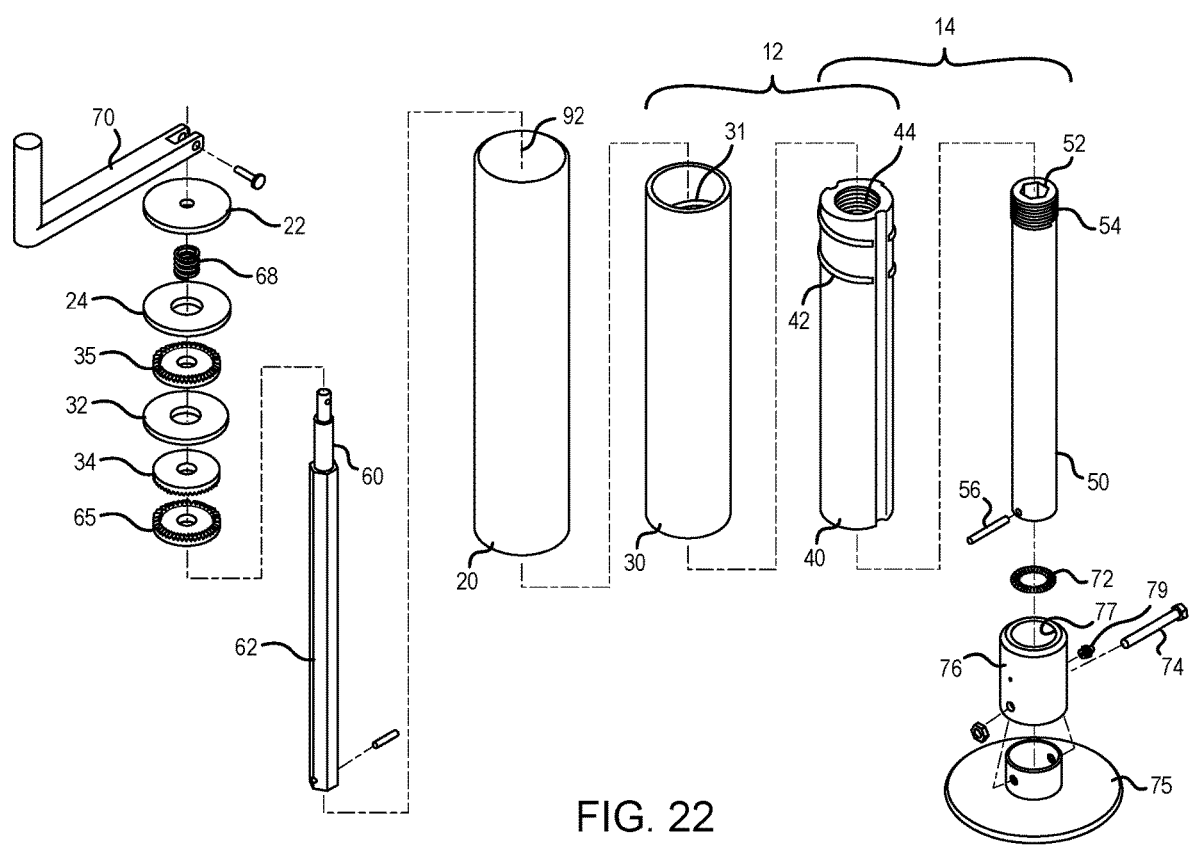
FIG. 22 illustrates an exploded view of a lifting device, in accordance with various embodiments.

With reference to FIG. 22, an exploded view of a lifting device 10 is illustrated, in accordance with various embodiments. Lifting device 10 may be a linear jack. Lifting device 10 may generally comprise an outer tube 20, a high speed assembly 12, and a low speed assembly 14. High speed assembly 12 may generally comprise a screw mechanism comprising a rotating nut threadedly coupled to a translating screw, in the manner of a leadscrew or jack screw. In various embodiments, high speed assembly 12 comprises a rotating sleeve 30 (also referred to herein as a high speed outer sleeve or a first sleeve), and a translating sleeve 40 (also referred to herein as a high speed inner sleeve or a second sleeve). Low speed assembly 14 may generally comprise a screw mechanism comprising the sleeve 40 of high speed assembly 12 threadedly coupled to an inner screw that both rotates and translates with respect to the sleeve 40. In this regard, low speed assembly 14 may comprise sleeve 40 (also referred to herein as a low speed outer sleeve), and an inner screw 50 (also referred to herein as a low speed inner sleeve). In this regard, sleeve 40 may belong to both the high speed assembly 12 and the low speed assembly 14, as described herein in further detail.

Outer tube 20 may comprise a centerline axis 92. Outer tube 20 may be hollow. Sleeve 30 may be disposed at least partially within outer tube 20. Sleeve 30 may be hollow. Sleeve 40 may be disposed at least partially within sleeve 30. Sleeve 40 may be hollow. Inner screw 50 may be disposed at least partially within sleeve 40. Inner screw 50 may be hollow. Lifting device 10 may further comprise a shaft 60. Shaft 60 may be disposed at least partially within inner screw 50. In this regard, the inner diameter of outer tube 20 may be greater than the outer diameter of sleeve 30. The inner diameter of sleeve 30 may be greater than the outer diameter of sleeve 40. The inner diameter of sleeve 40 may be greater than the outer diameter of inner screw 50. The inner diameter of inner screw 50 may be greater than the outer diameter, or width, of shaft 60. Outer tube 20, sleeve 30, sleeve 40, inner screw 50, and shaft 60 are coaxially aligned and/or substantially coaxially aligned, though in various embodiments coaxial alignment is not present. One end of shaft 60 may bear a handle 70 which may be used for rotating the shaft 60.

Figure 23A:
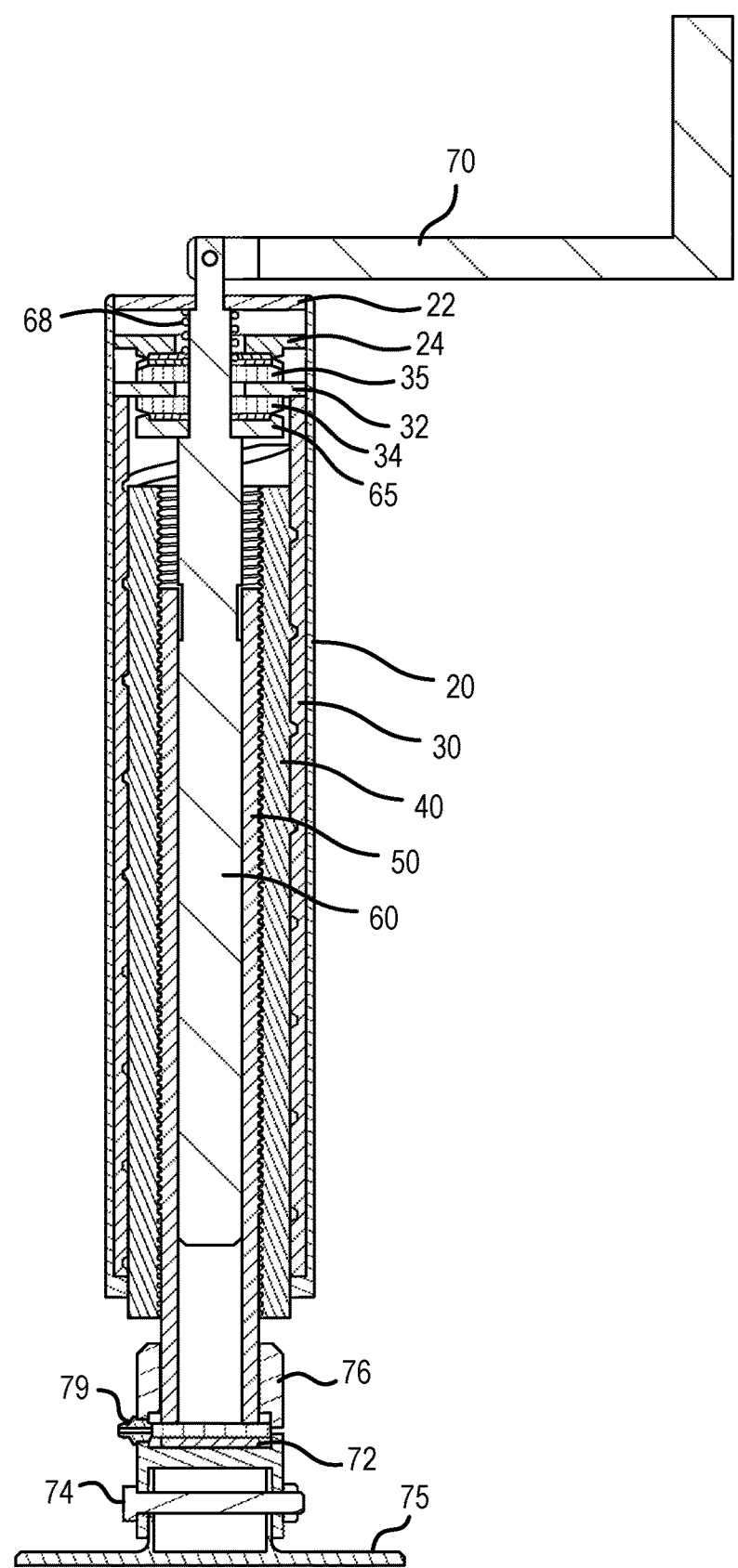
FIG. 23A illustrates a section view of the lifting device of FIG. 22, with the lifting device in a retracted state, and an sleeve in a first position, in accordance with various embodiments.
Figures 23B, 23C:
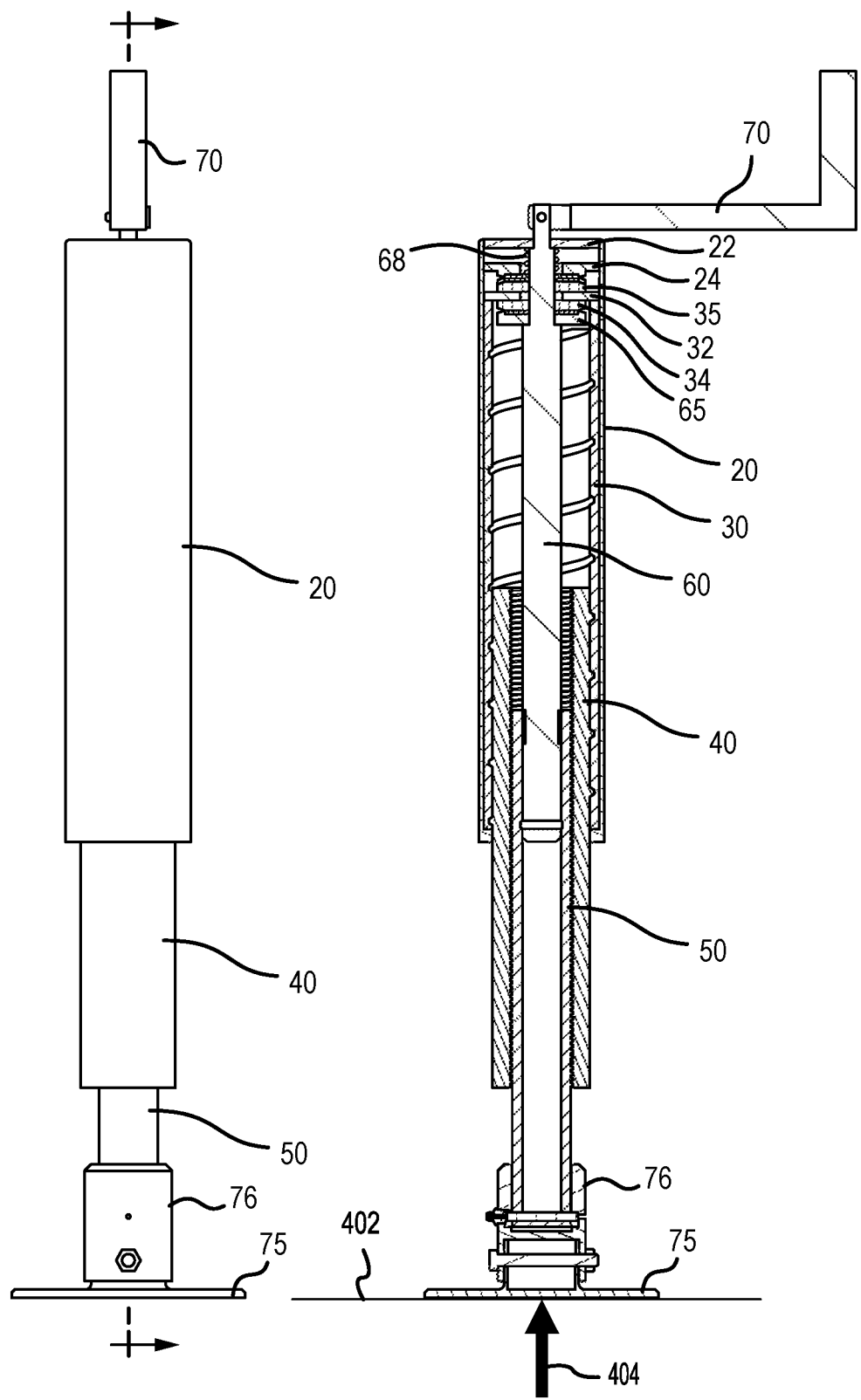
FIG. 23B and FIG. 23C illustrate a side view and a section view, respectively, of the lifting device of FIG. 23A, with the lifting device in an extended state, in accordance with various embodiments.
Figure 23D:
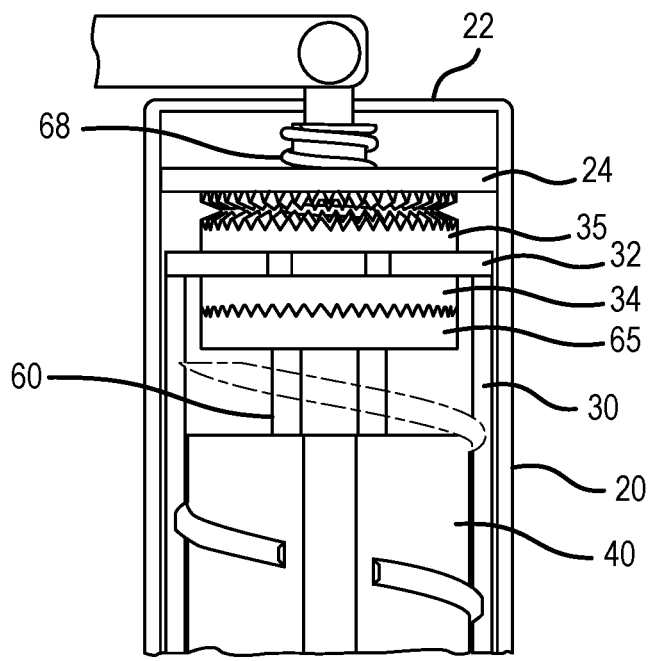
FIG. 23D and FIG. 23E illustrate the lifting device of FIG. 22 with the sleeve in a first position and a second position, respectively, in accordance with various embodiments.
Figure 23E:
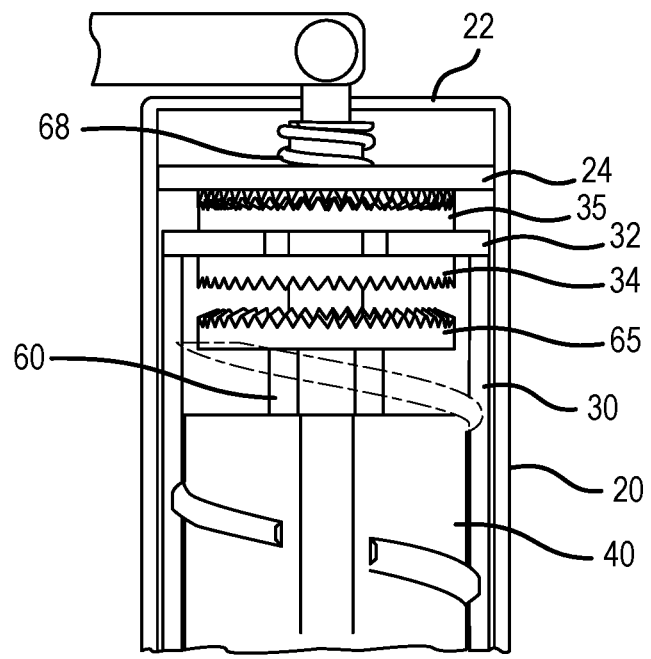

Sleeve 30 may be moveable with respect to outer tube 20 between a first position (see FIG. 23D) and a second position (see FIG. 23E). In the first position, sleeve 30 is drivably coupled to shaft 60. In the second position, sleeve 30 is decoupled from shaft 60. In this regard, sleeve 30 may further comprise an end plate 32, a first gear 34, and a second gear 35. First gear 34 may be coupled to, and rotate with, sleeve 30. Second gear 35 may be coupled to, and rotate with, sleeve 30. In various embodiments, first gear 34 is disposed opposite end plate 32 from second gear 35. First gear 34 and second gear 35 may be fixed to end plate 32, such as via a weld, a fastener, a threaded connection, or any other suitable method. In various embodiments, first gear 34 and second gear 35 are manufactured separately from end plate 32, though in various embodiments, first gear 34, second gear 35, and end plate 32 may be manufactured as a single, monolithic component.

Lifting device 10 may further comprise a gear 65 (also referred to herein as a shaft gear). Shaft gear 65 may be coupled to, and rotate with, shaft 60. Shaft 60 may drive sleeve 30 via gear 65 in response to sleeve 30 moving to the first position, as described in further detail herein. Gear 65 may be splined to the shaft 60, but gear 65 may also be fixedly coupled such as through welding, brazing, a press fit and/or an interference fit. Gear 65 may comprise any suitable gear, for example, a bevel gear or a crown gear. Shaft gear 65 may comprise a plurality of teeth configured to meshingly engage with a plurality of teeth of first gear 34. In this manner, rotation of shaft 60 may drive rotation of sleeve 30, via shaft gear 65 and first gear 34.

Lifting device 10 may further comprise a gear 24 (also referred to herein as an outer tube gear). Gear 24 may be coupled to outer tube 20. Gear 24 may be splined or threaded to the outer tube 20, but gear 24 may also be fixedly coupled such as through welding, brazing, a press fit and/or an interference fit. Gear 24 may comprise any suitable gear, for example, a bevel gear or a crown gear. Gear 24 may comprise a plurality of teeth configured to meshingly engage with a plurality of teeth of second gear 35. In this manner, sleeve 30 may be locked from rotation with respect to outer tube 20 in response to second gear 35 meshingly engaging with gear 24. Second gear 35 may meshingly engage with gear 24 in response to sleeve 30 moving to the second position (see FIG. 23E). First gear 34, second gear 35, end plate 32, shaft gear 65, and gear 24 may be coaxially aligned with shaft 60.

Lifting device 10 may further comprise a spring 68. Spring 68 may be a coil spring, leaf spring, Belleville spring, or other suitable spring for exerting a bias against sleeve 30. Spring 68 may be operatively coupled to sleeve 30, to assist movement of sleeve 30 between the first position and a second position, as described herein with further detail. In this regard, sleeve 30 may be slidable in the outer tube 20 between the first position and the second position. sleeve 30 may translate along centerline axis 92 between the first position and the second position. The outer tube 20 may comprise an end cap 22. End cap 22 may be coupled to outer tube 20, e.g., via a threaded connection, fasteners, and/or a metal joining process, such as welding, brazing, etc. End cap 22 may comprise a cap structure coupled to the upper end of outer tube 20. End cap 22 may comprise a flange extending radially inward from an inner diameter surface of outer tube 20. Shaft 60 may extend through end cap 22. End cap 22 may retain spring 68 within outer tube 20. In this regard, spring 68 may be compressed between end cap 22 and sleeve 30. More specifically, spring 68 may be compressed between end cap 22 and second gear 35 in various embodiments. In various embodiments, gear 24 comprises a plurality of teeth configured to engage with second gear 35 in response to sleeve 30 moving to the second position (see FIG. 23E). In this manner, sleeve 30 may be restricted from rotating within outer tube 20 in the second position.

In various embodiments, sleeve 30 is threadedly coupled to sleeve 40. Thus, rotation of the sleeve 30 causes the sleeve 40 to translate with respect to outer tube 20. Stated differently, high speed assembly 12 translates rotational motion of sleeve 30 to linear motion of sleeve 40. sleeve 40 is threadedly coupled to inner screw 50. Thus, rotation of inner screw 50 causes the inner screw 50 to translate with respect to outer tube 20 and sleeve 40. Stated differently, low speed assembly 14 translates rotational motion of inner screw 50 to linear motion of inner screw 50.

Shaft 60 may be operatively coupled to inner screw 50 such that inner screw 50 rotates with shaft 60. In various embodiments, outer surface 62 of shaft 60 may comprise a geometry that is complementary to a center aperture 52 of inner screw 50. In this regard, shaft 60 may interlock with inner screw 50 to impart rotational forces (i.e., torque) therebetween. In various embodiments, inner screw 50 and shaft 60 are coupled via a splined connection or the like. However, shaft 60 may be operatively coupled to inner screw 50 using various methods without departing from the scope and spirit of the present disclosure, such as via a fastener, for example.

In operation, rotation of shaft 60 in a first rotational direction, e.g., via handle 70, causes inner screw 50 to rotate with respect outer tube 20 and sleeve 40, which in turn causes inner screw 50 to extend from sleeve 40 (see FIG. 23B and FIG. 23C). Conversely, rotation of shaft 60 in a second rotational direction (opposite the first rotational direction) causes inner screw 50 to rotate with respect to sleeve 40, which in turn causes inner screw 50 to retract into sleeve 40 (see FIG. 23A).

Furthermore, with sleeve 30 in a first position (see FIG. 23A and FIG. 23D) with respect to outer tube 20, sleeve 30 may be drivably coupled to shaft 60. Stated differently, rotation of shaft 60 may drive rotation of sleeve 30. In operation, and with sleeve 30 in the first position with respect to outer tube 20 and/or gear 65, rotation of shaft 60 in a first rotational direction, e.g., via handle 70, may cause sleeve 30 to rotate with respect outer tube 20 and sleeve 40, which in turn causes sleeve 40 to extend from sleeve 30. Conversely, rotation of shaft 60 in a second rotational direction (opposite the first rotational direction) may cause sleeve 30 to rotate with respect outer tube 20 and sleeve 40, which in turn causes sleeve 40 to retract into sleeve 30. In the first position, spring 68 may bias first gear 34 of sleeve 30 to engage with shaft gear 65. Thus, with the sleeve 30 in the first position, both the sleeve 40 and the inner screw 50 are driven to translate with respect to outer tube 20 in response to rotation of shaft 60.

However, in operation and with sleeve 30 in a second position (see FIG. 23E) with respect to outer tube 20 and/or gear 65, the sleeve 30 is disengaged from gear 65 (i.e., rotation of shaft 60 and gear 65 does not drive rotation of sleeve 30 in the disengaged position). In this regard, with sleeve 30 in the second position, rotation of shaft 60 in the first rotational direction or the second rotational direction may cause only inner screw 50 (and not sleeve 30) to rotate with respect to outer tube 20, thereby driving only the inner screw 50 to translate. Stated differently, the high speed assembly 12 may be disengaged from operation in response to the sleeve 30 moving to the second position. In this manner, in response to rotation of shaft 60 in the first direction, both the high speed assembly 12 and the low speed assembly 14 (i.e., the sleeve 40 and inner screw 50) are driven to increase the overall length of lifting device 10 but, after reacting force from the ground through, for example, foot 75, rotation of shaft 60 is only imparted to low speed assembly 14 and not high speed assembly 12. With momentary reference to FIG. 23C, as the overall length of lifting device 10 is increased, the foot 75 of the lifting device 10 may contact a ground surface 402, thereby imparting a force 404 from the ground surface 402 into the sleeve 30 which causes the sleeve 30 to move with respect to outer tube 20 against the bias of spring 68 from the first position (i.e., engaged with gear 65) to the second position (i.e., disengaged from gear 65) thereby decoupling sleeve 30 from torsional forces imparted by shaft 60. In this regard, before the lifting device 10 has contacted a ground surface, the overall length of the lifting device 10 is quickly increased to reduce the overall number of rotations of shaft 60 needed to cause lifting device 10 to reach the ground. In response to contacting the ground, the high speed assembly 12 is decoupled from the shaft 60 to take advantage of the mechanical advantage of the low speed assembly 14. In this manner, time to operate is reduced relative to conventional designs and increased mechanical advantage is selectively activated.

In various embodiments, sleeve 30 comprises helically extending grooves or threads 31 disposed on an inner diameter surface of sleeve 30. In various embodiments, sleeve 40 comprises helically extending grooves or threads 42 disposed on an outer diameter surface of sleeve 40. In various embodiments, sleeve 40 comprises helically extending grooves and/or threads 44 disposed on an inner diameter surface of sleeve 40. In various embodiments, inner screw 50 comprises helically extending grooves and/or threads 54 disposed on an outer diameter surface of inner screw 50. Threads 31 are complementary to threads 42, and threads 44 are complementary to threads 54. The thread pitch of threads 31, 42 may be greater than the thread pitch of threads 44, 54.

The thread pitch of threads 31, 42 may be between 0.1 millimeters (mm) and 304.8 mm (between 0.0039 inches and 12 inches) in accordance with various embodiments, between 1 mm and 101.6 mm (between 0.039 inches and 4 inches) in accordance with various embodiments, between 2 mm and 76.2 mm (between 0.0787 inches and 3 inches) in accordance with various embodiments, and/or between 4 mm and 50.8 mm (between 0.157 inches and 2 inches) in accordance with various embodiments.

The thread pitch of threads 44, 54 may be between 0.1 millimeters (mm) and 279.4 mm (between 0.0039 inches and 11 inches) in accordance with various embodiments, between 1 mm and 25.4 mm (between 0.039 inches and 1 inch) in accordance with various embodiments, between 1 mm and 6.35 mm (between 0.039 inches and 0.25 inches) in accordance with various embodiments, and/or between 2 mm and 3.175 mm (between 0.0787 inches and 0.125 inches) in accordance with various embodiments.

In various embodiments, sleeve 40 may be keyed to outer tube 20 to prevent rotation of sleeve 40 with respect to outer tube 20. For example, sleeve 40 may comprise one or more axially extending grooves 46 (see FIG. 22) disposed in the outer diameter surface thereof and outer tube 20 may comprise corresponding protrusion(s) extending radially inwards from an inner diameter surface thereof that extends into groove(s) 46.

Figure 24A:
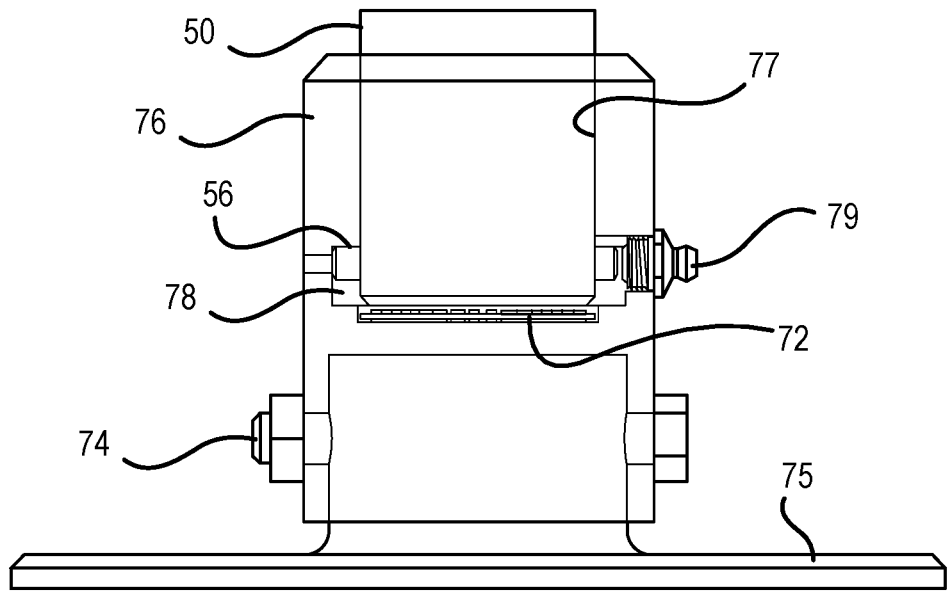
FIG. 24A and FIG. 24B illustrate a swiveling foot of the lifting device of FIG. 22, respectively, in accordance with various embodiments.
Figure 24B:
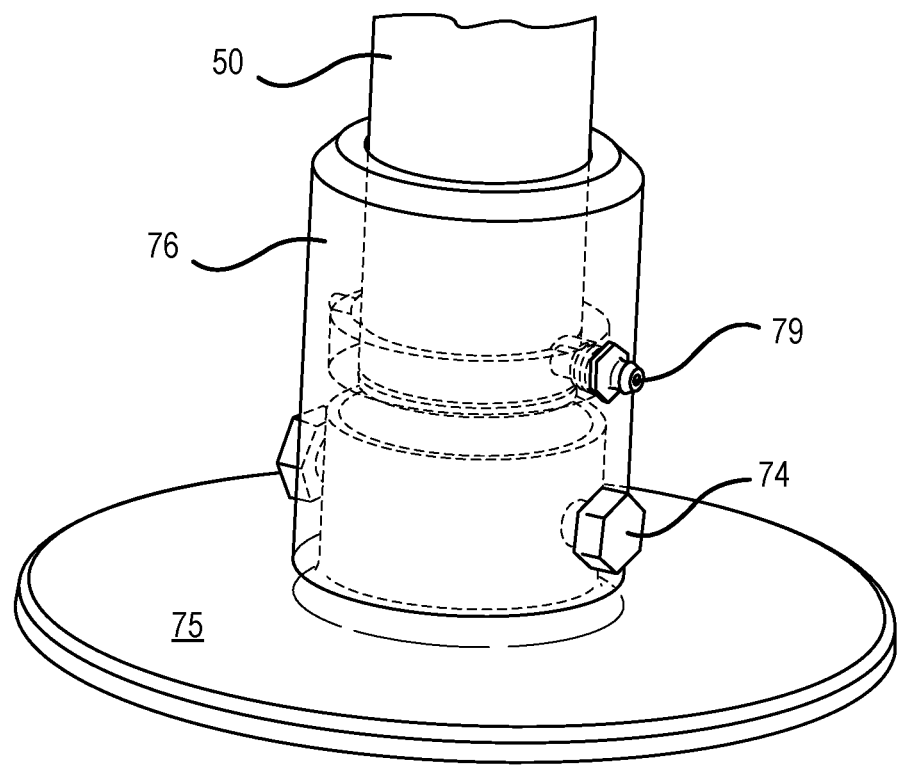
Figure 25:
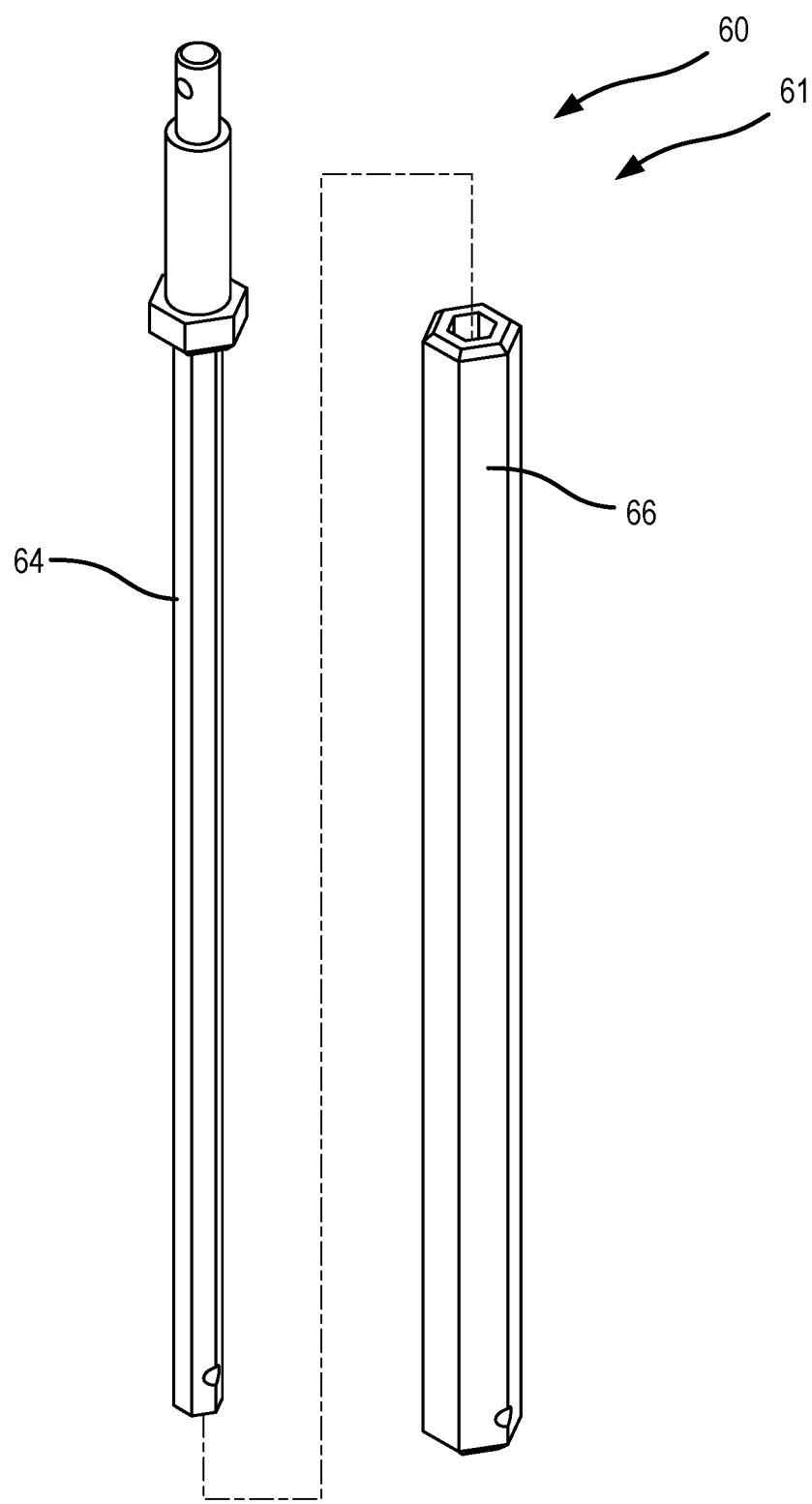
FIG. 25 illustrates an exploded view of a two-piece telescoping shaft for a lifting device, in accordance with various embodiments.

With combined reference to FIG. 22, FIG. 24A, and FIG. 24B, foot 75 may be configured to rotate with respect to inner screw 50, in accordance with various embodiments. Foot 75 may comprise a sleeve 76 extending axially from foot 75. In various embodiments, sleeve 76 is manufactured as a separate piece from foot 75 wherein sleeve 76 is coupled to foot 75, via a fastener 74 for example, though sleeve 76 and foot 75 may be manufactured as a single, monolithic component. Sleeve 76 may comprise a bore 77 configured to receive a bottom end of inner screw 50. Sleeve 76 may be secured to the end of inner screw 50 such that sleeve 76 can rotate with respect to inner screw 50. In this manner, inner screw 50 may rotate during extension and/or retraction of lifting device 10, while foot 75 remains stationary on a ground surface. In various embodiments, a pin 56 may be disposed to extend through inner screw 50 after inner screw 50 is place within sleeve 76. Pin 56 may extend at least partially into a cylindrical groove disposed in the bore 77 to prevent inner screw 50 from pulling out bore 77, while simultaneously allowing rotating of inner screw 50 with respect to sleeve 76. In various embodiments, a bearing 72 may be disposed between inner screw 50 and sleeve 76 for facilitating rotation of inner screw 50 with respect to sleeve 76. Bearing 72 may comprise a ball bearing, a thrust needle bearing, among other types of bearings. In various embodiments, a grease fitting 79 may be coupled to sleeve 76. Grease fitting 79 may be removed to install and/or remove pin 56. Grease fitting 79 may be in fluid communication with bearing 72. In this manner, grease may be moved into bore 77 and/or cylindrical groove 78 via grease fitting 79.

Figures 26A, 26B:
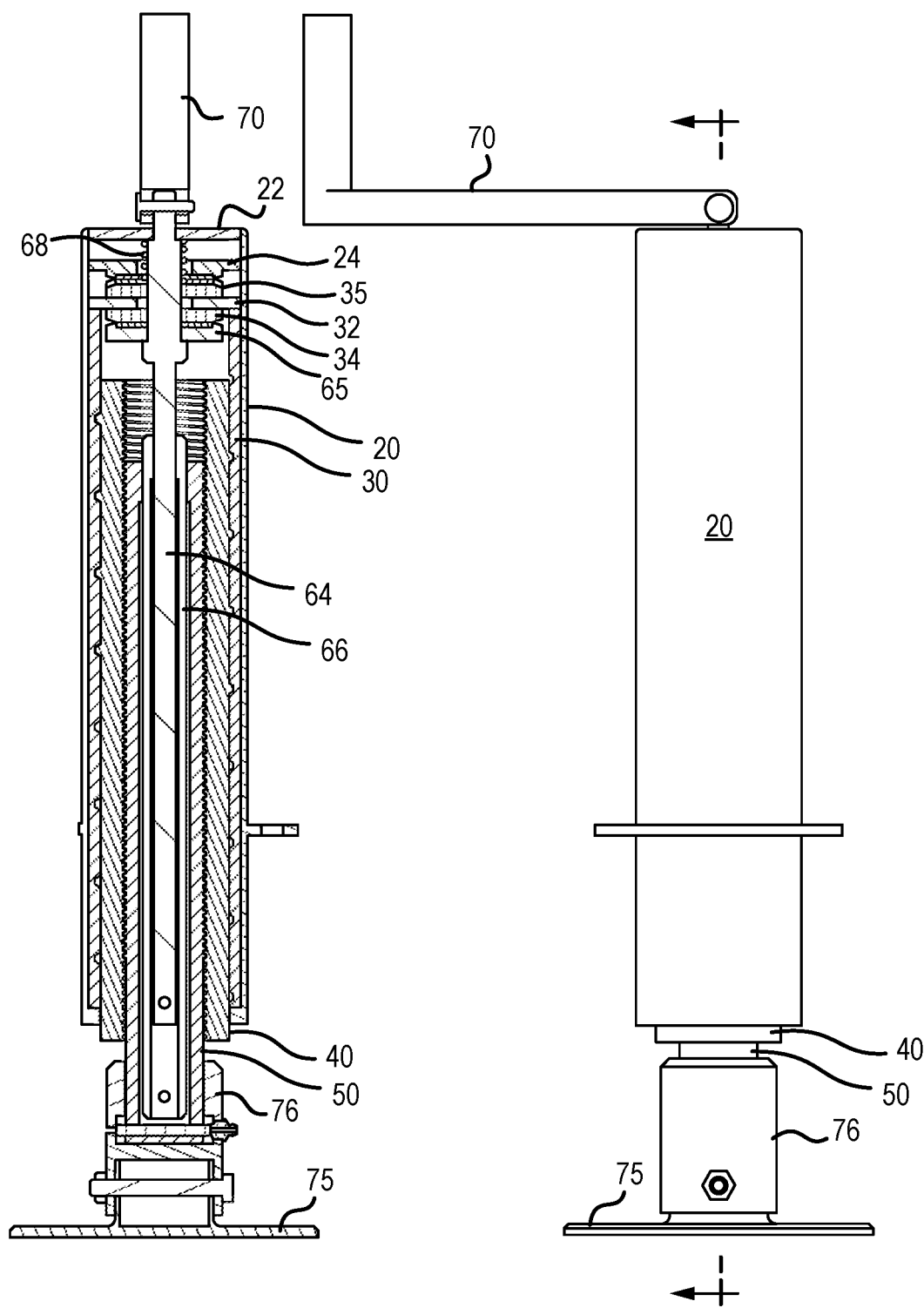
FIG. 26A and FIG. 26B illustrate a section view and a side view, respectively of a lifting device in a retracted state and having the two-piece telescoping shaft of FIG. 25, in accordance with various embodiments.
Figures 26C, 26D:
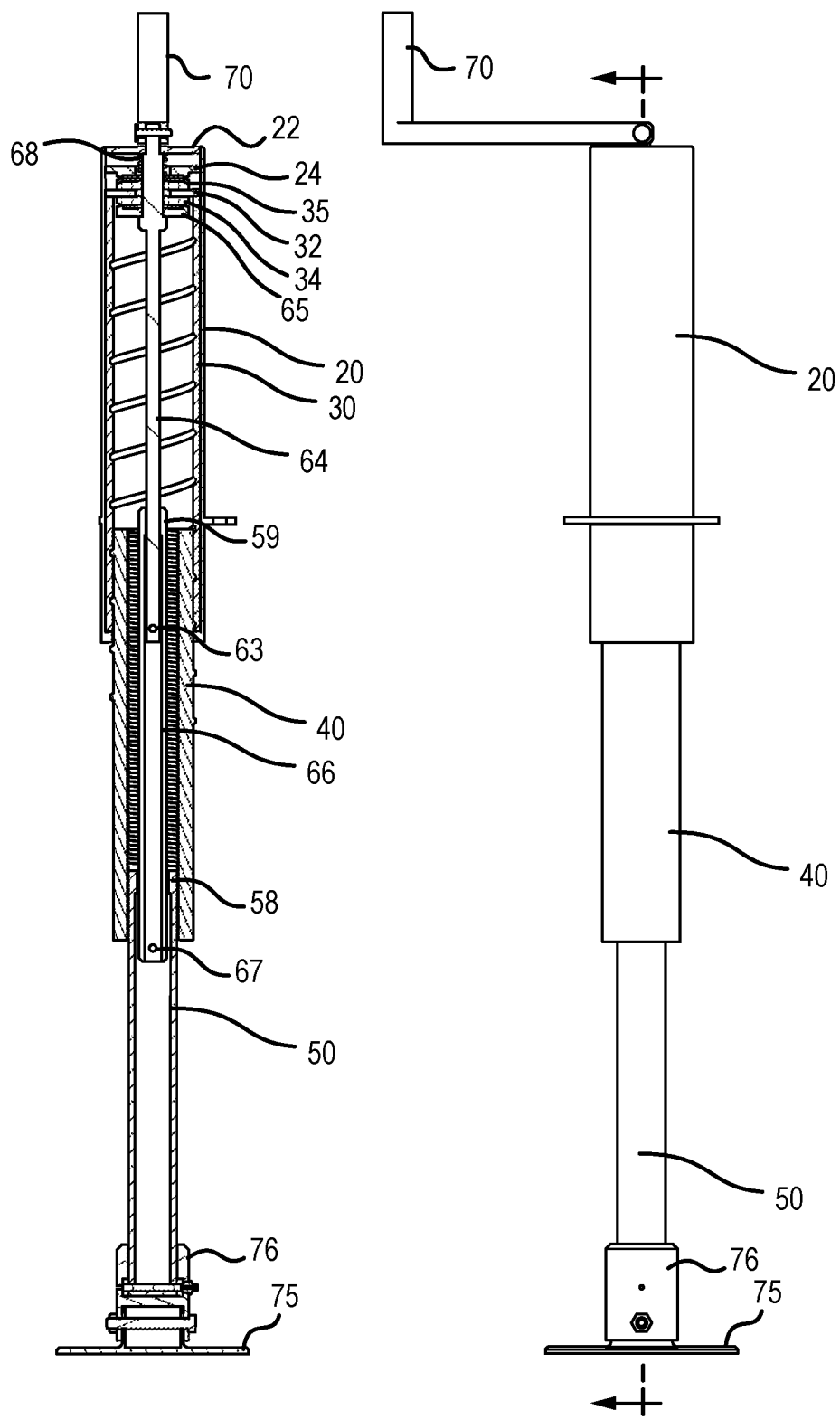
FIG. 26C and FIG. 26D illustrate a section view and a side view, respectively of the lifting device of FIG. 26A and FIG. 26B in a fully extended state and having the two-piece telescoping shaft of FIG. 25, in accordance with various embodiments.

In various embodiments, shaft 60 may be a two-piece telescoping shaft 61 comprising a first shaft 64 and a second shaft 66 configured for telescoping expansion and contraction along the longitudinal axis. FIG. 26A and FIG. 26B depict lifting device 10 in a retracted position and comprising the two-piece telescoping shaft 61. FIG. 26C and FIG. 26D depict lifting device 10 in an extended position and comprising the two-piece telescoping shaft 61. It can be seen that lifting device 10 may comprise a larger range of extension with the two-piece telescoping shaft 61 in comparison to a single piece shaft 60 (see FIG. 23B and FIG. 23C). In this manner, by equipping lifting device 10 with a two-piece shaft 61, the total length of the lifting device 10 is minimized in the retracted position and maximized in the fully extended position.

With reference to FIG. 26C, the top end of inner screw 50 may comprise a flange 58 extending radially inward from the radially inner surface of inner screw 50. Second shaft 66 may interface with inner screw 50 via flange 58. In various embodiments, the bottom end of second shaft 66 may comprise an aperture 67 extending transversely through second shaft 66 for receiving a pin for retaining the bottom end of second shaft 66 within inner screw 50. In this manner, the second shaft 66 is prevented from pulling completely out of the inner screw 50.

In various embodiments, the top end of second shaft 66 may similarly comprise a flange 59 extending radially inward from the radially inner surface of second shaft 66. First shaft 64 may interface with second shaft 66 via flange 59. In various embodiments, the bottom end of first shaft 64 may similarly comprise an aperture 63 extending transversely through first shaft 64 for receiving a pin for retaining the bottom end of first shaft 64 within second shaft 66. In this manner, the first shaft 64 is prevented from pulling completely out of the second shaft 66.

Figure 27:
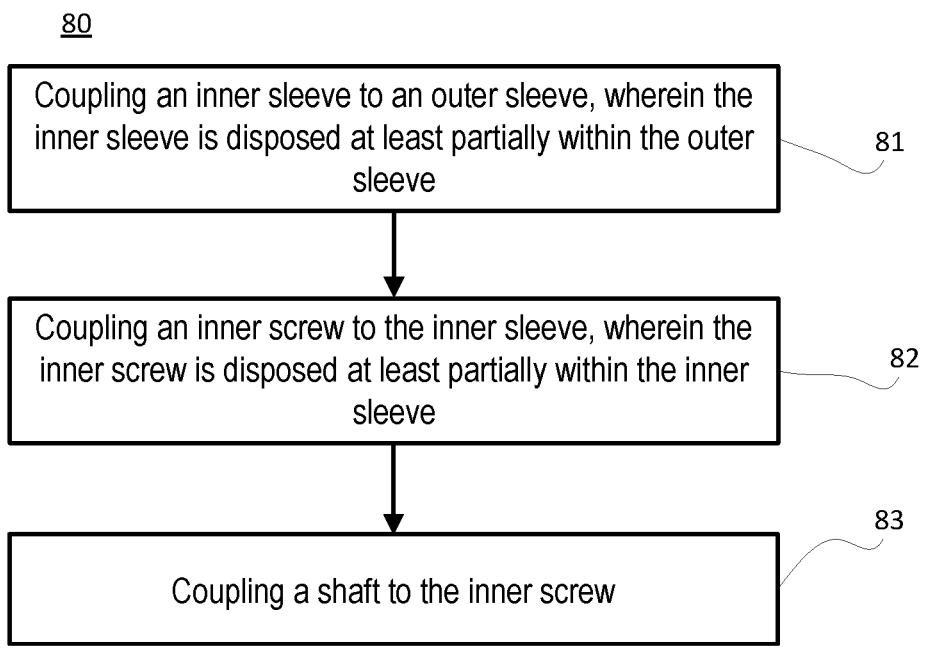
FIG. 27 illustrates a flow chart of a method of assembling a lifting device, in accordance with various embodiments.

With reference to FIG. 27, a flow chart of a method 80 of assembling a lifting device, such as a linear jack, is illustrated, in accordance with various embodiments. Method 80 includes coupling an inner sleeve to an outer sleeve, wherein the inner sleeve is disposed at least partially within the outer sleeve (step 81). Method 80 includes coupling an inner screw to the inner sleeve, wherein the inner screw is disposed at least partially within the inner sleeve (step 82). Method 80 includes coupling a shaft to the inner screw (step 83).

With combined reference to FIG. 22 and FIG. 27, step 81 may include threading sleeve 40 into sleeve 30. Step 82 may include threading inner screw 50 into sleeve 40. Step 83 may include coupling shaft 60 to inner screw 50. Shaft 60 may be disposed to extend at least partially through sleeve 30, sleeve 40, and inner screw 50.

Figure 28A:
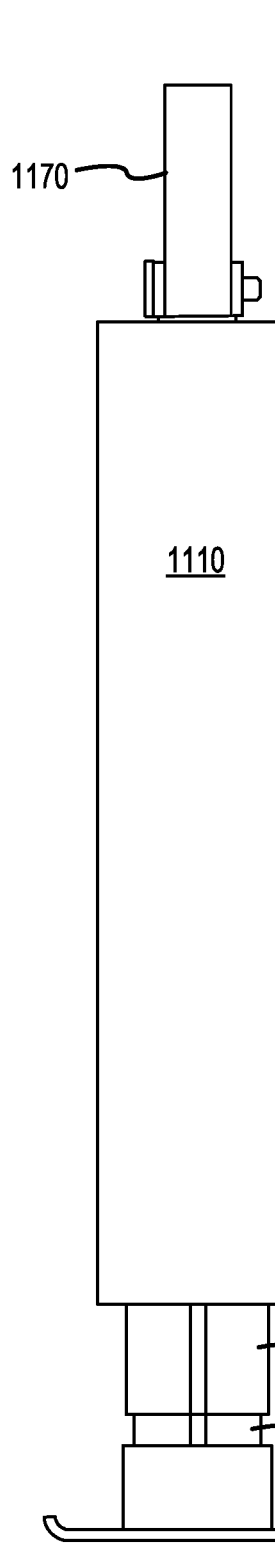
FIG. 28A and FIG. 28B illustrate a side view and a section view, respectively, of a lifting device in a retracted state, and a high speed sleeve in a first position, in accordance with various embodiments.
Figure 28B:
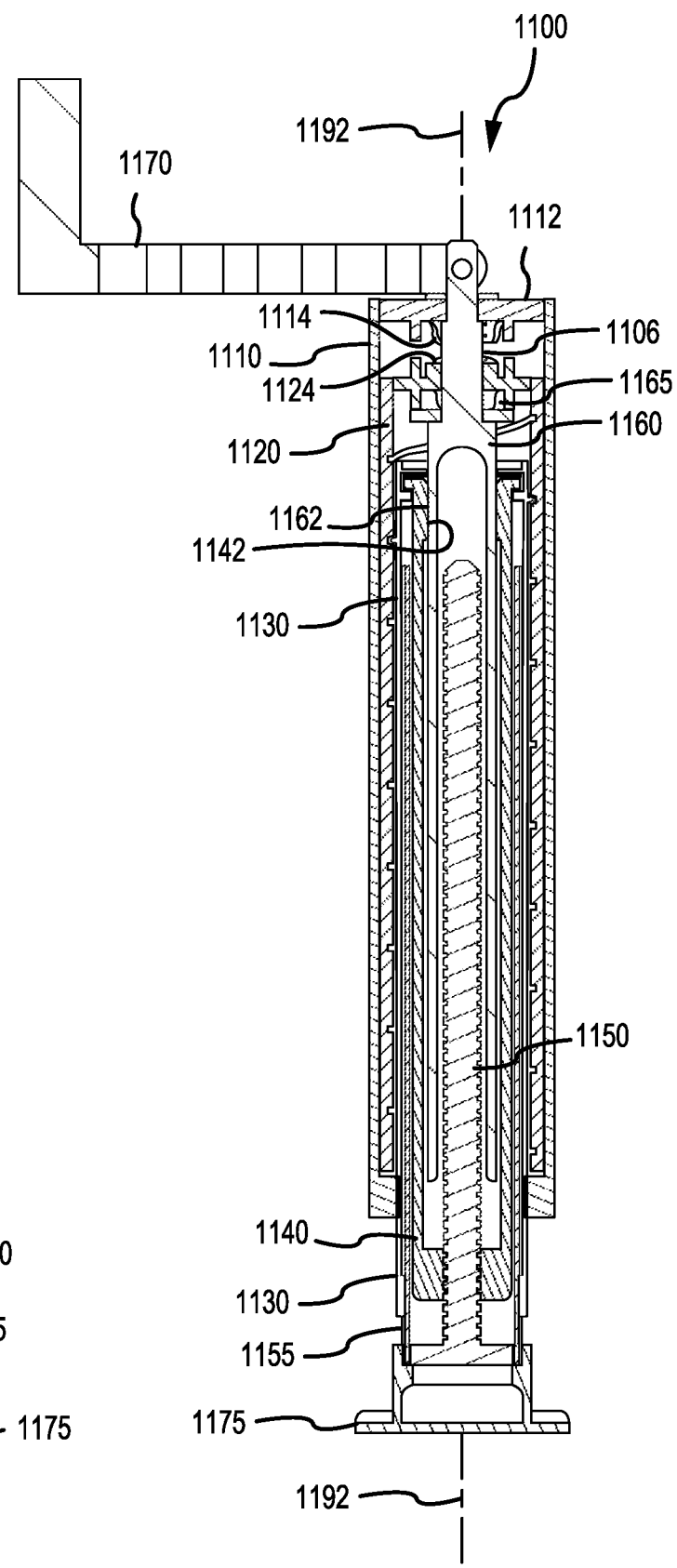

With combined reference to FIG. 28A and FIG. 28B, a side view and a section view, respectively, of a lifting device 1100 is illustrated, in accordance with various embodiments. Lifting device 1100 may be a linear jack. Lifting device 1100 may operate similar to lifting device 200, except that translating screw 1150 is received by shaft 1160. Furthermore, lifting device 1100 comprises a sleeve 1155 (also referred to herein as a cover sleeve) attached to translating screw 1150. Sleeve 1155 may be affixed to translating screw 1150. In this regard, sleeve 1155 may be configured to translate together with translating screw 1150 with respect to sleeve 1140.

Sleeve 1155 may be keyed to an adjacent component to prevent rotation of sleeve 1155 and translating screw 1150. Sleeve 1155 may protect translating screw 1150 from ambient elements such as dust, water, etc., thereby increasing the life and robustness of lifting device 1100. Sleeve 1155 may also at least partially contain lubricants, thus tending to retain lubricants on or in close proximity to translating screw 1150.

Lifting device 1100 may generally comprise an outer tube 1110. Outer tube 1110 may comprise a centerline axis 1192. Outer tube 1110 may be hollow. A high speed assembly comprising a first sleeve 1120 (also referred to herein as a high speed outer sleeve or a first outer sleeve) threadedly coupled to a second sleeve 1130 (also referred to herein as a high speed inner sleeve) may be disposed at least partially within outer tube 1110. Said high speed assembly may generally comprise a screw mechanism comprising a rotating nut threadedly coupled to a translating screw, in the manner of a leadscrew or jack screw. First sleeve 1120 may be hollow. First sleeve 1120 may be threaded on its inner diameter surface. First sleeve 1120 may comprise a hollow cylinder. Second sleeve 1130 may be disposed at least partially within first sleeve 1120. Second sleeve 1130 may be hollow. Second sleeve 1130 may comprise a hollow cylinder. Second sleeve 1130 may be threaded on its outer diameter surface.

A low speed assembly comprising sleeve 1140 (also referred to herein as a low speed outer sleeve, a first sleeve, a third sleeve, and/or an outer sleeve) threadedly coupled to a translating screw 1150 may be disposed at least partially within outer tube 1110. Said low speed assembly may generally comprise a screw mechanism comprising a rotating nut threadedly coupled to a translating screw, in the manner of a leadscrew or jack screw. Said low speed assembly may be disposed at least partially within second sleeve 1130.

Although the present disclosure is described in accordance with various embodiments on the basis of a screw mechanism having a rotating nut and a translating screw, it should be understood that the present disclosure can be applied with a rotating screw and a translating nut.

Third sleeve 1140 may be disposed at least partially within second sleeve 1130. Third sleeve 1140 may be hollow. Translating screw 1150 may be disposed at least partially within third sleeve 1140. Translating screw 1150 may be solid. Stated differently, translating screw 1150 may comprise a solid rod with helically extending threads disposed on the outer diameter surface thereof. Lifting device 1100 may further comprise a shaft 1160. Shaft 1160 may comprise a hollow portion. Translating screw 1150 may be received into the hollow portion of shaft 1160. Third sleeve 1140 may receive shaft 1160. In this regard, third sleeve 1140 may surround shaft 1160.

In this regard, the inner diameter of outer tube 1110 may be greater than the outer diameter of first sleeve 1120. The inner diameter of first sleeve 1120 may be greater than the outer diameter of second sleeve 1130. The inner diameter of second sleeve 1130 may be greater than the outer diameter of third sleeve 1140. The inner diameter of third sleeve 1140 may be greater than the outer diameter of translating screw 1150. The inner diameter of third sleeve 1140 may be greater than the outer diameter of shaft 1160. The inner diameter of shaft 1160 may be greater than the outer diameter of translating screw 1150. Outer tube 1110, first sleeve 1120, second sleeve 1130, third sleeve 1140, translating screw 1150, and shaft 1160 may be coaxially aligned.

Lifting device 1100 may further comprise a gear 1165. Gear 1165 may be coupled to, and rotate with, shaft 1160. Gear 1165 may be coaxially aligned with shaft 1160. Shaft 1160 may drive first sleeve 1120 via gear 1165 in response to first sleeve 1120 moving to a first position (see FIG. 28B), as described in further detail herein. Gear 1165 may be splined to the shaft 1160 but gear 1165 may also be fixedly coupled such as through welding, brazing, a press fit and/or an interference fit. Gear 1165 may comprise any suitable gear, for example, a bevel gear or a crown gear.

Lifting device 1100 may further comprise a spring 1106. Spring 1106 may be a coil spring, leaf spring, Belleville spring, or other suitable spring for exerting a bias against first sleeve 1120. Spring 1106 may be operatively coupled to first sleeve 1120, to assist movement of first sleeve 1120 between the first position (see FIG. 28B) and a second position (see FIG. 28D), as described herein with further detail. In this regard, first sleeve 1120 may be slidable in the outer tube 1110 between the first position and the second position. First sleeve 1120 may translate along centerline axis 1192 between the first position and the second position. The outer tube 1110 may comprise a retaining member 1112. Retaining member 1112 may be coupled to outer tube 1110, e.g., via a threaded connection, fasteners, and/or a metal joining process, such as welding, brazing, etc. Retaining member 1112 may comprise a cap structure coupled to the upper end of outer tube 1110. Retaining member 1112 may comprise a flange extending radially inward from outer tube 1110. Shaft 1160 may extend through retaining member 1112. Retaining member 1112 may retain spring 1106 within outer tube 1110. In this regard, spring 1106 may be compressed between retaining member 1112 and first sleeve 1120. In various embodiments, retaining member 1112 comprises a mating surface 1114 configured to engage with a mating surface 1124 of first sleeve 1120 in response to first sleeve 1120 moving to the second position (see FIG. 28D). In this manner, first sleeve 1120 may be restricted from rotating within outer tube 1110 in the second position. In various embodiments, and as shown, mating surface 1124 and mating surface 1114 are crenulated and, as shown, having crenulations that are complementary to one another. The crenulations interact, in response to axial compression, to transfer torque to first sleeve 1120

In various embodiments, first sleeve 1120 is threadedly coupled to second sleeve 1130. Thus, rotation of the first sleeve 1120 causes the second sleeve 1130 to translate with respect to outer tube 1110. Stated differently, the high speed assembly translates rotational motion of first sleeve 1120 to linear motion of second sleeve 1130. In various embodiments, third sleeve 1140 is threadedly coupled to translating screw 1150. In various embodiments, third sleeve 1140 is threadedly coupled to translating screw 1150 at a bottom end 1144 of the third sleeve 1140. In this regard, third sleeve 1140 may comprise a flange 1148 extending radially inward and disposed at the bottom end 1144 thereof whereby translating screw 1150 is threadedly coupled to third sleeve 1140. Thus, rotation of the third sleeve 1140 causes the translating screw 1150 to translate with respect to outer tube 1110. Stated differently, the low speed assembly translates rotational motion of third sleeve 1140 to linear motion of translating screw 1150.

Shaft 1160 may be operatively coupled to third sleeve 1140 such that third sleeve 1140 rotates with shaft 1160. Shaft 1160 may be operatively coupled to third sleeve 1140 via a keyed connection, e.g., a splined connection or the like, at an upper end of third sleeve 1140. In various embodiments, shaft 1160 may comprise one or more splines 1162 and third sleeve 1140 may comprise a center aperture 1142 comprising a geometry that is complementary to shaft 1160. In this regard, center aperture 1142 may comprise one or more grooves configured to receive the one or more splines 1162 of shaft 1160 such that shaft 1160 interlocks with third sleeve 1140 to impart rotational forces (i.e., torque) therebetween. Stated differently, third sleeve 1140 and shaft 1160 may be coupled via a splined connection. Third sleeve 1140 may be drivably coupled to shaft 1160 via center aperture 1142. Center aperture 1142 may comprise various geometries, such as triangular, star, circular, square, or any other geometry that interlocks shaft 1160 with third sleeve 1140. However, shaft 1160 may be operatively coupled to third sleeve 1140 using various methods without departing from the scope and spirit of the present disclosure.

In operation, rotation of shaft 1160 in a first rotational direction, e.g., via handle 1170, causes third sleeve 1140 to rotate with respect outer tube 1110 and translating screw 1150, which in turn causes translating screw 1150 to extend from third sleeve 1140 (see FIG. 28C and FIG. 28D). Conversely, rotation of shaft 1160 in a second rotational direction (opposite the first rotational direction) causes third sleeve 1140 to rotate with respect outer tube 1110 and translating screw 1150, which in turn causes translating screw 1150 to retract into third sleeve 1140 (see FIG. 28A and FIG. 28B).

Furthermore, with first sleeve 1120 in a first position (see FIG. 28B) with respect to outer tube 1110, first sleeve 1120 may be drivably coupled to shaft 1160. Stated differently, rotation of shaft 1160 may drive rotation of first sleeve 1120. In operation, and with first sleeve 1120 in the first position with respect to outer tube 1110 and/or gear 1165, rotation of shaft 1160 in a first rotational direction, e.g., via handle 1170, may cause first sleeve 1120 to rotate with respect outer tube 1110 and second sleeve 1130, which in turn causes second sleeve 1130 to extend from first sleeve 1120. Conversely, rotation of shaft 1160 in a second rotational direction (opposite the first rotational direction) may cause first sleeve 1120 to rotate with respect outer tube 1110 and second sleeve 1130, which in turn causes second sleeve 1130 to retract into first sleeve 1120. In the first position, spring 1106 may bias first sleeve 1120 to engage with gear 1165. Thus, with the first sleeve 1120 in the first position, both the second sleeve 1130 and the translating screw 1150 are driven to translate with respect to outer tube 1110 in response to rotation of shaft 1160.

However, with combined reference to FIG. 28C and FIG. 28D, in operation and with first sleeve 1120 in the second position with respect to outer tube 1110 and/or gear 1165, the first sleeve 1120 is disengaged from gear 1165 (i.e., rotation of shaft 1160 and gear 1165 does not drive rotation of first sleeve 1120 in the disengaged position). In this regard, with first sleeve 1120 in the second position, rotation of shaft 1160 in the first rotational direction or the second rotational direction may cause only third sleeve 1140 (and not first sleeve 1120) to rotate with respect to outer tube 1110 and translating screw 1150, thereby driving only the translating screw 1150 to translate. Stated differently, the high speed assembly (i.e., the first sleeve 1120 and second sleeve 1130) may be disengaged from operation in response to the first sleeve 1120 moving to the second position. In this manner, in response to rotation of shaft 1160 in the first direction, both the high speed assembly and the low speed assembly (i.e., the third sleeve 1140 and translating screw 1150) are driven to increase the overall length of lifting device 1100 but, after reacting force from the ground through, for example, foot 1175, rotation of shaft 1160 is only imparted to the low speed assembly and the not high speed assembly. As the overall length of lifting device 1100 is increased, the foot 1175 of the lifting device 1100 may contact a ground surface—e.g., as described in further detail with respect to FIG. 4E and FIG. 4F—thereby imparting a force from the ground surface into the first sleeve 1120 which causes the first sleeve 1120 to move with respect to outer tube 1110 against the bias of spring 1106 from the first position (i.e., engaged with gear 1165) to the second position (i.e., disengaged from gear 1165) thereby decoupling first sleeve 1120 from torsional forces imparted by shaft 1160. In this regard, before the lifting device 1100 has contacted a ground surface, the overall length of the lifting device 1100 is quickly increased to reduce the overall number of rotations of shaft 1160 needed to cause lifting device 1100 to reach the ground. In response to contacting the ground, the high speed assembly is decoupled from the shaft 1160 to take advantage of the mechanical advantage of the low speed assembly. In this manner, time to operate is reduced relative to conventional designed and increased mechanical advantage is selectively activated.

Figure 29A:
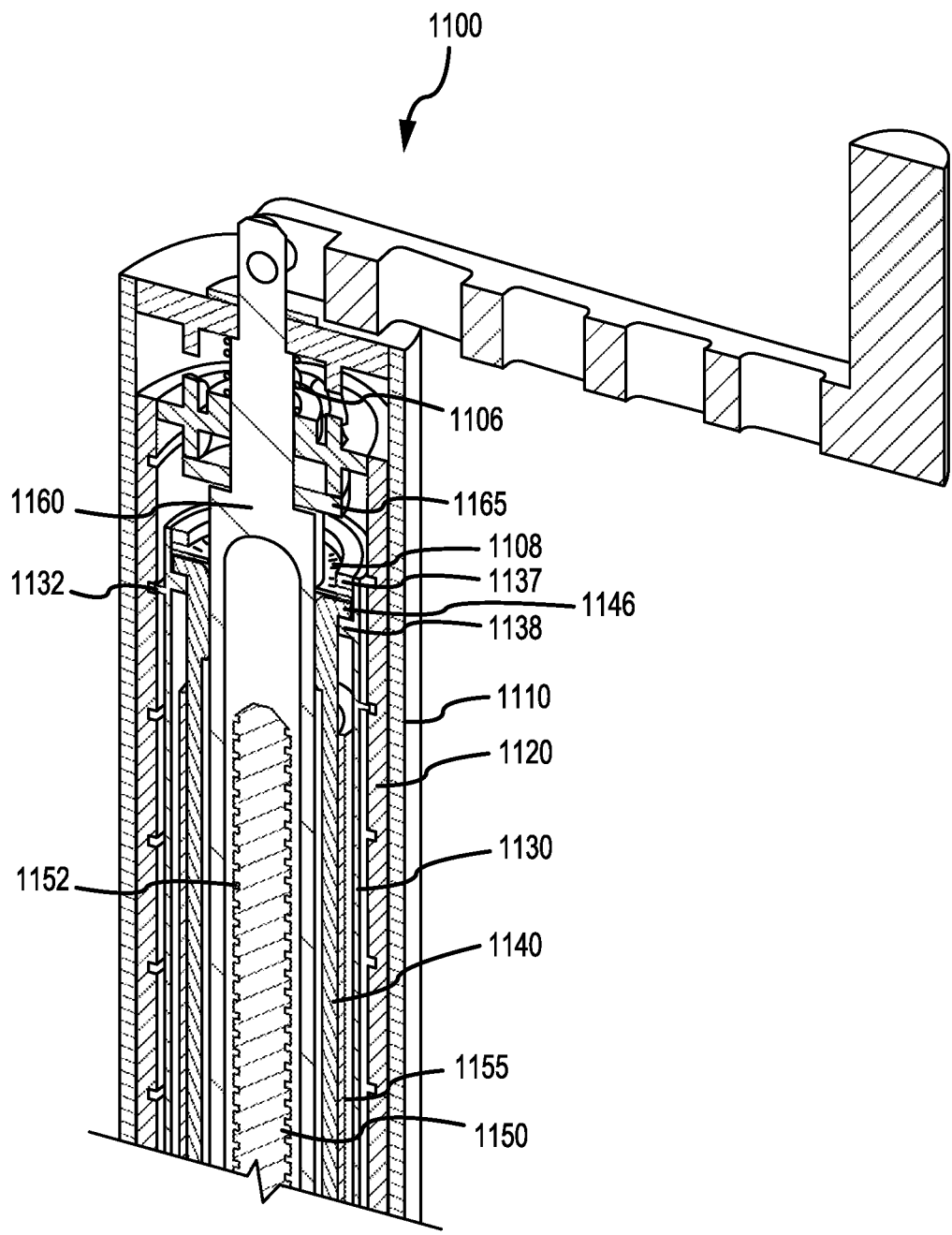
FIG. 29A illustrates a section view of an upper portion of the lifting device of FIG. 28B, in accordance with various embodiments.

With reference to FIG. 29A, a section view of an upper portion of lifting device 1100 is illustrated, in accordance with various embodiments. In various embodiments, second sleeve 1130 comprises helically extending grooves or threads 1132. In various embodiments, translating screw 1150 comprises helically extending grooves and/or threads 1152. The thread pitch of threads 1132 may be greater than the thread pitch of threads 1152. Stated differently, translating screw 1150 may comprise more threads per inch (TPI) than second sleeve 1130. In this manner, the high speed assembly translates further and faster per rotation of shaft 1160 than the low speed assembly, causing the lifting device 1100 to reach a ground surface faster than if the high speed assembly were not present. Furthermore, in response to the lifting device 1100 contacting a ground surface and the high speed assembly disengaging from the shaft 1160, the reduced thread pitch of the low speed assembly takes advantage of the reduced torque required for extending the lifting device 1100.

In various embodiments, second sleeve 1130 comprises a first flange 1137 extending radially inward therefrom. First flange 1137 may be disposed at an upper end of the second sleeve 1130. First flange 1137 may be disposed at an upper terminus of the second sleeve 1130. In various embodiments, first flange 1137 is removably coupled to second sleeve 1130. Second sleeve 1130 may comprise a second flange 1138 extending radially inward therefrom. Second flange 1138 may be disposed axially from the first flange 1137. Third sleeve 1140 may comprise a flange 1146 extending radially outward therefrom. Flange 1146 may be disposed at an upper end of the third sleeve 1140. Flange 1146 may be disposed at an upper terminus of the third sleeve 1140. Flange 1146 may be captured between the first flange 1136 and the second flange 1138. Flange 1146 may be configured to transfer axial loads between third sleeve 1140 and second sleeve 1130 via first flange 1136 and second flange 1138.

In various embodiments, a bearing 1108 may be disposed between flange 1146 and first flange 1137. Bearing 1108 may reduce friction between second sleeve 1130 and third sleeve 1140. Bearing 1108 may assist rotation of third sleeve 1140 with respect to second sleeve 1130. Bearing 1108 may comprise a thrust needle roller bearing or the like, in accordance with various embodiments.

Figure 29B:
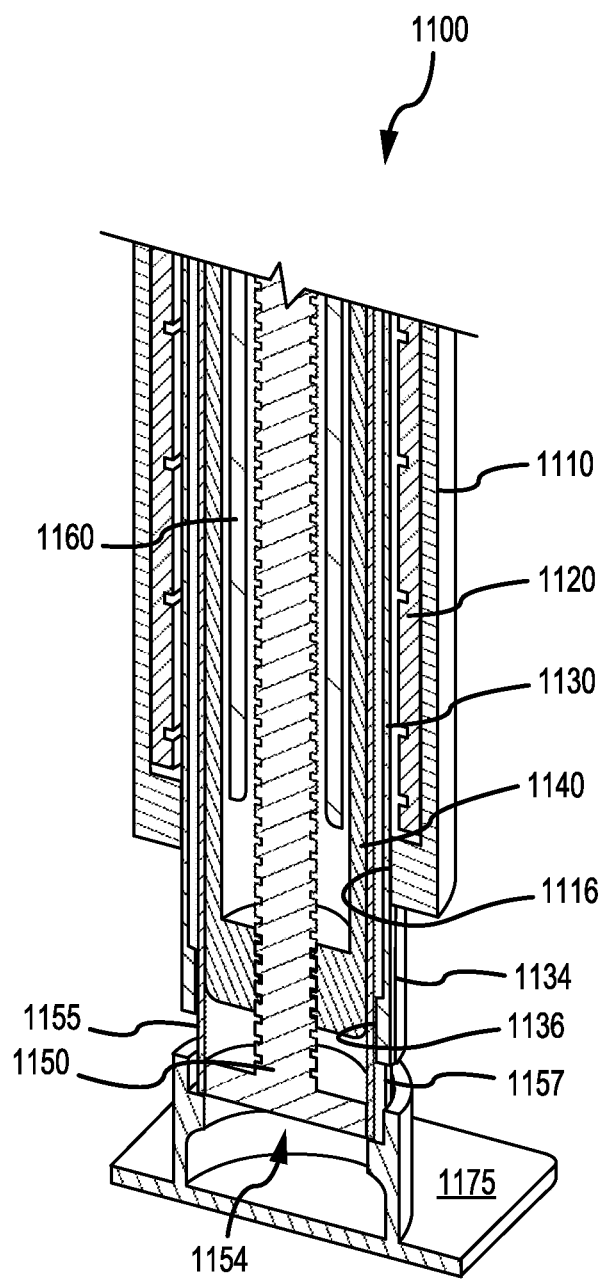
FIG. 29B illustrates a section view of a lower portion of the lifting device of FIG. 28B, in accordance with various embodiments.

With reference to FIG. 29B, a section view of a lower portion of lifting device 1100 is illustrated, in accordance with various embodiments. Second sleeve 1130 may be keyed to outer tube 1110 to prevent rotation of second sleeve 1130 with respect to outer tube 1110. For example, second sleeve 1130 may comprise one or more axially extending grooves 1134 disposed in the outer diameter surface thereof and outer tube 1110 may comprise corresponding protrusion(s) 1116 extending radially inwards from an inner diameter surface thereof that extends into groove(s) 1134.

In various embodiments, sleeve 1155 may be affixed to the bottom end 1154 of translating screw 1150. In this regard, sleeve 1155 and translating screw 1150 may move together. Sleeve 1155 may be keyed to second sleeve 1130 to prevent rotation of sleeve 1155 and translating screw 1150 with respect to second sleeve 1130. For example, sleeve 1155 may comprise one or more axially extending grooves 1157 disposed in the outer diameter surface thereof and second sleeve 1130 may comprise corresponding protrusion(s) 1136 extending radially inwards from an inner diameter surface thereof that extends into groove(s) 1157.

Sleeve 1155 may protect translating screw 1150 from ambient elements such as dust, water, etc., thereby increasing the life and robustness of lifting device 1100. Stated differently, translating screw 1150 may be enclosed within sleeve 1155. Sleeve 1155 may comprise a hollow cylinder. Third sleeve 1140 may be at least partially disposed within sleeve 1155.

Figure 30:
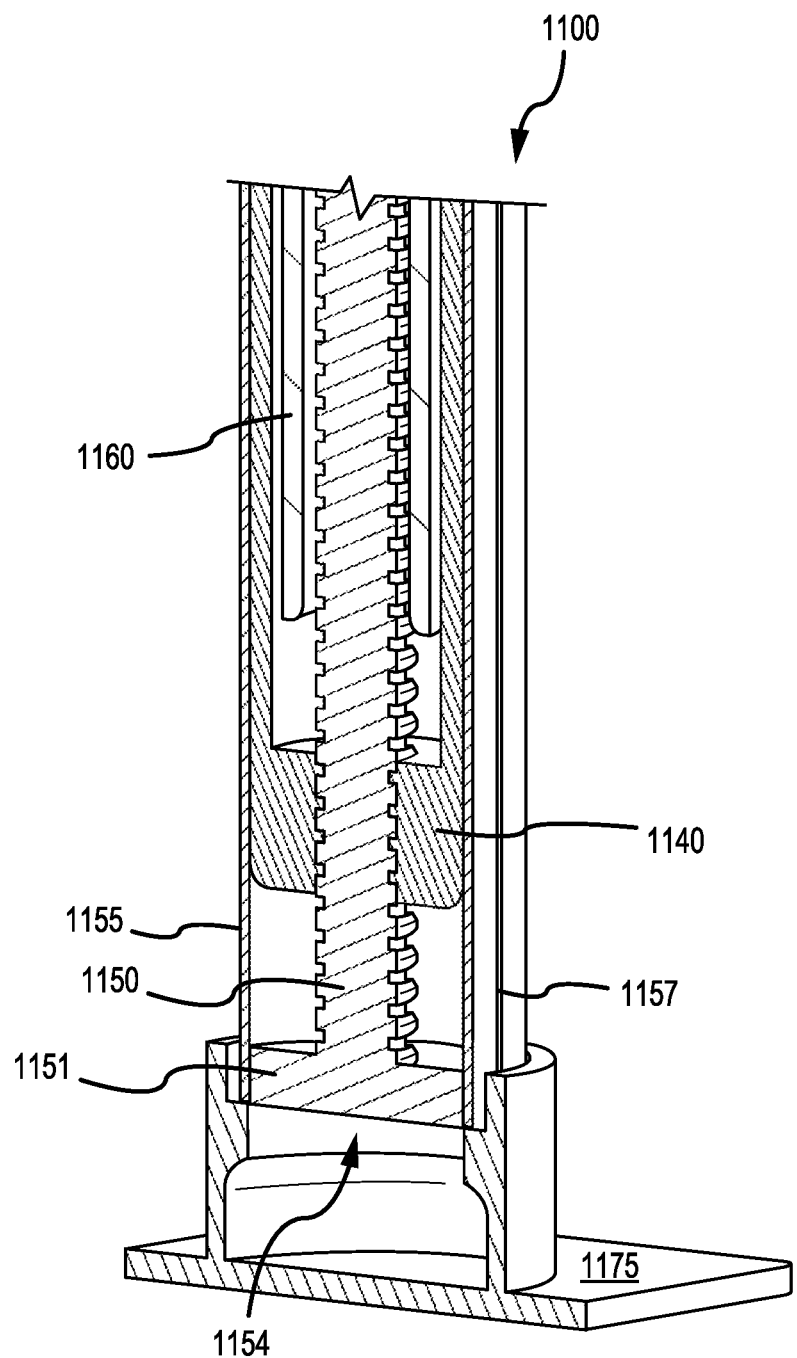
FIG. 30 illustrates a section view of the lower portion of the lifting device of FIG. 28B, with the outer tube and the high speed assembly omitted, in accordance with various embodiments.

With reference to FIG. 30, a section view of a bottom portion of lifting device 1100 with the outer tube, sleeve, and sleeve omitted for clarity purposes is illustrated, in accordance with various embodiments. Stated differently, the high speed assembly and outer tube are omitted in FIG. 30. Translating screw 1150 may comprise a flange 1151 extending from the bottom end thereof. Sleeve 1155 may be coupled to flange 1151. In this manner, sleeve 1155 may be radially spaced apart from translating screw 1150. In various embodiments, translating screw 1150 and flange 1151 comprise a single, monolithic piece of material. translating screw 1150 and sleeve 1155 may be coupled to foot 1175. Sleeve 1155 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, or any other suitable metal or metal alloy. Sleeve 1155 may be made from a fiber-reinforced composite material.

With reference to FIG. 31, a flow chart of a method 1200 of assembling a lifting device, such as a linear jack, is illustrated, in accordance with various embodiments. Method 1200 includes disposing a second sleeve at least partially within a first sleeve (step 1210). Method 1200 includes disposing a translating screw at least partially within a third sleeve (step 1220). Method 1200 includes disposing the third sleeve at least partially within the second sleeve (step 1230). Method 1200 includes coupling a cover sleeve to the translating screw (step 1240).

With combined reference to FIG. 28B and FIG. 31, step 1210 may include threading second sleeve 1130 into first sleeve 1120. Step 1220 may include threading translating screw 1150 into third sleeve 1140. Step 1230 may include moving third sleeve 1140 into second sleeve 1130. Step 1230 may include coupling third sleeve 1140 in keyed connection with second sleeve 1130. Step 1240 may include coupling sleeve 1155 to translating screw 1150, such as via a fastener, a metal joining process, a threaded connection, or any other suitable coupling. Sleeve 1155 is coupled to translating screw 1150 such that sleeve 1155 surrounds translating screw 1150. Sleeve 1155 may be disposed to surround third sleeve 1140. Sleeve 1155 may be coupled in keyed connection with second sleeve 1130.

Benefits and other advantages have been described herein with regard to specific embodiments. Furthermore, the connecting lines shown in the various figures contained herein are intended to represent example functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A linear jack, comprising:
a first sleeve;
a second sleeve disposed at least partially within the first sleeve, wherein the first sleeve is threadedly coupled to the second sleeve;
a third sleeve disposed at least partially within the second sleeve;
a translating screw disposed at least partially within the third sleeve, wherein the third sleeve is threadedly coupled to the translating screw;
a cover sleeve coupled to the translating screw;

an outer tube comprising a centerline axis, wherein the first sleeve is disposed at least partially within the outer tube;
a shaft coupled to the third sleeve;
a gear coupled to the shaft; and
a spring operatively coupled to the first sleeve;
wherein the first sleeve is slidable in the outer tube between a first position and a second position;
the third sleeve is configured to rotate with the shaft, the gear is disposed within the first sleeve, and the spring is disposed within the outer tube;
the translating screw is disposed at least partially within the cover sleeve;
the cover sleeve is configured to translate with the translating screw; and
wherein:
in the first position, the spring biases the first sleeve to engage the gear whereby turning the shaft a first rotational direction extends the second sleeve from the first sleeve, and turning the shaft a second rotational direction retracts the second sleeve into the first sleeve; and
in the second position, the first sleeve is moved against a bias of the spring and disengaged from the gear whereby turning the shaft the first rotational direction extends the translating screw from the third sleeve, and turning the shaft the second rotational direction retracts the translating screw into the third sleeve.

2. The linear jack of claim 1, wherein the cover sleeve is disposed at least partially within the second sleeve.

3. The linear jack of claim 2, wherein the cover sleeve is keyed to the second sleeve.

4. The linear jack of claim 1, wherein the second sleeve is configured to translate with respect to the first sleeve in response to rotation of the first sleeve, and the translating screw is configured to translate with respect to the third sleeve in response to rotation of the third sleeve.

5. The linear jack of claim 1, wherein a thread pitch of the second sleeve is greater than a thread pitch of the translating screw.

6. The linear jack of claim 1, wherein turning the shaft the first rotational direction extends the translating screw from the third sleeve, and turning the shaft the second rotational direction retracts the translating screw into the third sleeve, regardless of the first sleeve being in the first position or the second position.

7. The linear jack of claim 1, wherein the first sleeve, the second sleeve, the third sleeve, and the translating screw are in coaxial alignment.

8. The linear jack of claim 1, further comprising a foot coupled to an end of the translating screw.

9. A method of manufacturing a linear jack, comprising:
disposing a first sleeve at least partially within an outer tube, the outer tube comprising a centerline axis;
disposing a second sleeve at least partially within the first sleeve, wherein the first sleeve is threadedly coupled to the second sleeve;
disposing a translating screw at least partially within a third sleeve, wherein the third sleeve is threadedly coupled to the translating screw;
disposing the third sleeve at least partially within the second sleeve;
coupling a shaft to the third sleeve;
coupling a gear to the shaft;
operatively coupling a spring to the first sleeve; and
coupling a cover sleeve to the translating screw;
wherein the first sleeve is slidable in the outer tube between a first position and a second position;
the third sleeve is configured to rotate with the shaft, the gear is disposed within the first sleeve, and the spring is disposed within the outer tube;
the translating screw is disposed at least partially within the cover sleeve;
the cover sleeve is configured to translate with the translating screw; and
wherein:
in the first position, the spring biases the first sleeve to engage the gear whereby turning the shaft a first rotational direction extends the second sleeve from the first sleeve, and turning the shaft a second rotational direction retracts the second sleeve into the first sleeve; and
in the second position, the first sleeve is moved against a bias of the spring and disengaged from the gear whereby turning the shaft the first rotational direction extends the translating screw from the third sleeve, and turning the shaft the second rotational direction retracts the translating screw into the third sleeve.

10. The method of claim 9, further comprising:
disposing the cover sleeve to surround the translating screw;
disposing the cover sleeve to surround the third sleeve; and
disposing the cover sleeve in keyed connection with the second sleeve.

* * * * *